US009418510B2

(12) United States Patent
Baerlocher

(10) Patent No.: US 9,418,510 B2

(45) Date of Patent: Aug. 16, 2016

(54) GAMING SYSTEM, GAMING DEVICE AND METHOD FOR PROVIDING A GAME HAVING A DYNAMIC AWARD SCHEME

(75) Inventor: Anthony J. Baerlocher, Reno, NV (US)

(73) Assignee: IGT, Las Vegas, NV (US)

( * ) Notice: Subject to any disclaimer, the term of this patent is extended or adjusted under 35 U.S.C. 154(b) by 1504 days.

(21) Appl. No.: 12/617,366

(22) Filed: Nov. 12, 2009

(65) Prior Publication Data

US 2011/0111818 A1 May 12, 2011

(51) Int. Cl.

| | |
|---|---|
| ***A63F 9/24*** | (2006.01) |
| ***A63F 13/00*** | (2014.01) |
| ***G06F 17/00*** | (2006.01) |
| ***G06F 19/00*** | (2011.01) |
| ***G07F 17/32*** | (2006.01) |

(52) U.S. Cl.

CPC ............ *G07F 17/3244* (2013.01); *G07F 17/32* (2013.01); *G07F 17/3293* (2013.01)

(58) Field of Classification Search

CPC .. G07F 17/32; G07F 17/3293; G07F 17/3244

USPC ................................................ 463/16, 20, 25

See application file for complete search history.

(56) References Cited

U.S. PATENT DOCUMENTS

| | | | |
|---|---|---|---|
| 631,050 | A | 8/1899 | Peck |
| 2,334,093 | A | 11/1943 | Hickey |
| 2,896,951 | A | 7/1959 | Snow |

(Continued)

FOREIGN PATENT DOCUMENTS

| | | |
|---|---|---|
| CA | 2 288 723 | 10/1998 |
| EP | 1 298 601 | 4/2003 |

(Continued)

OTHER PUBLICATIONS

1-Card Casino Solitaire printed from http://www.casinoglamour.com/rules/solitaire.html on Jan. 30, 2007, 1 page.

(Continued)

*Primary Examiner* — Omkar Deodhar

*Assistant Examiner* — Wei Lee

(74) *Attorney, Agent, or Firm* — Neal, Gerber & Eisenberg LLP

(57) ABSTRACT

Various embodiments of the present disclosure provide gaming systems, gaming devices and methods which have casual games with dynamic award schemes. Each game has a designated number of elements such as positions, moveable elements, or the combination of positions and moveable elements. For each play of the wagering game, the gaming system: receives a wager from a player; determines a number of the designated number of elements which will function as or be designated as payout elements; determines which of the designated number of elements to make the payout elements; for each payout element, determines the payout value associated with that payout element; and (e) determines a game ending condition. The gaming system enables the player to play the wagering game in accordance with the predetermined rules of the wagering game. This includes enabling the player to employ the elements until the game ending condition occurs. For each payout element, if the payout element is employed in that play of the wagering game in a designated manner in accordance with the predetermined rules of the wagering game, the gaming system provides the player the payout value associated with that payout element.

28 Claims, 32 Drawing Sheets

(56) References Cited

U.S. PATENT DOCUMENTS

| | | | | |
|---|---|---|---|---|
| 3,224,780 | A | 12/1965 | Mohl | |
| 3,563,551 | A | 2/1971 | Weisbecker | |
| 4,006,905 | A | 2/1977 | Marbury | |
| 4,180,271 | A | 12/1979 | Mcmurchie et al. | |
| 5,653,635 | A | 8/1997 | Breeding | |
| 5,660,393 | A | 8/1997 | Dreger | |
| 5,743,526 | A | 4/1998 | Inoue | |
| 5,769,716 | A | 6/1998 | Saffari et al. | |
| 5,816,917 | A | 10/1998 | Kelmer et al. | |
| 5,833,537 | A | 11/1998 | Barrie | |
| 5,882,258 | A * | 3/1999 | Kelly et al. | 463/11 |
| 5,947,820 | A | 9/1999 | Morro et al. | |
| 6,007,426 | A | 12/1999 | Kelly et al. | |
| 6,050,895 | A | 4/2000 | Luciano, Jr. et al. | |
| 6,129,632 | A | 10/2000 | Luciano | |
| 6,159,095 | A * | 12/2000 | Frohm et al. | 463/19 |
| 6,179,291 | B1 | 1/2001 | Vancura | |
| 6,179,711 | B1 | 1/2001 | Yoseloff | |
| 6,267,669 | B1 | 7/2001 | Luciano, Jr. et al. | |
| 6,283,855 | B1 | 9/2001 | Bingham | |
| 6,309,300 | B1 | 10/2001 | Glavich | |
| 6,312,334 | B1 | 11/2001 | Yoseloff | |
| 6,315,664 | B1 | 11/2001 | Baerlocher et al. | |
| 6,319,124 | B1 | 11/2001 | Baerlocher et al. | |
| 6,322,445 | B1 | 11/2001 | Miller | |
| 6,334,814 | B1 | 1/2002 | Adams | |
| 6,346,043 | B1 | 2/2002 | Colin et al. | |
| 6,364,767 | B1 | 4/2002 | Brossard et al. | |
| 6,368,214 | B1 | 4/2002 | Luciano | |
| 6,386,974 | B1 | 5/2002 | Adams | |
| 6,409,172 | B1 | 6/2002 | Vancura | |
| 6,413,160 | B1 | 7/2002 | Vancura | |
| 6,439,995 | B1 | 8/2002 | Hughs-baird et al. | |
| 6,450,883 | B1 | 9/2002 | O'halloran | |
| 6,454,651 | B1 | 9/2002 | Yoseloff | |
| 6,464,582 | B1 | 10/2002 | Baerlocher et al. | |
| 6,494,785 | B1 | 12/2002 | Gerrard et al. | |
| 6,511,375 | B1 | 1/2003 | Kaminkow | |
| 6,514,141 | B1 | 2/2003 | Kaminkow et al. | |
| 6,554,282 | B2 | 4/2003 | VanderKley et al. | |
| 6,554,703 | B1 | 4/2003 | Bussick et al. | |
| 6,558,254 | B2 | 5/2003 | Baelocher et al. | |
| 6,561,899 | B2 | 5/2003 | Vancura | |
| 6,572,472 | B1 | 6/2003 | Glavich | |
| 6,572,473 | B1 | 6/2003 | Baerlocher | |
| 6,582,307 | B2 | 6/2003 | Web | |
| 6,595,854 | B2 | 7/2003 | Hughs-baird et al. | |
| 6,599,785 | B2 | 7/2003 | Hamada et al. | |
| 6,602,136 | B1 | 8/2003 | Baerlocher et al. | |
| 6,602,137 | B2 * | 8/2003 | Kaminkow et al. | 463/16 |
| 6,609,971 | B2 | 8/2003 | Vancura | |
| 6,612,927 | B1 | 9/2003 | Slomiany et al. | |
| 6,632,139 | B1 | 10/2003 | Baerlocher | |
| 6,645,073 | B2 | 11/2003 | Lemay et al. | |
| 6,666,765 | B2 | 12/2003 | Vancura | |
| 6,669,559 | B1 | 12/2003 | Baerlocher et al. | |
| 6,676,516 | B2 | 1/2004 | Baerlocher et al. | |
| 6,692,356 | B2 | 2/2004 | Baerlocher et al. | |
| 6,722,981 | B2 | 4/2004 | Kaminkow et al. | |
| 6,722,982 | B2 | 4/2004 | Kaminkow et al. | |
| 6,726,562 | B2 | 4/2004 | Vancura | |
| 6,726,563 | B1 | 4/2004 | Baerlocher et al. | |
| 6,733,386 | B2 | 5/2004 | Cuddy et al. | |
| 6,739,970 | B2 | 5/2004 | Luciano | |
| 6,746,016 | B2 | 6/2004 | Perrie et al. | |
| 6,746,328 | B2 | 6/2004 | Cannon et al. | |
| 6,749,502 | B2 | 6/2004 | Baerlocher | |
| 6,749,504 | B2 | 6/2004 | Hughs-baird | |
| 6,752,717 | B2 | 6/2004 | Vancura | |
| 6,761,632 | B2 | 7/2004 | Bansemer et al. | |
| 6,769,983 | B2 | 8/2004 | Slomiany | |
| 6,780,103 | B2 | 8/2004 | Bansemer et al. | |
| 6,780,104 | B2 | 8/2004 | Fox | |
| 6,780,107 | B2 | 8/2004 | Baerlocher et al. | |
| 6,783,455 | B2 | 8/2004 | Glavich | |
| 6,783,457 | B2 | 8/2004 | Hughs-Baird et al. | |
| 6,786,820 | B2 | 9/2004 | Gerrard et al. | |
| 6,808,454 | B2 | 10/2004 | Gerrard et al. | |
| 6,817,944 | B2 | 11/2004 | Kaminkow et al. | |
| 6,840,858 | B2 | 1/2005 | Adams | |
| 6,843,721 | B2 | 1/2005 | Vancura | |
| 6,843,722 | B2 | 1/2005 | Webb | |
| 6,852,027 | B2 | 2/2005 | Kaminkow et al. | |
| 6,852,028 | B2 | 2/2005 | Vancura | |
| 6,855,053 | B2 | 2/2005 | Baerlocher | |
| 6,863,606 | B1 | 3/2005 | Berg et al. | |
| 6,875,108 | B1 | 4/2005 | Hughs-baird | |
| 6,878,061 | B2 | 4/2005 | Baerlocher et al. | |
| 6,899,620 | B2 | 5/2005 | Kaminkow et al. | |
| 6,908,383 | B2 | 6/2005 | Baerlocher et al. | |
| 6,918,830 | B2 | 7/2005 | Baerlocher | |
| 6,918,834 | B2 | 7/2005 | Vancura | |
| 6,929,545 | B2 | 8/2005 | Vancura | |
| 6,929,952 | B2 | 8/2005 | Baerlocher | |
| 6,932,701 | B2 | 8/2005 | Glavich et al. | |
| 6,939,229 | B2 | 9/2005 | Mcclintic | |
| 6,942,568 | B2 | 9/2005 | Baerlocher | |
| 6,958,013 | B2 | 10/2005 | Miereau et al. | |
| 6,964,416 | B2 | 11/2005 | Mcclintic et al. | |
| 6,966,833 | B2 | 11/2005 | Kaminkow et al. | |
| 6,971,953 | B2 | 12/2005 | Gerrard et al. | |
| 6,984,174 | B2 | 1/2006 | Cannon et al. | |
| 6,986,711 | B2 | 1/2006 | Vancura | |
| 6,988,732 | B2 | 1/2006 | Vancura | |
| 6,988,947 | B2 | 1/2006 | Baerlocher et al. | |
| 7,037,191 | B2 | 5/2006 | Rodgers et al. | |
| 7,040,983 | B2 | 5/2006 | Dolloff et al. | |
| 7,040,984 | B2 | 5/2006 | Mead | |
| 7,056,192 | B2 | 6/2006 | Venigalla et al. | |
| 7,056,210 | B2 | 6/2006 | Bansemer et al. | |
| 7,056,214 | B2 | 6/2006 | Miereau et al. | |
| 7,059,967 | B2 | 6/2006 | Baerlocher | |
| 7,073,793 | B2 | 7/2006 | Vancura | |
| 7,077,744 | B2 | 7/2006 | Cannon | |
| 7,086,945 | B2 | 8/2006 | Vancura | |
| 7,094,152 | B2 | 8/2006 | Rush et al. | |
| 7,104,888 | B2 | 9/2006 | Miereau et al. | |
| 7,112,137 | B2 | 9/2006 | Baerlocher et al. | |
| 7,121,942 | B2 | 10/2006 | Baerlocher | |
| 7,128,646 | B2 | 10/2006 | Baerlocher et al. | |
| 7,160,186 | B2 | 1/2007 | Cuddy et al. | |
| 7,160,188 | B2 | 1/2007 | Kaminkow et al. | |
| 7,172,506 | B2 | 2/2007 | Baerlocher et al. | |
| 7,175,521 | B2 | 2/2007 | Mcclintic | |
| 7,175,524 | B2 | 2/2007 | Bansemer et al. | |
| 7,182,689 | B2 | 2/2007 | Hughs-baird et al. | |
| 7,185,891 | B2 | 3/2007 | Jackson | |
| 7,192,343 | B2 | 3/2007 | Vancura | |
| 7,217,187 | B2 | 5/2007 | Vancura | |
| 7,223,172 | B2 | 5/2007 | Baerlocher et al. | |
| 7,229,350 | B2 | 6/2007 | Baerlocher et al. | |
| 7,234,700 | B2 | 6/2007 | Vancura | |
| 7,235,011 | B2 | 6/2007 | Randall et al. | |
| 7,247,096 | B2 | 7/2007 | Vancura | |
| 7,252,591 | B2 | 8/2007 | Van Asdale | |
| 7,264,244 | B1 | 9/2007 | Moy | |
| 7,264,545 | B2 | 9/2007 | Maya et al. | |
| 7,273,415 | B2 | 9/2007 | Cregan et al. | |
| 7,294,055 | B2 | 11/2007 | Baerlocher et al. | |
| 7,300,348 | B2 | 11/2007 | Kaminkow et al. | |
| 7,303,469 | B2 | 12/2007 | Kaminkow | |
| 7,314,409 | B2 | 1/2008 | Maya et al. | |
| 7,316,609 | B2 | 1/2008 | Dunn et al. | |
| 7,326,115 | B2 | 2/2008 | Baerlocher | |
| 7,335,102 | B2 | 2/2008 | Baerlocher et al. | |
| 7,338,367 | B2 | 3/2008 | Kaminkow et al. | |
| 7,338,369 | B2 | 3/2008 | Mierau et al. | |
| 7,341,512 | B2 | 3/2008 | Dolloff et al. | |
| 7,351,141 | B2 | 4/2008 | Rodgers et al. | |
| 7,371,166 | B1 | 5/2008 | Webb et al. | |
| 7,371,174 | B2 | 5/2008 | Baerlocher | |
| 7,377,849 | B2 | 5/2008 | Baerlocher et al. | |
| 7,399,226 | B2 | 7/2008 | Mishra | |
| 7,402,103 | B2 | 7/2008 | Baerlocher | |

(56) References Cited

U.S. PATENT DOCUMENTS

| | | | | |
|---|---|---|---|---|
| 7,413,510 | B2 | 8/2008 | Schlegel et al. | |
| 7,419,431 | B2 | 9/2008 | Gauselmann et al. | |
| 7,448,948 | B2 | 11/2008 | Hughs-baird et al. | |
| 7,488,250 | B2 | 2/2009 | Baerlocher et al. | |
| 7,494,412 | B2 | 2/2009 | Baerlocher | |
| 7,541,252 | B2 | 6/2009 | Eun et al. | |
| 7,544,129 | B2 | 6/2009 | Baerlocher | |
| 7,578,136 | B2 | 8/2009 | Derouineau et al. | |
| 8,328,614 | B2 | 12/2012 | Jones et al. | |
| 2001/0024970 | A1 | 9/2001 | Mckee et al. | |
| 2001/0038178 | A1 | 11/2001 | Vancura | |
| 2002/0052229 | A1 | 5/2002 | Halliburton et al. | |
| 2002/0052232 | A1 | 5/2002 | Kaminkow | |
| 2003/0190945 | A1 | 10/2003 | Bussick et al. | |
| 2004/0033827 | A1* | 2/2004 | Gilmore et al. | 463/20 |
| 2004/0048649 | A1 | 3/2004 | Peterson et al. | |
| 2004/0053665 | A1 | 3/2004 | Baerlocher | |
| 2004/0067790 | A1 | 4/2004 | Peterson et al. | |
| 2004/0082374 | A1 | 4/2004 | Maya et al. | |
| 2004/0082378 | A1 | 4/2004 | Peterson et al. | |
| 2004/0106444 | A1 | 6/2004 | Cuddy et al. | |
| 2004/0152507 | A1 | 8/2004 | Baerlocher et al. | |
| 2004/0171416 | A1 | 9/2004 | Baerlocher et al. | |
| 2004/0176156 | A1 | 9/2004 | Walker et al. | |
| 2004/0204223 | A1 | 10/2004 | Cuddy et al. | |
| 2004/0204246 | A1 | 10/2004 | Haliburton et al. | |
| 2004/0219969 | A1* | 11/2004 | Casey et al. | 463/20 |
| 2004/0248639 | A1 | 12/2004 | Slomiany | |
| 2004/0248641 | A1* | 12/2004 | Jarvis et al. | 463/20 |
| 2004/0266516 | A1* | 12/2004 | Thomas | 463/20 |
| 2005/0020351 | A1 | 1/2005 | Baerlocher et al. | |
| 2005/0033461 | A1 | 2/2005 | Gerrard et al. | |
| 2005/0054405 | A1 | 3/2005 | Baerlocher et al. | |
| 2005/0054415 | A1 | 3/2005 | Kaminkow et al. | |
| 2005/0054416 | A1 | 3/2005 | Hostetler et al. | |
| 2005/0054434 | A1 | 3/2005 | Baerlocher et al. | |
| 2005/0054435 | A1 | 3/2005 | Rodgers et al. | |
| 2005/0054436 | A1 | 3/2005 | Frizzell et al. | |
| 2005/0059456 | A1 | 3/2005 | Mead et al. | |
| 2005/0059461 | A1 | 3/2005 | Ching et al. | |
| 2005/0096123 | A1 | 5/2005 | Cregan et al. | |
| 2005/0101372 | A1 | 5/2005 | Mierau et al. | |
| 2005/0101378 | A1 | 5/2005 | Kaminkow et al. | |
| 2005/0181853 | A1 | 8/2005 | Baerlocher | |
| 2005/0192081 | A1 | 9/2005 | Marks et al. | |
| 2006/0025196 | A1 | 2/2006 | Webb et al. | |
| 2006/0030395 | A1* | 2/2006 | Thomas et al. | 463/17 |
| 2006/0030401 | A1 | 2/2006 | Mead et al. | |
| 2006/0046836 | A1 | 3/2006 | Walker et al. | |
| 2006/0068882 | A1 | 3/2006 | Baerlocher et al. | |
| 2006/0073874 | A1 | 4/2006 | Cregan et al. | |
| 2006/0084500 | A1 | 4/2006 | Baerlocher et al. | |
| 2006/0183528 | A1 | 8/2006 | Rodgers et al. | |
| 2006/0205474 | A1 | 9/2006 | Bansemer et al. | |
| 2006/0246977 | A1 | 11/2006 | Cannon | |
| 2007/0015566 | A1 | 1/2007 | Baerlocher et al. | |
| 2007/0021176 | A1 | 1/2007 | Jackson | |
| 2007/0032285 | A1 | 2/2007 | Wolf | |
| 2007/0060271 | A1 | 3/2007 | Cregan et al. | |
| 2007/0087809 | A1 | 4/2007 | Baerlocher | |
| 2007/0111783 | A1 | 5/2007 | Cuddy et al. | |
| 2007/0117606 | A1 | 5/2007 | Baerlocher et al. | |
| 2007/0129128 | A1 | 6/2007 | Mcclintic | |
| 2007/0129131 | A1 | 6/2007 | Kaminkow et al. | |
| 2007/0129133 | A1 | 6/2007 | Bansemer et al. | |
| 2007/0149267 | A1 | 6/2007 | Ross et al. | |
| 2007/0149269 | A1 | 6/2007 | Benbrahim | |
| 2007/0213119 | A1 | 9/2007 | Baerlocher et al. | |
| 2008/0004105 | A1 | 1/2008 | Cregan et al. | |
| 2008/0045302 | A1 | 2/2008 | Low | |
| 2008/0119283 | A1 | 5/2008 | Baerlocher | |
| 2008/0146321 | A1 | 6/2008 | Parente | |
| 2008/0188287 | A1 | 8/2008 | Schlegel et al. | |
| 2008/0200238 | A1 | 8/2008 | Mishra | |
| 2008/0311980 | A1 | 12/2008 | Cannon | |
| 2009/0104959 | A1 | 4/2009 | Caputo et al. | |
| 2009/0124334 | A1 | 5/2009 | Jones et al. | |
| 2009/0124365 | A1* | 5/2009 | Surmacz et al. | 463/27 |

FOREIGN PATENT DOCUMENTS

| | | |
|---|---|---|
| EP | 1 336 941 | 8/2003 |
| EP | 1 617 386 | 1/2006 |
| EP | 1 635 306 | 3/2006 |
| GB | 2 147 773 | 5/1985 |
| GB | 2 191 030 | 12/1987 |
| GB | 2 262 642 | 6/1993 |
| GB | 2 333 880 | 8/1999 |
| GB | 2 341 262 | 3/2000 |
| GB | 2 353 128 | 2/2001 |
| GB | 2 422 121 | 7/2006 |
| WO | WO 96/35491 | 11/1996 |
| WO | WO 00/12186 | 3/2000 |
| WO | WO 01/74464 | 10/2001 |
| WO | WO 01/93967 | 12/2001 |
| WO | WO 2005/002599 | 3/2005 |
| WO | WO 2005/027058 | 3/2005 |
| WO | WO 2005/027061 | 3/2005 |
| WO | WO 2005/035080 | 4/2005 |
| WO | WO 2005/057339 | 6/2005 |
| WO | WO 2005/075037 | 8/2005 |
| WO | WO 2005/105241 | 11/2005 |
| WO | WO 2005/123206 | 12/2005 |
| WO | WO 2006/009248 | 1/2006 |
| WO | WO 2006/017516 | 2/2006 |
| WO | WO 2006/088498 | 8/2006 |
| WO | WO 2007021724 | 7/2007 |

OTHER PUBLICATIONS

1-Card Vegas Solitaire printed from http://www.casinoglamour.com/rules/solitaire.html?p=3 on Jan. 30, 2007, 1 page.

3-Card Casino Solitaire printed from http://www.casinoglamour.com/rules/solitaire.html?p=2 on Jan. 30, 2007, 1 page.

3-Card Vegas Solitaire printed from http://www.casinoglamour.com/rules/solitaire.html?p=4 on Jan. 30, 2007, 1 page.

Alhambra (board game) description, printed from http://en.wikipedia.org/wiki/Alhambra_(board_game) on Oct. 7, 2009, 4 pages.

Aphrodite Advertisement, written by Atronic, published 2004, 1 page.

Bejeweled game description, printed from http://www.astraware.com/all/featured/bejeweled/ on Nov. 4, 2009, 2 pages.

Bendomino game description, printed from http://en.wikipedia.org/wiki/bendomino on Oct. 7, 2009, 3 pages.

Betrayal at House on the Hill game description, printed from http://en.wikipedia.org/wiki/betrayal_at_house_on_the_hill on Oct. 7, 2009, 2 pages.

Blokus game description, printed from http://en.wikipedia.org/wiki/blokus on Oct. 7, 2009, 4 pages.

Bomberman game description, printed from http://en.wikipedia.org/wiki/bomberman on Oct. 7, 2009, 3 pages.

Boulder Dash game description, printed from http://en.wikipedia.org/wiki/boulder_dash on Oct. 7, 2009, 3 pages.

Canfield (solitaire) printed from http://en.wikipedia.org/wiki/Canfield_(solitaire) on Feb. 4, 2008, 3 pages.

Carcassonne (board game) description, printed from http://en.wikipedia.org/wiki/carcassonne_(board_game) on Oct. 7, 2009, 9 pages.

Carnival of Mystery-MultiWay by International Game Technology Article description, written by, Strictly Slots published Jul. 2005, 1 page.

Cats "n" Mouse 2 Advertisement, written by Unidesa Gaming & Systems, published prior to Aug. 14, 2009, 2 pages.

Chinese Dominoes game description, printed from http://en.wikipedia.org/wiki/Chinese_dominoes on Oct. 7, 2009, 2 pages.

Chip's Challenge game description, printed from http://en.wikipedia.org/wiki/chip%27s_challenge on Oct. 7, 2009, 5 pages.

Civilization (video game) description, printed from http://en.wikipedia.org/wiki/civilization_(computer game) on Oct. 7, 2009, 7 pages.

(56) References Cited

OTHER PUBLICATIONS

Clowning Around Advertisement, written by Atronic, published 2002, 1 page.
DaVinci Diamonds Slot Game description, printed from http://www.newslotgames.com/new-slot-games/davinci-diamonds.ww.asp on Nov. 4, 2009, 7 pages.
Denver Duck and the Quest for the Golden Egg Advertisement, written by IGT, published 2004, 2 pages.
Deviled Eggs by Aristocrat Technologies Article, written by Strictly Slots, published May 2005, 1 page.
Diamond Solitaire Article in Strictly Slots written by Konami published Sep. 2004, 1 page.
Diceland game description, printed from http://en.wikipedia.org/wiki/diceland on Oct. 7, 2009, 1 page.
Dig Dug game description, printed from http://en.wikipedia.org/wiki/dig_dug on Oct. 7, 2009, 5 pages.
Dominoes game description, printed from http://en.wikipedia.org/wiki/dominoes on Oct. 7, 2009, 9 pages.
Dungeons & Dragons game description, printed from http://en.wikipedia.org/wiki/D%26D on Oct. 7, 2009, 20 pages.
Dweep game description, printed from http://en.wikipedia.org/wiki/dweep on Oct. 7, 2009, 2 pages.
Fjords (board game) description, printed from http://en.wikipedia.org/wiki/fjords_(board_game) on Oct. 7, 2009, 1 page.
Frog Wild by Aristocrat Technologies Article, written by Strictly Slots, published Nov. 2001, 1 page.
Garfield Advertisement, written by Mikohn, published 2003, 1 page.
Gheos game description, printed from http://en.wikipedia.org/wiki/gheos on Oct. 7, 2009, 2 pages.
Gold Box game description, printed from http://en.wikipedia.org/wiki/gold_box on Oct. 7, 2009, 4 pages.
Heroes of Might and Magic game description, printed from http://en.wikipedia.org/wiki/heroes_of-might_and_magic on Oct. 7, 2009, 6 pages.
Hive (game) description, printed from http://en.wikipedia.org/wiki/hive_(game) on Oct. 7, 2009, 5 pages.
Iron Horse Board Game description, printed from http://boardgamegeek.com/boardgame/5100 on Oct. 7, 2009, 4 pages.
Klondike (solitaire) printed from htto://en.wikipedia.org/wiki/Klondike_(solitaire) on May 14, 2007, 3 pages.
Klondike printed from http://ww.solitairegames.com/Klondike.html on Jan. 30, 2007, 2 pages.
List of Maze Video Games description, printed from hhtp://en.wikipedia.org/wiki/maze_games on Oct. 7, 2009, 3 pages.
Mahjong game description, printed from http://en.wikipedia.org/wiki/mahjong on Oct. 7, 2009, 17 pages.
Maze game description, printed from http://en.wikipedia.org/wiki/maze on Oct. 27, 2009, 10 pages.
Metro Board Game description, printed from http://boardgamegeek.com/boardgame/559 on Oct. 7, 2009, 6 pages.
Metro-Cross game description, printed from hhtp://en.wikipedia.org/wiki/metro-cross on Oct. 7, 2009, 2 pages.
Neverwinter Nights (AOL game) description, printed from http://en.wikipedia.org/wiki/neverwinter_nights_(AOL_game) on Oct. 7, 2009, 3 pages.
Okey game description, printed from http://en.wikipedia.org/wiki/okey on Oct. 7, 2009, 1 page.
Online Solitaire Game Rules, Online Casion UK printed from http://casino.oddschecker.com/casino-game-review/game/solitaire on Jan. 30, 2007, 3 pages.
Pac-Man game description, printed from http://en.wikipedia.org/wiki/pac-man on Oct. 7, 2009, 13 pages.
Q*bert game description, printed from http://en.wikipedia.org/wiki/Q-bert on Oct. 7, 2009, 8 pages.
Quad-Ominos game description, printed from http://en.wikipedia.org/wiki/quad-ominos on Oct. 7, 2009, 2 pages.
Rules of Solitaire Games printed on http://ww.solitairegames.com/rules.html on Jan. 30, 2007, 2 pages.
Rummikub game description, printed from http://en.wikipedia.org/wiki/rummikub on Oct. 7, 2009, 6 pages.
Scrabble game description, printed from http://en.wikipedia.org/wiki/scrabble on Oct. 7, 2009, 17 pages.
SimCity game description, printed from http://en.wikipedia.org/wiki/simcity on Oct. 7, 2009, 9 pages.
Sliding Puzzle game description, printed from http://en.wikipedia.org/wiki/sliding_puzzle on Oct. 7, 2009, 3 pages.
Solitaire (Windows) printed from http://wikipedia.org/wiki/Solitaire_(Windows) on Apr. 14, 2008, 2 pages.
Solitaire and Patience games Rules—VIP Online Casino printed from http://www.vipcasino.com/help/rules/casino_solitaire.html on Jan. 30, 2007, 7 pages.
Solitaire Strategy printed from http://www.chessandpoker.com/solitaire strategy.html copyrighted in 2000, 10 pages.
Solitaire written by http://en.wikipedia.org/wiki/Solitaire printed Jan. 22, 2007, 5 pages.
Solitaire: Man Versus Machine written by Yan et al., available at least as early as Apr. 14, 2008, 8 pages.
Spaghetti Junction Board Game description, printed from http://boardgamegeek.com/boardgame/10486 on Oct. 7, 2009, 4 pages.
StarCraft game description, printed from http://en.wikipedia.org/wiki/starcraft on Oct. 7, 2009, 16 pages.
Steam Tunnel Board Game description, printed from http://boardgamegeek.com/boardgame/5837 on Oct. 7, 2009, 5 pages.
Streetcar Board Game description, printed from http://boardgamegeek.com/boardgame/1597 on Oct. 7, 2009, 6 pages.
Tantrix game description, printed from http://en.wikipedia.org/wiki/tantrix on Oct. 7, 2009, 4 pages.
Tetris game description, printed from http://en.wikipedia.org/wiki/tetris on Oct. 7, 2009, 15 pages.
The Ancient Art of War game description, printed from http://en.wikipedia.org/wiki/ancient_art_of_war on Oct. 7, 2009, 3 pages.
The Munsters Advertisement, written by IGT, published 2001, 4 pages.
The Settlers of Catan description, printed from http://en.wikipedia.org/wiki/the_settlers_of_catan on Oct. 7, 2009, 5 pages.
Tile-based game description, printed from http://en.wikipedia.org/wiki/tile-based_game on Oct. 7, 2009, 3 pages.
Totally Puzzled Video Slots Advertisement, written by IGT, published 2004, 2 pages.
Triominoes game description, printed from http://en.wikipedia.org/wiki/triominos on Oct. 7, 2009, 3 pages.
Triple Double Dollars Video Slots Advertisement, written by IGT, published 2004, 2 pages.
Tsuro Board Game description, printed from http://boardgamegeek.com/boardgame/16992 on Oct. 7, 2009, 6 pages.
Tsuro game description, printed from http://en.wikipedia.org/wiki/tsuro on Oct. 7, 2009, 1 page.
Ultima (series) game description, printed from http://en.wikipedia.org/wiki/ultima_(video_game-series) on Oct. 7, 2009, 8 pages.
Uno (card game) game description, printed from http://en.wikipedia.org/wiki/uno_(game) on Oct. 7, 2009, 9 pages.
Utopia (video game) description, printed from http://en.wikipedia.org/wiki/utopia_(video_game) on Oct. 7, 2009, 2 pages.
Xanadu Red/Black Advertisement, written by Atronic, published 2004, 1 page.
Zombies!!! Game description, printed from http://en.wikipedia.org/wiki/zombies!!! on Oct. 7, 2009, 4 pages.

* cited by examiner

FIG. 4

110

| Credits | Range value | Probability | Average |
|---|---|---|---|
| 5 | 368 | 26.286% | 1 |
| 10 | 378 | 27.000% | 3 |
| 15 | 362 | 25.857% | 4 |
| 20 | 83 | 5.929% | 1 |
| 25 | 120 | 8.571% | 2 |
| 30 | 20 | 1.429% | 0 |
| 35 | 6 | 0.429% | 0 |
| 40 | 7 | 0.500% | 0 |
| 50 | 25 | 1.786% | 1 |
| 75 | 9 | 0.643% | 0 |
| 100 | 10 | 0.714% | 1 |
| 125 | 1 | 0.071% | 0 |
| 150 | 1 | 0.071% | 0 |
| 200 | 3 | 0.214% | 0 |
| 250 | 2 | 0.143% | 0 |
| 300 | 1 | 0.071% | 0 |
| 400 | 1 | 0.071% | 0 |
| 500 | 2 | 0.143% | 1 |
| 1,000 | 1 | 0.071% | 1 |
| | 1,400 | | 17 |

FIG. 5

120

| Credits | Range value | Probability | Average |
|---|---|---|---|
| 20 | 323 | 15.058% | 3 |
| 25 | 558 | 26.014% | 7 |
| 30 | 430 | 20.047% | 6 |
| 40 | 446 | 20.793% | 8 |
| 50 | 255 | 11.888% | 6 |
| 75 | 40 | 1.865% | 1 |
| 100 | 60 | 2.797% | 3 |
| 150 | 5 | 0.233% | 0 |
| 200 | 12 | 0.559% | 1 |
| 250 | 5 | 0.233% | 1 |
| 300 | 2 | 0.093% | 0 |
| 400 | 1 | 0.047% | 0 |
| 500 | 4 | 0.186% | 1 |
| 1,000 | 2 | 0.093% | 1 |
| 1,500 | 1 | 0.047% | 1 |
| 2,000 | 1 | 0.047% | 1 |
| | 2,145 | | 40 |

FIG. 6A

130a

| Number of extra cards (in addition to the guaranteed Ace) | | | |
|---|---|---|---|
| # | Range value | Probability | Average |
| 1 | 129 | 0.50 | 0.50 |
| 2 | 110 | 0.42 | 0.85 |
| 3 | 19 | 0.07 | 0.22 |
| 4 | 2 | 0.01 | 0.03 |
| 5 | 0 | 0 | 0 |
| 6 | 0 | 0 | 0 |
| 7 | 0 | 0 | 0 |
| | 260 | | 1.59 |

FIG. 6B

130b

| Number of extra cards (in addition to the guaranteed Ace) | | | |
|---|---|---|---|
| # | Range value | Probability | Average |
| 1 | 108 | 0.43 | 0.43 |
| 2 | 110 | 0.44 | 0.88 |
| 3 | 27 | 0.11 | 0.32 |
| 4 | 4 | 0.02 | 0.06 |
| 5 | 1 | 0.00 | 0.02 |
| 6 | 0 | 0 | 0 |
| 7 | 0 | 0 | 0 |
| | 250 | | 1.72 |

FIG. 6C

130c

| Number of extra cards (in addition to the guaranteed Ace) | | | |
|---|---|---|---|
| # | Range value | Probability | Average |
| 1 | 24 | 0.29 | 0.29 |
| 2 | 30 | 0.37 | 0.73 |
| 3 | 15 | 0.18 | 0.55 |
| 4 | 8 | 0.10 | 0.39 |
| 5 | 3 | 0.04 | 0.18 |
| 6 | 1 | 0.01 | 0.07 |
| 7 | 1 | 0.01 | 0.09 |
| | 82 | | 2.30 |

FIG. 6D

130d

| Number of extra cards (in addition to the guaranteed Ace) | | | |
|---|---|---|---|
| # | Range value | Probability | Average |
| 1 | 20 | 0.27 | 0.27 |
| 2 | 23 | 0.31 | 0.61 |
| 3 | 15 | 0.20 | 0.60 |
| 4 | 10 | 0.13 | 0.53 |
| 5 | 4 | 0.05 | 0.27 |
| 6 | 2 | 0.03 | 0.16 |
| 7 | 1 | 0.01 | 0.09 |
| | 75 | | 2.53 |

FIG. 6E

130e

| Number of extra cards (in addition to the guaranteed Ace) | | | |
|---|---|---|---|
| # | Range value | Probability | Average |
| 1 | 2 | 0.03 | 0.03 |
| 2 | 22 | 0.35 | 0.71 |
| 3 | 16 | 0.26 | 0.77 |
| 4 | 13 | 0.21 | 0.84 |
| 5 | 5 | 0.08 | 0.40 |
| 6 | 2 | 0.03 | 0.19 |
| 7 | 1 | 0.02 | 0.11 |
| 8 | 1 | 0.02 | 0.13 |
| | 62 | | 3.19 |

FIG. 6F

130f

| Number of extra cards (in addition to the guaranteed Ace) | | | |
|---|---|---|---|
| # | Range value | Probability | Average |
| 1 | 2 | 0.03 | 0.03 |
| 2 | 22 | 0.34 | 0.69 |
| 3 | 16 | 0.25 | 0.75 |
| 4 | 13 | 0.20 | 0.81 |
| 5 | 6 | 0.09 | 0.47 |
| 6 | 2 | 0.03 | 0.19 |
| 7 | 1 | 0.02 | 0.11 |
| 8 | 1 | 0.02 | 0.13 |
| 9 | 1 | 0.02 | 0.14 |
| | 64 | | 3.31 |

GAMING SYSTEM, GAMING DEVICE AND METHOD FOR PROVIDING A GAME HAVING A DYNAMIC AWARD SCHEME

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND

Various different casual games are well known and widely played. Casual games, in contrast to more complex video games, typically have simple rules and generally require no long-term time commitment or special skills to play. Casual games often enable a player to play one or more levels in a relatively short amount of time. Certain known casual games are somewhat more complicated at least in part because they require strategy or skill, but still have simple rules and are relatively easy to play. For example, casual games such as Klondike Solitaire and Sudoku have simple rules, but take longer and are somewhat more complicated to play. Due to their simplicity and convenience, casual games generally appeal to a wide demographic of players including both older and younger players, "tech savvy" and less "tech savvy" players, and both male and female players. Many casual games appeal to demographics which are generally not as interested in playing more complex video games, and the appeal of casual games continues to grow.

One significant problem with converting many casual games into wagering games is that while having simple rules and being easy to play, they are very statistically complicated and unpredictable because of the strategy or skill involved. For example, some people estimate that there are billions of possible different ways that a Klondike Solitaire game can be played with a standard 52 card deck based on the order of the cards and the movements of the cards by the player. Although a very complex optimal strategy for Klondike Solitaire could be derived similar to those derived for poker games, because so many scenarios exist, it would very difficult for a player to master that optimal strategy and accordingly, most players play according to a suboptimal strategy. Accordingly, despite the vast popularity of Klondike Solitaire, the exact average or proportion of Klondike Solitaire games that will be won (versus those which will be lost) has not been demonstrated to an absolute certainty and no consensus exists as to the probabilities associated with various non-winning game outcomes for each play of the game (i.e., the probability associated with having each of a number of less than 52 cards banked at the end of a game or before a player can not make any further moves of the cards). Similarly, formulas for determining such probabilities within suitable determinable margins of error or limited tolerances are not known, primarily because of the large amount of variables. Casino or gambling games typically require all of the exact probabilities or probabilities within limited tolerances of winning a game to be known, calculated and verifiable. For example, a three reel slot game will have all of the outcome probabilities worked out exactly. Because the probabilities of many casual games such as Klondike Solitaire games are not known or calculated (within suitable tolerances) even with intense study, many casual games such as Klondike Solitaire have not been made into suitable casino or wagering games.

Many other more complicated games requiring relatively more skill, or having more complex rules, or both, are also available to players in electronic form, but not as wagering games. For example, crossword puzzles, checkers, chess, backgammon, SCRABBLE®, bridge, hearts, and OTHELLO® are much more complicated and can require significant player knowledge or skill. SCRABBLE® is a registered trademark of Hasbro Inc. and OTHELLO® is a registered trademark of Anjar Co. While these games have been modified to enable a single player to play electronically, such as against a computer or against another player playing the game at another computer, such games have also not been successfully converted into wagering games without significant change to the underlying rules. Just like the relatively simpler casual games discussed above, one problem with converting these relatively more complicated games into wagering games is that while easy to offer in a user-friendly electronic format, they are also very statistically complicated.

Accordingly, a need exists for new wagering gaming systems and methods which provide statistically complex games as suitable wagering games.

SUMMARY

Various embodiments of the present disclosure solve the above problems by providing gaming systems, gaming devices and methods which have casual games with dynamic award schemes. In various embodiments, each game has a designated number of elements such as positions, moveable elements, or the combination of positions and moveable elements. For each play of the wagering game, the gaming system: (a) receives a wager from a player for that play of the wagering game; (b) determines a number of the designated number of elements which will function as or be designated as payout elements for that play of the wagering game; (c) determines which of the designated number of elements to make the payout elements for that play of the wagering game; (d) for each payout element, determines the payout value associated with that payout element for that play of the wagering game; and (e) determines a game ending condition for that play of the wagering game.

The gaming system enables the player to play the wagering game in accordance with the predetermined rules of the wagering game. This includes enabling the player to employ the elements until the game ending condition occurs. For each payout element, if that payout element is employed in that play of the wagering game in a designated manner in accordance with the predetermined rules of the wagering game, the gaming system provides the player the payout value associated with that payout element.

It should be appreciated that the number of elements that are payout elements will preferably be less than all of the elements in the game, and that the designated number of elements and the number of those elements that are payout elements will vary depending upon the game or type of game. For example, in various embodiments, a Klondike Solitaire game has 52 elements (cards), a Sudoku game has 81 elements (grid positions) and a chess game has 32 elements (chess pieces).

In various embodiments, the player's wager on that play of the game may be at least in part determinative of one or more of: (a) the number of the designated number of elements which will function as or be designated as payout elements for that play of the wagering game (e.g., the higher the player's wager, the more elements may be payout elements); (b) which of the designated number of elements to make the payout elements for that play of the wagering game (e.g., the higher the player's wager, the higher the probability that certain elements which are more likely to be employed in the designated manner may be payout elements); (c) the payout value associated with one or more payout elements for that play of the wagering game (e.g., the higher the player's wager, the higher the payout value may be); and (d) the game ending condition for that play of the wagering game (e.g., if the game ending condition is the expiration of an amount of time, the player may receive more time for a higher wager).

It should be appreciated that in various embodiments, the disclosed dynamic award scheme enables gaming system providers to assign payout element status and respective awards to elements in games having a designated number of elements, without changing the underlying rules of the game. Overlaying the disclosed dynamic award scheme (payout elements) onto a pre-existing game enables gaming system providers to provide wagering games which could not otherwise be offered as wagering games without significantly changing the rules of the games.

Other objects, features and advantages of the invention will be apparent from the following detailed disclosure, taken in conjunction with the accompanying sheets of drawings, wherein like numerals refer to like parts, elements, components, steps and processes.

BRIEF DESCRIPTION OF THE FIGURES

FIG. 4 is an example payout element specific paytable for one example embodiment of a game of the present disclosure.

FIG. 5 is an example game win paytable for one example embodiment of a game of the present disclosure.

FIGS. 6A, 6B, 6C, 6D, 6E, and 6F are example tables used to randomly determine a number of payout elements for a play of one embodiment of a card game of the present disclosure.

DETAILED DESCRIPTION

The present disclosure may be implemented in various configurations for gaming machines, gaming devices, or gaming systems, including but not limited to: (1) a dedicated gaming machine, gaming device, or gaming system wherein the computerized instructions for controlling any games (which are provided by the gaming machine or gaming device) are provided with the gaming machine or gaming device prior to delivery to a gaming establishment; and (2) a changeable gaming machine, gaming device, or gaming system wherein the computerized instructions for controlling any games (which are provided by the gaming machine or gaming device) are downloadable to the gaming machine or gaming device through a data network after the gaming machine or gaming device is in a gaming establishment. In one embodiment, the computerized instructions for controlling any games are executed by at least one central server, central controller, or remote host. In such a "thin client" embodiment, the central server remotely controls any games (or other suitable interfaces) and the gaming device is utilized to display such games (or suitable interfaces) and receive one or more inputs or commands from a player. In another embodiment, the computerized instructions for controlling any games are communicated from the central server, central controller, or remote host to a gaming device local processor and memory devices. In such a "thick client" embodiment, the gaming device local processor executes the communicated computerized instructions to control any games (or other suitable interfaces) provided to a player.

In one embodiment, one or more gaming devices in a gaming system may be thin client gaming devices and one or more gaming devices in the gaming system may be thick client gaming devices. In another embodiment, certain functions of the gaming device are implemented in a thin client environment and certain other functions of the gaming device are implemented in a thick client environment. In one such embodiment, computerized instructions for controlling any primary games are communicated from the central server to the gaming device in a thick client configuration and computerized instructions for controlling any secondary games or bonus functions are executed by a central server in a thin client configuration.

Figure 1A:
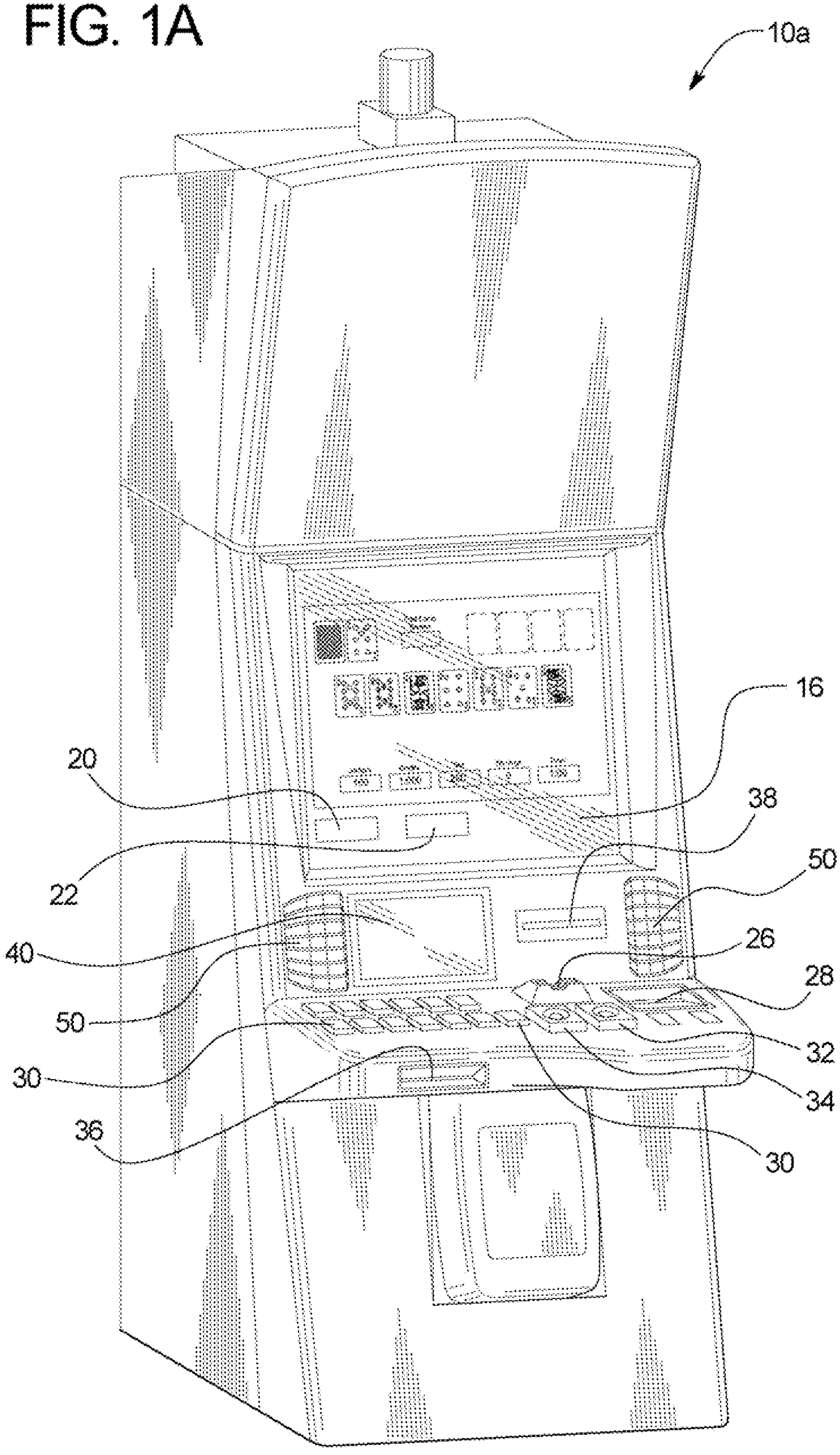
FIGS. 1A and 1B are front perspective views of alternative embodiments of gaming devices disclosed herein.
Figure 1B:
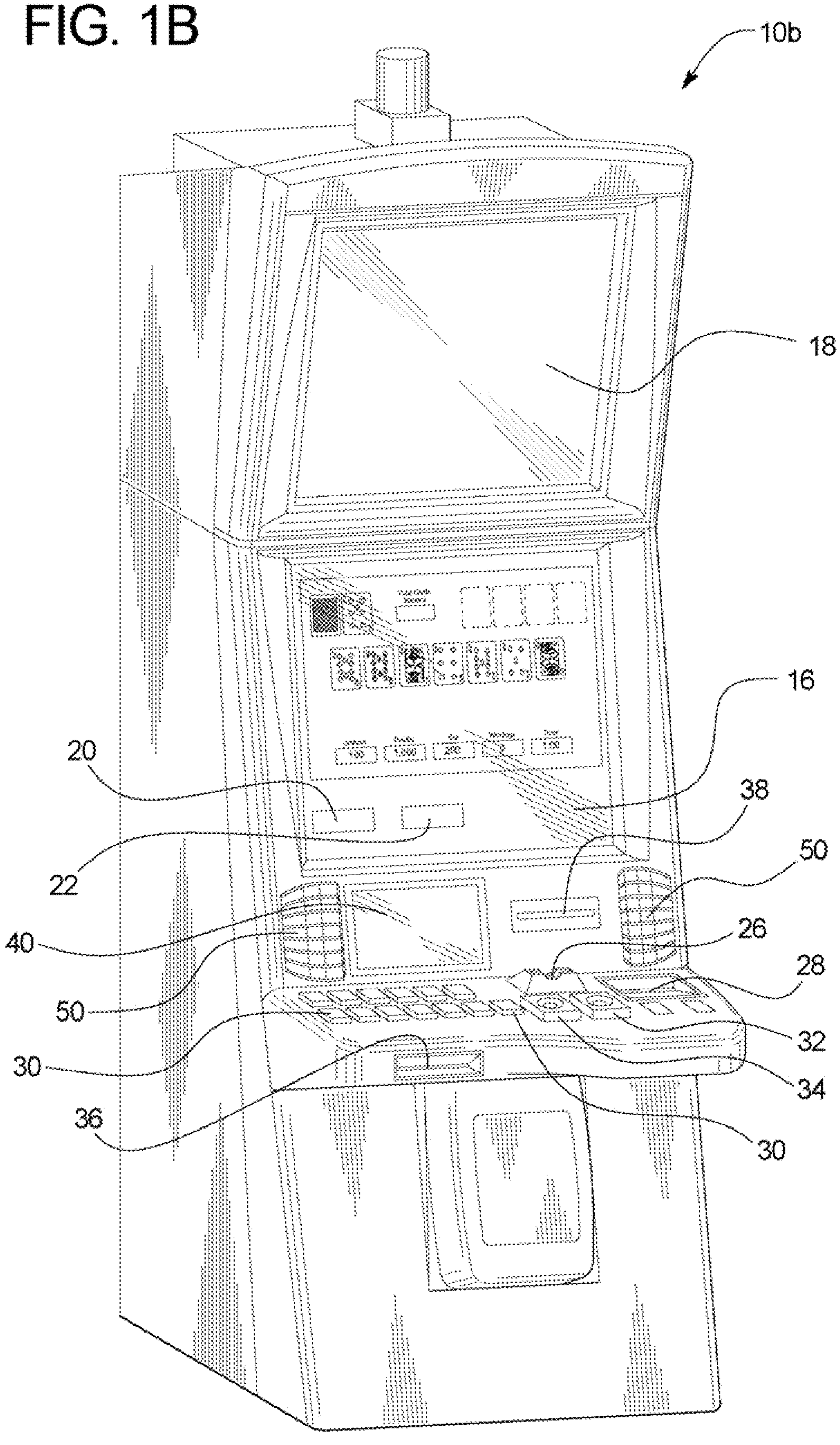

Referring now to the drawings, two example alternative embodiments of a gaming device disclosed herein are illustrated in FIGS. 1A and 1B as gaming device 10*a* and gaming device 10*b*, respectively. Gaming device 10*a* and/or gaming device 10*b* are generally referred to herein as gaming device 10.

In the embodiments illustrated in FIGS. 1A and 1B, gaming device 10 has a support structure, housing, or cabinet which provides support for a plurality of displays, inputs, controls, and other features of a conventional gaming machine. It is configured so that a player can operate it while standing or sitting. The gaming device can be positioned on a base or stand or can be configured as a pub-style table-top game (not shown) which a player can operate preferably while sitting. As illustrated by the different configurations shown in FIGS. 1A and 1B, the gaming device may have varying cabinet and display configurations.

Figure 2A:
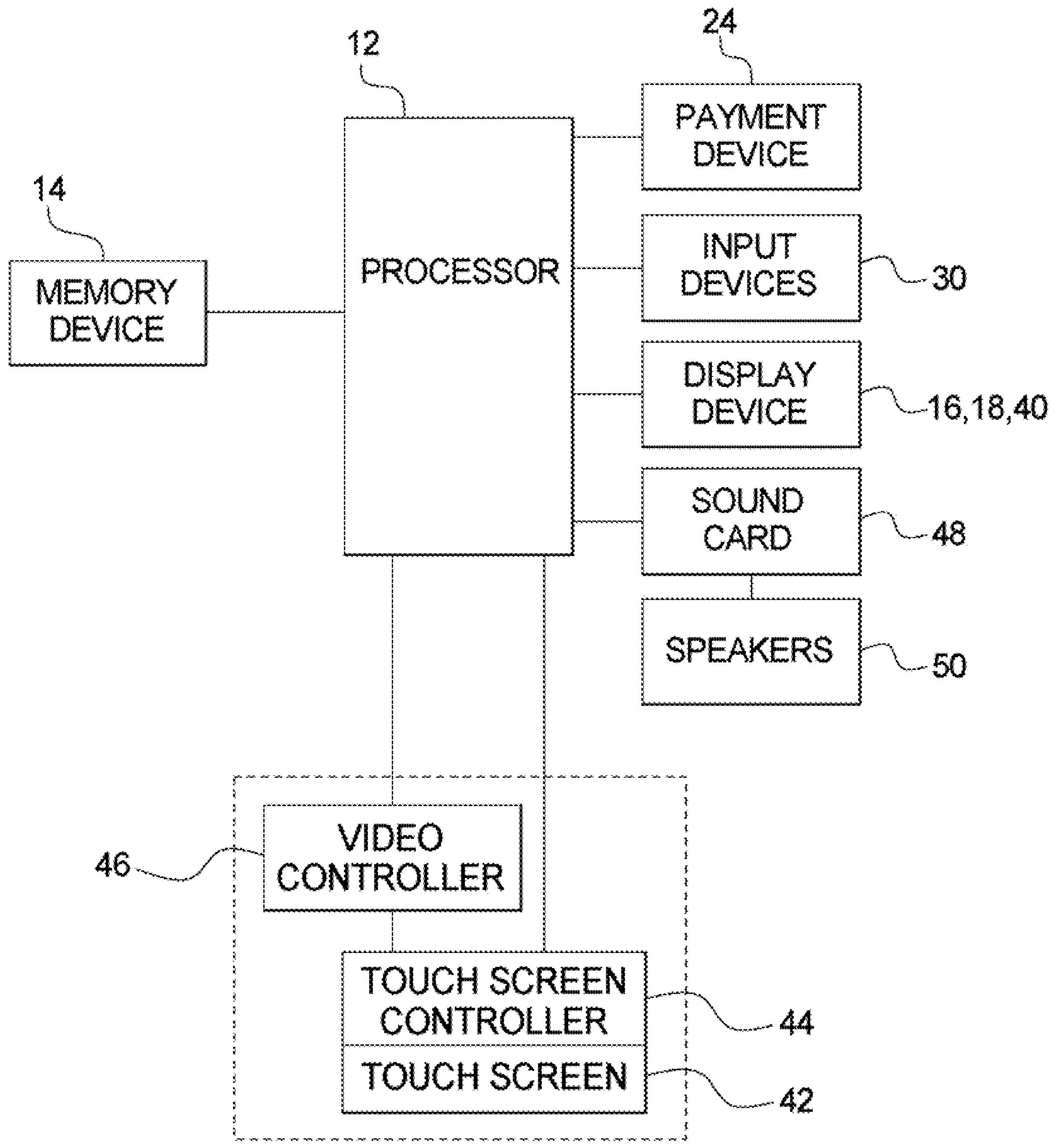
FIG. 2A is a schematic block diagram of the electronic configuration of one embodiment of a gaming device disclosed herein.

In one embodiment, as illustrated in FIG. 2A, the gaming device preferably includes at least one processor 12, such as a microprocessor, a microcontroller-based platform, a suitable integrated circuit or one or more application-specific integrated circuits (ASIC's). The processor is in communication with or operable to access or to exchange signals with at least one data storage or memory device 14. In one embodiment, the processor and the memory device reside within the cabinet of the gaming device. The memory device stores program code and instructions, executable by the processor, to control the gaming device. The memory device also stores other data such as image data, event data, player input data, random or pseudo-random number generators, pay-table data or information, and applicable game rules that relate to the play of the gaming device. In one embodiment, the memory device includes random access memory (RAM), which can include non-volatile RAM (NVRAM), magnetic RAM (MRAM), ferroelectric RAM (FeRAM), and other forms as commonly understood in the gaming industry. In one embodiment, the memory device includes read only memory (ROM). In one embodiment, the memory device includes flash memory and/or EEPROM (electrically erasable programmable read only memory). Any other suitable magnetic, optical, and/or semiconductor memory may operate in conjunction with the gaming device disclosed herein.

In one embodiment, part or all of the program code and/or operating data described above can be stored in a detachable or removable memory device, including, but not limited to, a suitable cartridge, disk, CD ROM, DVD, or USB memory device. In other embodiments, part or all of the program code and/or operating data described above can be downloaded to the memory device through a suitable network.

In one embodiment, an operator or a player can use such a removable memory device in a desktop computer, a laptop computer, a personal digital assistant (PDA), a portable computing device, or another computerized platform to implement the present disclosure. In one embodiment, the gaming device or gaming machine disclosed herein is operable over a wireless network, for example part of a wireless gaming system. In this embodiment, the gaming machine may be a hand-held device, a mobile device, or any other suitable wireless device that enables a player to play any suitable game at a variety of different locations. It should be appreciated that a gaming device or gaming machine as disclosed herein may be a device that has obtained approval from a regulatory gaming commission or a device that has not obtained approval from a regulatory gaming commission. It should be appreciated that the processor and memory device may be collectively referred to herein as a "computer" or "controller."

In one embodiment, as discussed in more detail below, the gaming device randomly generates awards and/or other game outcomes based on probability data. In one such embodiment, this random determination is provided through utilization of a random number generator (RNG), such as a true random number generator, a pseudo random number generator, or other suitable randomization process. In one embodiment, each award or other game outcome is associated with a probability and the gaming device generates the award or other game outcome to be provided to the player based on the associated probabilities. In this embodiment, since the gaming device generates outcomes randomly or based upon one or more probability calculations, there is no certainty that the gaming device will ever provide the player with any specific award or other game outcome.

In another embodiment, as discussed in more detail below, the gaming device employs a predetermined or finite set or pool of awards or other game outcomes. In this embodiment, as each award or other game outcome is provided to the player, the gaming device flags or removes the provided award or other game outcome from the predetermined set or pool. Once flagged or removed from the set or pool, the specific provided award or other game outcome from that specific pool cannot be provided to the player again. This type of gaming device provides players with all of the available awards or other game outcomes over the course of the play cycle and guarantees the amount of actual wins and losses.

In another embodiment, as discussed below, upon a player initiating game play at the gaming device, the gaming device enrolls in a bingo game. In this embodiment, a bingo server calls the bingo balls that result in a specific bingo game outcome. The resultant game outcome is communicated to the individual gaming device to be provided to a player. In one embodiment, this bingo outcome is displayed to the player as a bingo game and/or in any form in accordance with the present disclosure.

In one embodiment, as illustrated in FIG. 2A, the gaming device includes one or more display devices controlled by the processor. The display devices are preferably connected to or mounted on the cabinet of the gaming device. The embodiment shown in FIG. 1A includes a central display device 16 which displays a primary game. This display device may also display any suitable secondary game associated with the primary game as well as information relating to the primary or secondary game. The alternative embodiment shown in FIG. 1B includes a central display device 16 and an upper display device 18. The upper display device may display the primary game, any suitable secondary game associated or not associated with the primary game and/or information relating to the primary or secondary game. These display devices may also serve as digital glass operable to advertise games or other aspects of the gaming establishment. As seen in FIGS. 1A and 1B, in one embodiment, the gaming device includes a credit display 20 which displays a player's current number of credits, cash, account balance, or the equivalent. In one embodiment, the gaming device includes a bet display 22 which displays a player's amount wagered. In one embodiment, as described in more detail below, the gaming device includes a player tracking display 40 which displays information regarding a player's play tracking status.

In another embodiment, at least one display device may be a mobile display device, such as a PDA or tablet PC, that enables play of at least a portion of the primary or secondary game at a location remote from the gaming device.

The display devices may include, without limitation, a monitor, a television display, a plasma display, a liquid crystal display (LCD) a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In one embodiment, as described in more detail below, the display device includes a touch-screen with an associated touch-screen controller. The display devices may be of any suitable size and configuration, such as a square, a rectangle or an elongated rectangle.

The display devices of the gaming device are configured to display at least one and preferably a plurality of game or other suitable images, symbols and indicia such as any visual representation or exhibition of the movement of objects such as mechanical, virtual, or video reels and wheels, dynamic lighting, video images, images of people, characters, places, things, faces of cards, and the like.

In one alternative embodiment, the symbols, images and indicia displayed on or of the display device may be in mechanical form. That is, the display device may include any electromechanical device, such as one or more mechanical objects, such as one or more rotatable wheels, reels, or dice, configured to display at least one or a plurality of game or other suitable images, symbols or indicia.

As illustrated in FIG. 2A, in one embodiment, the gaming device includes at least one payment device 24 in communication with the processor. As seen in FIGS. 1A and 1B, a payment device such as a payment acceptor includes a note, ticket or bill acceptor 28 wherein the player inserts paper money, a ticket, or voucher and a coin slot 26 where the player inserts money, coins, or tokens. In other embodiments, payment devices such as readers or validators for credit cards, debit cards or credit slips may accept payment. In one embodiment, a player may insert an identification card into a card reader of the gaming device. In one embodiment, the identification card is a smart card having a programmed microchip, a coded magnetic strip or coded rewritable magnetic strip, wherein the programmed microchip or magnetic strips are coded with a player's identification, credit totals (or related data), and/or other relevant information. In another embodiment, a player may carry a portable device, such as a cell phone, a radio frequency identification tag, or any other suitable wireless device, which communicates a player's identification, credit totals (or related data), and other relevant information to the gaming device. In one embodiment, money may be transferred to a gaming device through electronic funds transfer. When a player funds the gaming device, the processor determines the amount of funds entered and displays the corresponding amount on the credit or other suitable display as described above.

As seen in FIGS. 1A, 1B, and 2A, in one embodiment the gaming device includes at least one and preferably a plurality of input devices 30 in communication with the processor. The input devices can include any suitable device which enables the player to produce an input signal which is received by the processor. In one embodiment, after appropriate funding of the gaming device, the input device is a game activation device, such as a play button 32 or a pull arm (not shown) which is used by the player to start any primary game or sequence of events in the gaming device. The play button can be any suitable play activator such as a bet one button, a max bet button, or a repeat the bet button. In one embodiment, upon appropriate funding, the gaming device begins the game play automatically. In another embodiment, upon the player engaging one of the play buttons, the gaming device automatically activates game play.

In one embodiment, one input device is a bet one button. The player places a bet by pushing the bet one button. The player can increase the bet by one credit each time the player pushes the bet one button. When the player pushes the bet one button, the number of credits shown in the credit display preferably decreases by one, and the number of credits shown in the bet display preferably increases by one. In another embodiment, one input device is a bet max button (not shown) which enables the player to bet the maximum wager permitted for a game of the gaming device.

In one embodiment, one input device is a cash out button 34. The player may push the cash out button and cash out to receive a cash payment or other suitable form of payment corresponding to the number of remaining credits. In one embodiment, when the player cashes out, a payment device, such as a ticket, payment, or note generator 36 prints or otherwise generates a ticket or credit slip to provide to the player. The player receives the ticket or credit slip and may redeem the value associated with the ticket or credit slip via a cashier (or other suitable redemption system). In another embodiment, when the player cashes out, the player receives the coins or tokens in a coin payout tray. It should be appreciated that any suitable payout mechanisms, such as funding to the player's electronically recordable identification card or smart card, may be implemented in accordance with the gaming device disclosed herein.

In one embodiment, as mentioned above and as seen in FIG. 2A, one input device is a touch-screen 42 coupled with a touch-screen controller 44 or some other touch-sensitive display overlay to allow for player interaction with the images on the display. The touch-screen and the touch-screen controller are connected to a video controller 46. A player can make decisions and input signals into the gaming device by touching the touch-screen at the appropriate locations. One such input device is a conventional touch-screen button panel.

The gaming device may further include a plurality of communication ports for enabling communication of the processor with external peripherals, such as external video sources, expansion buses, game or other displays, a SCSI port, or a keypad.

In one embodiment, as seen in FIG. 2A, the gaming device includes a sound generating device controlled by one or more sounds cards 48 which function in conjunction with the processor. In one embodiment, the sound generating device includes at least one and preferably a plurality of speakers 50 or other sound generating hardware and/or software for generating sounds, such as by playing music for the primary and/or secondary game or by playing music for other modes of the gaming device, such as an attract mode. In one embodiment, the gaming device provides dynamic sounds coupled with attractive multimedia images displayed on one or more of the display devices to provide an audio-visual representation or to otherwise display full-motion video with sound to attract players to the gaming device. During idle periods, the gaming device may display a sequence of audio and/or visual attraction messages to attract potential players to the gaming device. The videos may also be customized to provide any appropriate information.

In one embodiment, the gaming machine may include a sensor, such as a camera, in communication with the processor (and possibly controlled by the processor), that is selectively positioned to acquire an image of a player actively using the gaming device and/or the surrounding area of the gaming device. In one embodiment, the camera may be configured to selectively acquire still or moving (e.g., video) images and may be configured to acquire the images in an analog, digital, or other suitable format. The display devices may be configured to display the image acquired by the camera as well as to display the visible manifestation of the game in split screen or picture-in-picture fashion. For example, the camera may acquire an image of the player and the processor may incorporate that image into the primary and/or secondary game as a game image, symbol or indicia.

Gaming device 10 can incorporate any suitable wagering game as the primary or base game. The gaming machine or device may include some or all of the features of conventional gaming machines or devices. The primary or base game may comprise any suitable reel-type game, card game, cascading or falling symbol game, number game, or other game of chance susceptible to representation in an electronic or electromechanical form, which in one embodiment produces a random outcome based on probability data at the time of or after placement of a wager. That is, different primary wagering games, such as video poker games, video blackjack games, video keno, video bingo or any other suitable primary or base game may be implemented.

In one embodiment, as illustrated in FIGS. 1A and 1B, a base or primary game may be a slot game with one or more paylines 52. The paylines may be horizontal, vertical, circular, diagonal, angled or any combination thereof. In this embodiment, the gaming device includes at least one and preferably a plurality of reels 54, such as three to five reels 54, in either electromechanical form with mechanical rotating reels or video form with simulated reels and movement thereof. In one embodiment, an electromechanical slot machine includes a plurality of adjacent, rotatable reels which may be combined and operably coupled with an electronic display of any suitable type. In another embodiment, if the reels 54 are in video form, one or more of the display devices, as described above, displays the plurality of simulated video reels 54. Each reel 54 displays a plurality of indicia or symbols, such as bells, hearts, fruits, numbers, letters, bars, or other images which preferably correspond to a theme associated with the gaming device. In another embodiment, one or more of the reels are independent reels or unisymbol reels. In this embodiment, each independent or unisymbol reel generates and displays one symbol to the player. In one embodiment, the gaming device awards prizes after the reels of the primary game stop spinning if specified types and/or configurations of indicia or symbols occur on an active payline or otherwise occur in a winning pattern, occur on the requisite number of adjacent reels and/or occur in a scatter pay arrangement.

In an alternative embodiment, rather than determining any outcome to provide to the player by analyzing the symbols generated on any wagered upon paylines as described above, the gaming device determines any outcome to provide to the player based on the number of associated symbols which are generated in active symbol positions on the requisite number of adjacent reels (i.e., not on paylines passing through any displayed winning symbol combinations). In this embodiment, if a winning symbol combination is generated on the reels, the gaming device provides the player one award for that occurrence of the generated winning symbol combination. For example, if one winning symbol combination is generated on the reels, the gaming device will provide a single award to the player for that winning symbol combination (i.e., not based on the number of paylines that would have passed through that winning symbol combination). It should be appreciated that because a gaming device that enables wagering on ways to win provides the player one award for a single occurrence of a winning symbol combination and a gaming device with paylines may provide the player more than one award for the same occurrence of a single winning symbol combination (i.e., if a plurality of paylines each pass through the same winning symbol combination), it is possible to provide a player at a ways to win gaming device with more ways to win for an equivalent bet or wager on a traditional slot gaming device with paylines.

In one embodiment, the total number of ways to win is determined by multiplying the number of symbols generated in active symbol positions on a first reel by the number of symbols generated in active symbol positions on a second reel by the number of symbols generated in active symbol positions on a third reel and so on for each reel of the gaming device with at least one symbol generated in an active symbol position. For example, a three reel gaming device with three symbols generated in active symbol positions on each reel includes 27 ways to win (i.e., 3 symbols on the first reel×3 symbols on the second reel×3 symbols on the third reel). A four reel gaming device with three symbols generated in active symbol positions on each reel includes 81 ways to win (i.e., 3 symbols on the first reel×3 symbols on the second reel×3 symbols on the third reel×3 symbols on the fourth reel). A five reel gaming device with three symbols generated in active symbol positions on each reel includes 243 ways to win (i.e., 3 symbols on the first reel×3 symbols on the second reel×3 symbols on the third reel×3 symbols on the fourth reel×3 symbols on the fifth reel). It should be appreciated that modifying the number of generated symbols by either modifying the number of reels or modifying the number of symbols generated in active symbol positions by one or more of the reels modifies the number of ways to win.

In another embodiment, the gaming device enables a player to wager on and thus activate symbol positions. In one such embodiment, the symbol positions are on the reels. In this embodiment, if based on the player's wager, a reel is activated, then each of the symbol positions of that reel will be activated and each of the active symbol positions will be part of one or more of the ways to win. In one embodiment, if based on the player's wager, a reel is not activated, then a designated number of default symbol positions, such as a single symbol position of the middle row of the reel, will be activated and the default symbol position(s) will be part of one or more of the ways to win. This type of gaming machine enables a player to wager on one, more than one or all of the reels and the processor of the gaming device uses the number of wagered on reels to determine the active symbol positions and the number of possible ways to win. In alternative embodiments, (1) no symbols are displayed as generated at any of the inactive symbol positions, or (2) any symbols generated at any inactive symbol positions may be displayed to the player but suitably shaded or otherwise designated as inactive.

In one embodiment wherein a player wagers on one or more reels, a player's wager of one credit may activate each of the three symbol positions on a first reel, wherein one default symbol position is activated on each of the remaining four reels. In this example, as described above, the gaming device provides the player three ways to win (i.e., 3 symbols on the first reel×1 symbol on the second reel×1 symbol on the third reel×1 symbol on the fourth reel×1 symbol on the fifth reel). In another example, a player's wager of nine credits may activate each of the three symbol positions on a first reel, each of the three symbol positions on a second reel and each of the three symbol positions on a third reel wherein one default symbol position is activated on each of the remaining two reels. In this example, as described above, the gaming device provides the player twenty-seven ways to win (i.e., 3 symbols on the first reel×3 symbols on the second reel×3 symbols on the third reel×1 symbol on the fourth reel×1 symbol on the fifth reel).

In one embodiment, to determine any award(s) to provide to the player based on the generated symbols, the gaming device individually determines if a symbol generated in an active symbol position on a first reel forms part of a winning symbol combination with or is otherwise suitably related to a symbol generated in an active symbol position on a second reel. In this embodiment, the gaming device classifies each pair of symbols which form part of a winning symbol combination (i.e., each pair of related symbols) as a string of related symbols. For example, if active symbol positions include a first cherry symbol generated in the top row of a first reel and a second cherry symbol generated in the bottom row of a second reel, the gaming device classifies the two cherry symbols as a string of related symbols because the two cherry symbols form part of a winning symbol combination.

After determining if any strings of related symbols are formed between the symbols on the first reel and the symbols on the second reel, the gaming device determines if any of the symbols from the next adjacent reel should be added to any of the formed strings of related symbols. In this embodiment, for a first of the classified strings of related symbols, the gaming device determines if any of the symbols generated by the next adjacent reel form part of a winning symbol combination or are otherwise related to the symbols of the first string of related symbols. If the gaming device determines that a symbol generated on the next adjacent reel is related to the symbols of the first string of related symbols, that symbol is subsequently added to the first string of related symbols. For example, if the first string of related symbols is the string of related cherry symbols and a related cherry symbol is generated in the middle row of the third reel, the gaming device adds the related cherry symbol generated on the third reel to the previously classified string of cherry symbols.

On the other hand, if the gaming device determines that no symbols generated on the next adjacent reel are related to the symbols of the first string of related symbols, the gaming device marks or flags such string of related symbols as complete. For example, if the first string of related symbols is the string of related cherry symbols and none of the symbols of the third reel are related to the cherry symbols of the previously classified string of cherry symbols, the gaming device marks or flags the string of two cherry symbols as complete.

After either adding a related symbol to the first string of related symbols or marking the first string of related symbols as complete, the gaming device proceeds as described above for each of the remaining classified strings of related symbols which were previously classified or formed from related symbols on the first and second reels.

After analyzing each of the remaining strings of related symbols, the gaming device determines, for each remaining pending or incomplete string of related symbols, if any of the symbols from the next adjacent reel, if any, should be added to any of the previously classified strings of related symbols. This process continues until either each string of related symbols is complete or there are no more adjacent reels of symbols to analyze. In this embodiment, where there are no more adjacent reels of symbols to analyze, the gaming device marks each of the remaining pending strings of related symbols as complete.

When each of the strings of related symbols is marked complete, the gaming device compares each of the strings of related symbols to an appropriate paytable and provides the player any award associated with each of the completed strings of symbols. It should be appreciated that the player is provided one award, if any, for each string of related symbols generated in active symbol positions (i.e., as opposed to a quantity of awards being based on how many paylines that would have passed through each of the strings of related symbols in active symbol positions).

In one embodiment, a base or primary game may be a poker game wherein the gaming device enables the player to play a conventional game of video draw poker and initially deals five cards all face up from a virtual deck of fifty-two cards. Cards may be dealt as in a traditional game of cards or in the case of the gaming device, the cards may be randomly selected from a predetermined number of cards. If the player wishes to draw, the player selects the cards to hold via one or more input devices, such as by pressing related hold buttons or via the touch screen. The player then presses the deal button and the unwanted or discarded cards are removed from the display and the gaming machine deals the replacement cards from the remaining cards in the deck. This results in a final five-card hand. The gaming device compares the final five-card hand to a payout table which utilizes conventional poker hand rankings to determine the winning hands. The gaming device provides the player with an award based on a winning hand and the number of credits the player wagered.

In another embodiment, the base or primary game may be a multi-hand version of video poker. In this embodiment, the gaming device deals the player at least two hands of cards. In one such embodiment, the cards are the same cards. In one embodiment each hand of cards is associated with its own deck of cards. The player chooses the cards to hold in a primary hand. The held cards in the primary hand are also held in the other hands of cards. The remaining non-held cards are removed from each hand displayed and for each hand replacement cards are randomly dealt into that hand. Since the replacement cards are randomly dealt independently for each hand, the replacement cards for each hand will usually be different. The poker hand rankings are then determined hand by hand against a payout table and awards are provided to the player.

In one embodiment, a base or primary game may be a keno game wherein the gaming device displays a plurality of selectable indicia or numbers on at least one of the display devices. In this embodiment, the player selects at least one bit potentially a plurality of the selectable indicia or numbers via an input device such as a touch screen. The gaming device then displays a series of drawn numbers and determine an amount of matches, if any, between the player's selected numbers and the gaming device's drawn numbers. The player is provided an award based on the amount of matches, if any, based on the amount of determined matches and the number of numbers drawn.

In one embodiment, in addition to winning credits or other awards in a base or primary game, the gaming device may also give players the opportunity to win credits in a bonus or secondary game or in a bonus or secondary round. The bonus or secondary game enables the player to obtain a prize or payout in addition to the prize or payout, if any, obtained from the base or primary game. In general, a bonus or secondary game produces a significantly higher level of player excitement than the base or primary game because it provides a greater expectation of winning than the base or primary game, and is accompanied with more attractive or unusual features than the base or primary game. In one embodiment, the bonus or secondary game may be any type of suitable game, either similar to or completely different from the base or primary game.

In one embodiment, the triggering event or qualifying condition may be a selected outcome in the primary game or a particular arrangement of one or more indicia on a display device in the primary game, such as the number seven appearing on three adjacent reels along a payline in the primary slot game embodiment seen in FIGS. 1A and 1B. In other embodiments, the triggering event or qualifying condition occurs based on exceeding a certain amount of game play (such as number of games, number of credits, amount of time), or reaching a specified number of points earned during game play.

In another embodiment, the gaming device processor 12 or central controller 56 randomly provides the player one or more plays of one or more secondary games. In one such embodiment, the gaming device does not provide any apparent reason to the player for qualifying to play a secondary or bonus game. In this embodiment, qualifying for a bonus game is not triggered by an event in or based specifically on any of the plays of any primary game. That is, the gaming device may simply qualify a player to play a secondary game without any explanation or alternatively with simple explanations. In another embodiment, the gaming device (or central server) qualifies a player for a secondary game at least partially based on a game triggered or symbol triggered event, such as at least partially based on the play of a primary game.

In one embodiment, the gaming device includes a program which will automatically begin a bonus round after the player has achieved a triggering event or qualifying condition in the base or primary game. In another embodiment, after a player has qualified for a bonus game, the player may subsequently enhance his/her bonus game participation through continued play on the base or primary game. Thus, for each bonus qualifying event, such as a bonus symbol, that the player obtains, a given number of bonus game wagering points or credits may be accumulated in a "bonus meter" programmed to accrue the bonus wagering credits or entries toward eventual participation in a bonus game. The occurrence of multiple such bonus qualifying events in the primary game may result in an arithmetic or exponential increase in the number of bonus wagering credits awarded. In one embodiment, the player may redeem extra bonus wagering credits during the bonus game to extend play of the bonus game.

In one embodiment, no separate entry fee or buy-in for a bonus game is needed. That is, a player may not purchase entry into a bonus game; rather they must win or earn entry through play of the primary game, thus encouraging play of the primary game. In another embodiment, qualification of the bonus or secondary game is accomplished through a simple "buy-in" by the player—for example, if the player has been unsuccessful at qualifying through other specified activities. In another embodiment, the player must make a separate side-wager on the bonus game or wager a designated amount in the primary game to qualify for the secondary game. In this embodiment, the secondary game triggering event must occur and the side-wager (or designated primary game wager amount) must have been placed to trigger the secondary game.

Figure 2B:
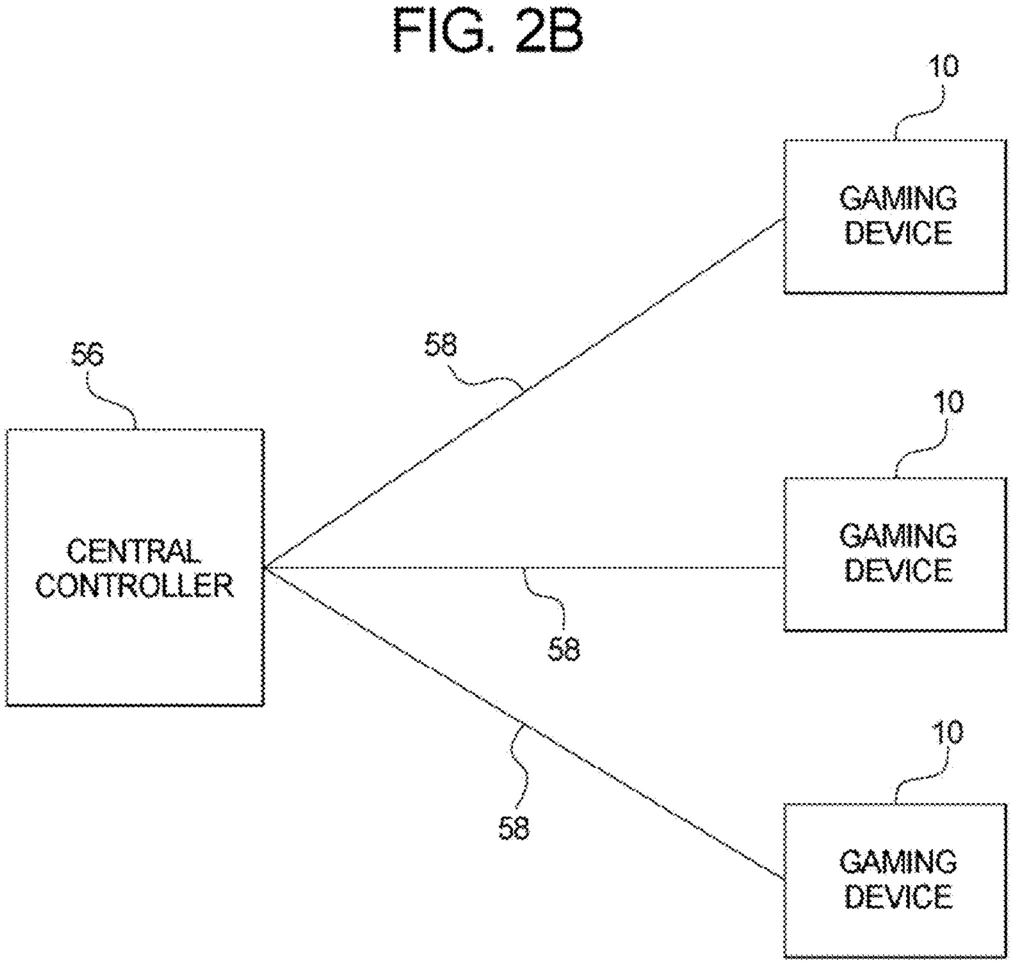
FIG. 2B is a schematic diagram of the central controller in communication with a plurality of gaming devices in accordance with one embodiment of the gaming system disclosed herein.

In one embodiment, as illustrated in FIG. 2B, one or more of the gaming devices 10 are in communication with each other and/or at least one central controller 56 through a data network or remote communication link 58. In this embodiment, the central server, central controller or remote host is any suitable server or computing device which includes at least one processor and at least one memory or storage device. In different such embodiments, the central server is a progressive controller or a processor of one of the gaming devices in the gaming system. In these embodiments, the processor of each gaming device is designed to transmit and receive events, messages, commands, or any other suitable data or signal between the individual gaming device and the central server. The gaming device processor is operable to execute such communicated events, messages, or commands in conjunction with the operation of the gaming device. Moreover, the processor of the central server is designed to transmit and receive events, messages, commands, or any other suitable data or signal between the central server and each of the individual gaming devices. The central server processor is operable to execute such communicated events, messages, or commands in conjunction with the operation of the central server. It should be appreciated that one, more or each of the functions of the central controller, central server or remote host as disclosed herein may be performed by one or more gaming device processors. It should be further appreciated that one, more or each of the functions of one or more gaming device processors as disclosed herein may be performed by the central controller, central server or remote host.

In one embodiment, the game outcome provided to the player is determined by a central server or controller and provided to the player at the gaming device. In this embodiment, each of a plurality of such gaming devices are in communication with the central server or controller. Upon a player initiating game play at one of the gaming devices, the initiated gaming device communicates a game outcome request to the central server or controller.

In one embodiment, the central server or controller receives the game outcome request and randomly generates a game outcome for the primary game based on probability data. In another embodiment, the central server or controller randomly generates a game outcome for the secondary game based on probability data. In another embodiment, the central server or controller randomly generates a game outcome for both the primary game and the secondary game based on probability data. In this embodiment, the central server or controller is capable of storing and utilizing program code or other data similar to the processor and memory device of the gaming device.

In an alternative embodiment, the central server or controller maintains one or more predetermined pools or sets of predetermined game outcomes. In this embodiment, the central server or controller receives the game outcome request and independently selects a predetermined game outcome from a set or pool of game outcomes. The central server or controller flags or marks the selected game outcome as used. Once a game outcome is flagged as used, it is prevented from further selection from the set or pool and cannot be selected by the central controller or server upon another wager. The provided game outcome can include a primary game outcome, a secondary game outcome, primary and secondary game outcomes, or a series of game outcomes such as free games.

The central server or controller communicates the generated or selected game outcome to the initiated gaming device. The gaming device receives the generated or selected game outcome and provides the game outcome to the player. In an alternative embodiment, how the generated or selected game outcome is to be presented or displayed to the player, such as a reel symbol combination of a slot machine or a hand of cards dealt in a card game, is also determined by the central server or controller and communicated to the initiated gaming device to be presented or displayed to the player. Central production or control can assist a gaming establishment or other entity in maintaining appropriate records, controlling gaming, reducing and preventing cheating or electronic or other errors, reducing or eliminating win-loss volatility, and the like.

In another embodiment, a predetermined game outcome value is determined for each of a plurality of linked or networked gaming devices based on the results of a bingo, keno, or lottery game. In this embodiment, each individual gaming device utilizes one or more bingo, keno, or lottery games to determine the predetermined game outcome value provided to the player for the interactive game played at that gaming device. In one embodiment, the bingo, keno, or lottery game is displayed to the player. In another embodiment, the bingo, keno or lottery game is not displayed to the player, but the results of the bingo, keno, or lottery game determine the predetermined game outcome value for the primary or secondary game.

In the various bingo embodiments, as each gaming device is enrolled in the bingo game, such as upon an appropriate wager or engaging an input device, the enrolled gaming device is provided or associated with a different bingo card. Each bingo card consists of a matrix or array of elements, wherein each element is designated with a separate indicia, such as a number. It should be appreciated that each different bingo card includes a different combination of elements. For example, if four bingo cards are provided to four enrolled gaming devices, the same element may be present on all four of the bingo cards while another element may solely be present on one of the bingo cards.

In operation of these embodiments, upon providing or associating a different bingo card with each of a plurality of enrolled gaming devices, the central controller randomly selects or draws, one at a time, a plurality of the elements. As each element is selected, a determination is made for each gaming device as to whether the selected element is present on the bingo card provided to that enrolled gaming device. This determination can be made by the central controller, the gaming device, a combination of the two, or in any other suitable manner. If the selected element is present on the bingo card provided to that enrolled gaming device, that selected element on the provided bingo card is marked or flagged. This process of selecting elements and marking any selected elements on the provided bingo cards continues until one or more predetermined patterns are marked on one or more of the provided bingo cards. It should be appreciated that in one embodiment, the gaming device requires the player to engage a daub button (not shown) to initiate the process of the gaming device marking or flagging any selected elements.

After one or more predetermined patterns are marked on one or more of the provided bingo cards, a game outcome is determined for each of the enrolled gaming devices based, at least in part, on the selected elements on the provided bingo cards. As described above, the game outcome determined for each gaming device enrolled in the bingo game is utilized by that gaming device to determine the predetermined game outcome provided to the player. For example, a first gaming device to have selected elements marked in a predetermined pattern is provided a first outcome of win $10 which will be provided to a first player regardless of how the first player plays in a first game, and a second gaming device to have selected elements marked in a different predetermined pattern is provided a second outcome of win $2 which will be provided to a second player regardless of how the second player plays a second game. It should be appreciated that as the process of marking selected elements continues until one or more predetermined patterns are marked, this embodiment ensures that at least one bingo card will win the bingo game and thus at least one enrolled gaming device will provide a predetermined winning game outcome to a player. It should be appreciated that other suitable methods for selecting or determining one or more predetermined game outcomes may be employed.

In one example of the above-described embodiment, the predetermined game outcome may be based on a supplemental award in addition to any award provided for winning the bingo game as described above. In this embodiment, if one or more elements are marked in supplemental patterns within a designated number of drawn elements, a supplemental or intermittent award or value associated with the marked supplemental pattern is provided to the player as part of the predetermined game outcome. For example, if the four corners of a bingo card are marked within the first twenty selected elements, a supplemental award of $10 is provided to the player as part of the predetermined game outcome. It should be appreciated that in this embodiment, the player of a gaming device may be provided a supplemental or intermittent award regardless of whether the enrolled gaming device's provided bingo card wins or does not win the bingo game as described above.

In another embodiment, one or more of the gaming devices are in communication with a central server or controller for monitoring purposes only. That is, each individual gaming device randomly generates the game outcomes to be provided to the player and the central server or controller monitors the activities and events occurring on the plurality of gaming devices. In one embodiment, the gaming network includes a real-time or on-line accounting and gaming information system operably coupled to the central server or controller. The accounting and gaming information system of this embodiment includes a player database for storing player profiles, a player tracking module for tracking players and a credit system for providing automated casino transactions.

In one embodiment, the gaming device disclosed herein is associated with or otherwise integrated with one or more player tracking systems. Player tracking systems enable gaming establishments to recognize the value of customer loyalty through identifying frequent customers and rewarding them for their patronage. In one embodiment, the gaming device and/or player tracking system tracks any player's gaming activity at the gaming device. In one such embodiment, the gaming device includes at least one card reader 38 in communication with the processor. In this embodiment, a player is issued a player identification card which has an encoded player identification number that uniquely identifies the player. When a player inserts their playing tracking card into the card reader to begin a gaming session, the card reader reads the player identification number off the player tracking card to identify the player. The gaming device and/or associated player tracking system timely tracks any suitable information or data relating to the identified player's gaming session. Directly or via the central controller, the gaming device processor communicates such information to the player tracking system. The gaming device and/or associated player tracking system also timely tracks when a player removes their player tracking card when concluding play for that gaming session. In another embodiment, rather than requiring a player to insert a player tracking card, the gaming device utilizes one or more portable devices carried by a player, such as a cell phone, a radio frequency identification tag or any other suitable wireless device to track when a player begins and ends a gaming session. In another embodiment, the gaming device utilizes any suitable biometric technology or ticket technology to track when a player begins and ends a gaming session.

During one or more gaming sessions, the gaming device and/or player tracking system tracks any suitable information or data, such as any amounts wagered, average wager amounts, and/or the time at which these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data. In one embodiment, such tracked information and/or any suitable feature associated with the player tracking system is displayed on a player tracking display 40. In another embodiment, such tracked information and/or any suitable feature associated with the player tracking system is displayed via one or more service windows (not shown) which are displayed on the central display device and/or the upper display device.

In one embodiment, a plurality of the gaming devices are capable of being connected together through a data network. In one embodiment, the data network is a local area network (LAN), in which one or more of the gaming devices are substantially proximate to each other and an on-site central server or controller as in, for example, a gaming establishment or a portion of a gaming establishment. In another embodiment, the data network is a wide area network (WAN) in which one or more of the gaming devices are in communication with at least one off-site central server or controller. In this embodiment, the plurality of gaming devices may be located in a different part of the gaming establishment or within a different gaming establishment than the off-site central server or controller. Thus, the WAN may include an off-site central server or controller and an off-site gaming device located within gaming establishments in the same geographic area, such as a city or state. The WAN gaming system may be substantially identical to the LAN gaming system described above, although the number of gaming devices in each system may vary relative to one another.

In another embodiment, the data network is an internet or intranet. In this embodiment, the operation of the gaming device can be viewed at the gaming device with at least one internet browser. In this embodiment, operation of the gaming device and accumulation of credits may be accomplished with only a connection to the central server or controller (the internet/intranet server) through a conventional phone or other data transmission line, digital subscriber line (DSL), T-1 line, coaxial cable, fiber optic cable, or other suitable connection. In this embodiment, players may access an internet game page from any location where an internet connection and computer or other Internet facilitator is available. The expansion in the number of computers and number and speed of internet connections in recent years increases opportunities for players to play from an ever-increasing number of remote sites. It should be appreciated that the enhanced bandwidth of digital wireless communications may render such technology suitable for some or all communications, particularly if such communications are encrypted. Higher data transmission speeds may be useful for enhancing the sophistication and response of the display and interaction with the player.

As mentioned above, in one embodiment, the present disclosure may be employed in a server-based gaming system. In one such embodiment, as described above, one or more gaming devices are in communication with a central server or controller. The central server or controller may be any suitable server or computing device which includes at least one processor and a memory or storage device. In alternative embodiments, the central server is a progressive controller or another gaming machine in the gaming system. In one embodiment, the memory device of the central server stores different game programs and instructions, executable by a gaming device processor, to control the gaming device. Each executable game program represents a different game or type of game which may be played on one or more of the gaming devices in the gaming system. Such different games may include the same or substantially the same game play with different pay tables. In different embodiments, the executable game program is for a primary game, a secondary game or both. In another embodiment, the game program may be executable as a secondary game to be played simultaneous with the play of a primary game (which may be downloaded to or fixed on the gaming device) or vice versa.

In this embodiment, each gaming device at least includes one or more display devices and/or one or more input devices for interaction with a player. A local processor, such as the above-described gaming device processor or a processor of a local server, is operable with the display device(s) and/or the input device(s) of one or more of the gaming devices.

In operation, the central controller is operable to communicate one or more of the stored game programs to at least one local processor. In different embodiments, the stored game programs are communicated or delivered by embedding the communicated game program in a device or a component (e.g., a microchip to be inserted in a gaming device), writing the game program on a disc or other media, or downloading or streaming the game program over a dedicated data network, internet, or a telephone line. After the stored game programs are communicated from the central server, the local processor executes the communicated program to facilitate play of the communicated program by a player through the display device(s) and/or input device(s) of the gaming device. That is, when a game program is communicated to a local processor, the local processor changes the game or type of game played at the gaming device.

In another embodiment, a plurality of gaming devices at one or more gaming sites may be networked to the central server in a progressive configuration, as known in the art, wherein a portion of each wager to initiate a base or primary game may be allocated to one or more progressive awards. In one embodiment, a progressive gaming system host site computer is coupled to a plurality of the central servers at a variety of mutually remote gaming sites for providing a multi-site linked progressive automated gaming system. In one embodiment, a progressive gaming system host site computer may serve gaming devices distributed throughout a number of properties at different geographical locations including, for example, different locations within a city or different cities within a state.

In one embodiment, the progressive gaming system host site computer is maintained for the overall operation and control of the progressive gaming system. In this embodiment, a progressive gaming system host site computer oversees the entire progressive gaming system and is the master for computing all progressive jackpots. All participating gaming sites report to, and receive information from, the progressive gaming system host site computer. Each central server computer is responsible for all data communication between the gaming device hardware and software and the progressive gaming system host site computer. In one embodiment, an individual gaming machine may trigger a progressive award win. In another embodiment, a central server (or the progressive gaming system host site computer) determines when a progressive award win is triggered. In another embodiment, an individual gaming machine and a central controller (or progressive gaming system host site computer) work in conjunction with each other to determine when a progressive win is triggered, for example through an individual gaming machine meeting a predetermined requirement established by the central controller.

In one embodiment, a progressive award win is triggered based on one or more game play events, such as a symbol-driven trigger. In other embodiments, the progressive award triggering event or qualifying condition may be achieved by exceeding a certain amount of game play (such as number of games, number of credits, or amount of time), or reaching a specified number of points earned during game play. In another embodiment, a gaming device is randomly or apparently randomly selected to provide a player of that gaming device one or more progressive awards. In one such embodiment, the gaming device does not provide any apparent reasons to the player for winning a progressive award, wherein winning the progressive award is not triggered by an event in or based specifically on any of the plays of any primary game. That is, a player is provided a progressive award without any explanation or alternatively with simple explanations. In another embodiment, a player is provided a progressive award at least partially based on a game triggered or symbol triggered event, such as at least partially based on the play of a primary game.

In one embodiment, one or more of the progressive awards are each funded via a side bet or side wager. In this embodiment, a player must place or wager a side bet to be eligible to win the progressive award associated with the side bet. In one embodiment, the player must place the maximum bet and the side bet to be eligible to win one of the progressive awards. In another embodiment, if the player places or wagers the required side bet, the player may wager at any credit amount during the primary game (i.e., the player need not place the maximum bet and the side bet to be eligible to win one of the progressive awards). In one such embodiment, the greater the player's wager (in addition to the placed side bet), the greater the odds or probability that the player will win one of the progressive awards. It should be appreciated that one or more of the progressive awards may each be funded, at least in part, based on the wagers placed on the primary games of the gaming machines in the gaming system, via a gaming establishment or via any suitable manner.

In another embodiment, one or more of the progressive awards are partially funded via a side-bet or side-wager which the player may make (and which may be tracked via a side-bet meter). In one embodiment, one or more of the progressive awards are funded with only side-bets or side-wagers placed. In another embodiment, one or more of the progressive awards are funded based on player's wagers as described above as well as any side-bets or side-wagers placed.

In one alternative embodiment, a minimum wager level is required for a gaming device to qualify to be selected to obtain one of the progressive awards. In one embodiment, this minimum wager level is the maximum wager level for the primary game in the gaming machine. In another embodiment, no minimum wager level is required for a gaming machine to qualify to be selected to obtain one of the progressive awards.

In another embodiment, a plurality of players at a plurality of linked gaming devices in a gaming system participate in a group gaming environment. In one embodiment, a plurality of players at a plurality of linked gaming devices work in conjunction with one another, such as by playing together as a team or group, to win one or more awards. In one such embodiment, any award won by the group is shared, either equally or based on any suitable criteria, amongst the different players of the group. In another embodiment, a plurality of players at a plurality of linked gaming devices compete against one another for one or more awards. In one such embodiment, a plurality of players at a plurality of linked gaming devices participate in a gaming tournament for one or more awards. In another embodiment, a plurality of players at a plurality of linked gaming devices play for one or more awards wherein an outcome generated by one gaming device affects the outcomes generated by one or more linked gaming devices.

Game Having a Dynamic Award Scheme

Various embodiments of the present disclosure include gaming systems, gaming devices and methods which have casual games with dynamic award schemes. In various embodiments, each game has a designated number of elements such as positions, moveable elements, or the combination of positions and moveable elements. It should be appreciated that in various embodiments, the designated number of elements is a finite number of elements.

Figure 3A:
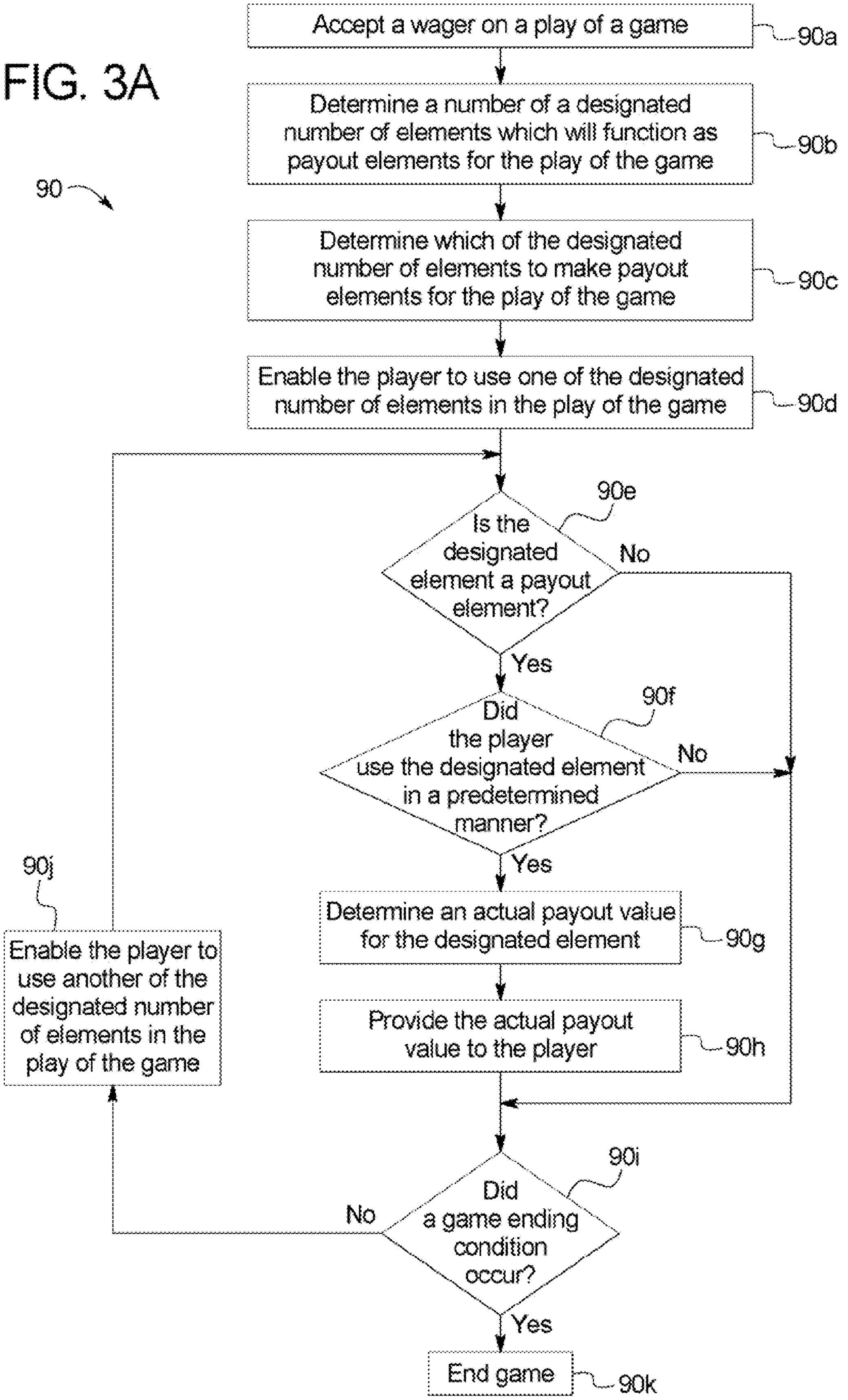
FIG. 3A is a high level flowchart of operation of a play of a game provided by one embodiment of the present disclosure.

FIG. 3A is a high level flow chart 90 which generally illustrates a play of the game for various embodiments of games employing the disclosed dynamic award scheme. Referring to the flow chart 90 illustrated in FIG. 3A, for each play of the wagering game, the gaming system receives a wager from a player for that play of the wagering game, as illustrated in block 90*a*. The gaming system then determines a number of the designated number of elements which will function as or be designated as payout elements for that play of the wagering game, as illustrated in block 90*b*, and determines which of the designated number of elements to make the payout elements for that play of the wagering game, as illustrated in block 90*c*.

The gaming system enables the player to use one of the designated number of elements in the play of the game, as illustrated in block 90*d*. The gaming system then determines if the designated element is a payout element, as illustrated in diamond 90*f*. If the gaming system determines that the designated element is a payout element for the determination illustrated by diamond 90*e*, the gaming system determines if the player used the designated element in a predetermined manner in accordance with the predetermined rules of the game, as illustrated in block 90*f*. If the gaming system determines that the player used the designated element in a predetermined manner in accordance with the predetermined rules of the game, the gaming system determines an actual payout value for the designated element and provides the actual payout value to the player as illustrated in blocks 90*g* and 90*h*. After providing the player with an actual payout value, if applicable, or if the gaming system determines that the player did not use the designated element in a predetermined manner in accordance with the predetermined rules of the game, the gaming system determines whether a game ending condition has occurred, as illustrated at diamond 90*i*.

If the gaming system determines that a game ending condition has not occurred, the gaming system enables the player to use another of the designated number of elements in the play of the game and again determines if the designated element is payout element as illustrated at diamond 90*e*. If the gaming system determines that a game ending condition has occurred, the gaming system ends the game, as illustrated in block 90*k*.

Returning to the determination illustrated by diamond 90*e*, if the gaming system determines that the designated element is not a payout element, the gaming system determines if a game ending condition has occurred, as illustrated at block 90*i*.

It should be appreciated that although in the flowchart 90 of FIG. 3A, the gaming system enables the player to use at least one of the designated number of elements of the play of the game, in various embodiments, game scenarios may exist in which the player may not use any of the designated number of elements available for use.

It should be appreciated that in various embodiments, the gaming system may make at least four random determinations. More specifically, for a play of the wagering game, in various embodiments, the gaming system: (a) randomly arranges or places the elements to start the play of the game (e.g., dealing cards in a Solitaire game, as opposed to a chess game for example, where the pieces are arranged the same each time for the beginning of the play of the game; (b) randomly determines a number of the designated number of elements which will function as or be designated as payout elements for that play of the wagering game; (c) randomly determines which of the designated number of elements to make the payout elements for that play of the wagering game; and (d) for each payout element, randomly determines the payout value associated with that payout element for that play of the wagering game.

In various other embodiments, the gaming system determines the number of the designated number of elements which will function as or be designated as payout elements for that play of the wagering game in one or more of the following manners: (a) based in part on the player's wager; and (b) in a predetermined manner.

Also, in various other embodiments, the gaming system determines which of the designated number of elements to make the payout elements for that play of the wagering game in one or more of the following manners: (a) based in part on the player's wager, as discussed above; and (b) in a predetermined manner.

In various other embodiments, the gaming system determines the payout value associated with each payout element for that play of the wagering game in one or more of the following manners: (a) based in part on the player's wager, as discussed above; and (b) in a predetermined manner. In one embodiment, the gaming system uses a payout element specific paytable to randomly determine the payout value associated with each payout element for that play of the wagering game.

It should be appreciated that in various embodiments, the payout value associated with each respective payout element may be determined: (a) before the player employs any of the payout elements in a designated manner in accordance with the predetermined rules of the game or (b) after the player employs a payout element in a designated manner in accordance with the predetermined rules of the game.

In various embodiments, the game ending condition for a play of the game may be one or more of: (a) an expiration of an amount of time; (b) a selection of a terminating element; (b) a determination that no more elements may be employed in accordance with the rules of the game (e.g., when a player may not move any cards in a Klondike Solitaire game); (c) a determination that all of the designated number of elements have been employed in accordance with the rules of the game; (d) a selection of a bonus element; (e) the activation or use of a designated number of the elements by the player; (f) a player quitting the game; and (g) any other suitable ending condition.

In various embodiments, when the gaming system enables the player to play the wagering game, depending upon the nature of the game: (a) each of the designated number of elements are displayed in a predetermined configuration and the player employs the elements by causing the gaming system to move the elements in accordance with the predetermined rules of the game (e.g., chess); (b) certain of the designated number of elements are displayed in a predetermined configuration and certain of the designated number of elements are available for selection in a designated order, and the player employs the elements by causing the gaming system to move the displayed elements in accordance with the predetermined rules of the game (e.g., Klondike Solitaire); (c) each of the designated number of elements are displayed and available for selection in an order selected by the player and the player employs the elements by causing the gaming system to display the elements at positions selected by the player in accordance with the predetermined rules of the game (e.g., Sudoku); and (d) each of the designated number of elements are displayed and available for selection in an order selected by the processor and the player employs the elements by causing the gaming system to display the elements at positions selected by the player in accordance with the predetermined rules of the game (e.g., a casual puzzle game). It should be appreciated that these examples are representative and any suitable game having a designated number of elements may be provided as a wagering game using the dynamic award scheme disclosed herein.

In one example embodiment, the game is a Klondike Solitaire game which is discussed in detail below. In this embodiment, the designated number of elements are each of the 52 cards of a deck of cards. For each play of the Klondike Solitaire wagering game, the gaming system: (a) receives a wager from a player for that play of the game; (b) determines a number of the cards which will function as or be designated as payout elements, or payout cards, for that play of the game (e.g., 5 of the 52 cards); (c) determines which of the cards to make the payout cards for that play of the game (e.g., the ace of spades, two of diamonds, seven of hearts, nine of clubs and ace of diamonds); (d) for each payout card, determines the payout value associated with that card for that play of the game (e.g., 50 credits for the ace of spades, 25 credits for the two of diamonds, 150 credits for the seven of hearts, 75 credits for the nine of clubs and 20 credits for the ace of diamonds); and (e) determines a game ending condition for that play of the game (e.g., when the player completes the game, when a designated amount of time elapses or when the player cannot use any of the displayed cards in accordance with the rules of Klondike Solitaire). In this example embodiment, until the game ending condition, for each payout card, the gaming system provides the player the payout value associated with the payout card if the player banks the respective card (e.g., places the card in the pile at the top of the game display associated with its respective suit).

In various embodiments, due to the nature of and rules of certain games, the game ending condition may occur before the player employs all of the designated number of elements. In various such embodiments, upon the occurrence of the game ending condition, the player may either: (i) place an additional wager to start a new game; or (ii) place an additional wager to continue play of the current game (e.g., if the game ending condition is an expiration of an amount of time, but not if the game ending condition is a determination that no activations or uses of the designated number of elements are available in accordance with the predetermined rules of the game).

In various embodiments, the game includes a game win paytable which is independent of or in addition to a payout element specific paytable. In various such embodiments, if a game winning condition occurs, the gaming system randomly determines a game win value using the game win paytable and provides the game win value to the player in addition to the payout values provided to the player.

In various embodiments, the game winning condition includes one or more of: (a) a designated number of the designated number of elements being employed before the game ending condition occurs; (b) each of the designated number of elements being employed before the game ending condition occurs; (c) a player winning a card game; (d) a player reaching a designated point total; and (e) any game-specific game winning condition.

In various other embodiments, the game includes a designated award meter such as a jackpot meter. In one such embodiment, if a game winning condition occurs, the gaming system randomly determines a game win value using the game win paytable and instead of providing the game win value directly to the player, adds the game win value to the jackpot meter and provides the player with some or all of a plurality of credits in the jackpot meter in addition to the payout values provided to the player.

In various such embodiments, the gaming system enables the player to play a bonus game such as a bonus selection game to determine how many of the credits in the jackpot meter to provide the player. In one such embodiment, the bonus selection game includes a plurality of selections each associated with a portion of the credits in the jackpot meter. The gaming system instructs the player to pick one of the selections. The gaming system then provides the player with the number of credits associated with the picked selection. Any credits which are not associated with the picked selection remain in the jackpot meter, available to the player if the player elects to begin a new play of the game for an additional wager.

Use of the above described jackpot meter in various embodiments increases player excitement and enjoyment because it provides the player with the opportunity for higher awards over the course of multiple plays or rounds of play of the game. In various embodiments, even if a player does not complete the game (e.g., employ all of the designated number of elements), as long as the player continues to play the game, at least one of a game win value and a payout value for each respective payout element not employed are added to the jackpot meter. This creates an incentive for the player to keep playing the game.

It should be appreciated that in various embodiments as described above and below that while the present disclosure provides a wagering game, the present disclosure can also be implemented as a secondary or bonus game.

In various other embodiments, the disclosed wagering game having a dynamic award scheme may be offered in both a regular mode, described above, and a bonus mode by the same gaming device. In certain embodiments in which the bonus mode is triggered during a play of the wagering game in the regular mode, the bonus mode of the game is a continued play of the game which was ongoing in the regular mode.

In other such embodiments, the triggered play of the game in the bonus mode constitutes a separate game from the game which was being played in the regular mode, including newly designated payout elements.

The disclosed dynamic award scheme enables game designers to provide new casual wagering games and offer other popular statistically complex games, which otherwise cannot be offered as wagering games due to too many decisions which affect the game result, as wagering games. This provides a new and exciting gaming experience for both existing players of wagering games, and existing game players which are new to wagering games. The designation of individual elements as payout elements and the use of a payout element specific paytable independent of a game win paytable to determine payout values for such payout elements enables a unique way of controlling the statistical model of such wagering games, many of which could not otherwise be provided as suitable wagering games.

In various embodiments in which the game is a bonus game, the bonus game is triggered in one or more of the following manners: (a) upon the use or activation of one or more elements designated as a bonus element in a play of a base game; (b) randomly; (c) after the player wins a designated number of base games; (d) after the player has been playing the gaming device a designated amount of time; (e) after the player has played a designated number of base games; (f) upon any suitable triggering event in a base game; and (g) in any suitable manner. It should be appreciated that in embodiments in which the game is offered as a bonus game, the player places a wager as part of the play of the base game, but not upon beginning play of the bonus game.

The disclosed gaming system, gaming device and method is described in more detail below by way of specific representative, but non-limiting, examples. In certain of these specific examples, the game is a Klondike Solitaire game and the elements are cards, although it should be appreciated that the elements may also or alternatively be positions, and that other various casual games may be employed in accordance with the present disclosure.

In this example, Klondike Solitaire utilizes a conventional deck of 52 playing cards (the designated number of elements). To begin a play of a game of Klondike Solitaire, 28 cards of the 52 card deck are dealt into seven piles. Each pile occupies a position. The first pile includes one card, the second pile includes two cards, and so on up to seven cards in the seventh pile. The top card of each pile is dealt face up and the other cards in each pile are dealt face down. The space the piles occupy is sometimes referred to as the "field."

The remaining 22 cards of the 52 card deck, which were not dealt into the initial seven piles, are referred to as stock cards. The stock cards are left face-down in a stock pile. The stock cards are turned up from the stock pile sequentially during game play. In certain versions of Klondike Solitaire, the stock cards are turned face up one at a time. In other versions, the stock cards are turned face up three at a time (i.e., every third card is turned face up). In some versions of Klondike Solitaire, the player may run through the stock cards one time during a play of the game. In other versions, the player may run through the stock cards multiple times during a play of the game.

Klondike Solitaire also includes four banks positioned above the seven piles. Klondike Solitaire includes one bank for each suit of cards (i.e., one for each of diamonds, hearts, spades and clubs). When the cards are initially dealt, these four banks or positions do not have any cards in them. Cards can only be placed in each respective bank or position in suited order (i.e., ace, two, three . . . King).

The ultimate objective of Klondike Solitaire is to accumulate all 52 cards of the deck into the respective banks. Cards must be accumulated in each respective bank in-suit and in ascending sequence (i.e., ace to king of the respective suit). A player completes or solves the Klondike Solitaire game when each bank includes all 13 cards of its respective suit. Placing a card in a bank or causing a card to be placed in a bank is sometimes referred to as "banking" a card. To accomplish this objective, a player may move or cause the movement of the cards according to a designated set of governing rules which are generally explained below. In this example, the player solving the Klondike Solitaire game is a game winning condition.

The movement of the cards are governed by specific rules. When the stock cards are turned face up (as discussed below), they are placed in a discard pile, placed in the field or placed in one or more of the banks. A player may move cards from the stock pile, the discard pile and the field into the banks according to these rules, after they are turned up. Once turned up, the stock cards may also be moved to the field or the discard pile, according to these rules. Cards from the discard pile may be moved to the field or placed into a bank. A player may move face-up cards in any of the piles in the field either to another pile in the field or into a bank. A series of rules also govern the arrangement of cards in the field.

More specifically, a player may associate a number of cards with the face-up card on the top of each pile by "building" cards into a column. In Klondike Solitaire, cards must be built in descending sequence and alternating in color (i.e., red from black or black from red). For example, if the king of spades is face up on the top of a pile, a player may build a queen of hearts or a queen of diamonds onto the king of spades.

A player may move a face-up card from one pile or column to another pile or column, within these guidelines. Multiple face-up cards from one column may be built onto another pile or column as a unit. For example, if a column includes a seven of clubs and an eight of diamonds, a player may move these two cards together and build them onto a nine of spades or nine of clubs on another pile or at the bottom of another column.

When the player uncovers a face-down card on a pile, that card may be turned face up. The player is always entitled to seven piles. Thus, if no cards remain in the position of a pile, the player may put a king in that pile or position to start the pile.

A card may not be placed in a bank from the field unless it is "free." Cards which are free include cards which are face-up and either not associated with any other cards or the lowest card in a column. For example, if a built column includes a king of spades, a queen of hearts and a jack of spades, and a ten of spades is already in the bank associated with spades, then the jack of spades is "free" and may be moved into its respective bank.

Figure 3B:
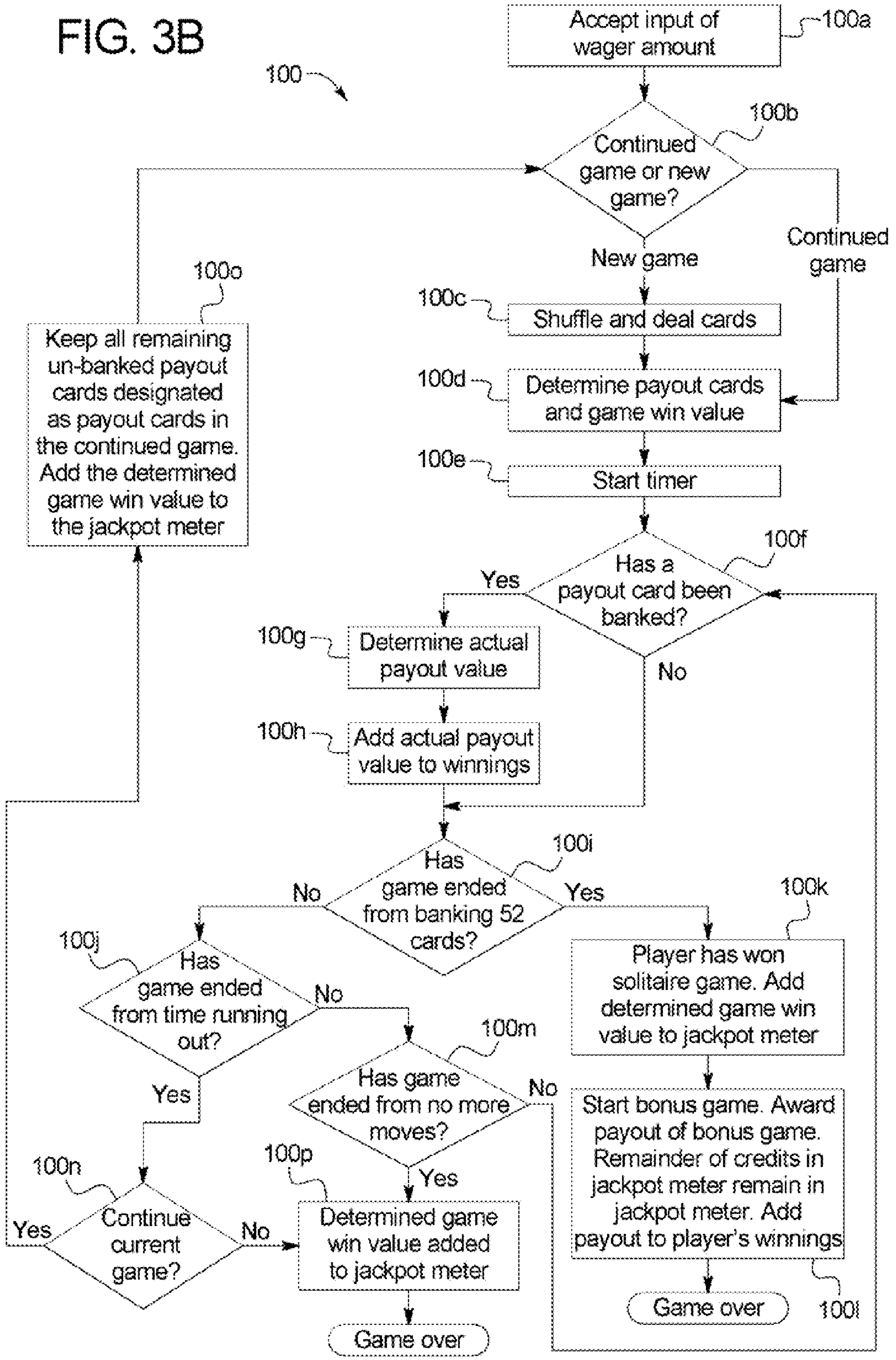
FIG. 3B is a flowchart of operation of a play of a Klondike Solitaire game provided by one embodiment of the present disclosure.

Referring now to FIG. 3B, flowchart 100 illustrates an example of operation of a play of a Klondike Solitaire game using the disclosed dynamic award scheme. The gaming system accepts an input of a wager amount from a player, as illustrated in block 100*a*. The gaming system determines if the game is a continued game (e.g., if the player has placed an additional wager to play the game for an additional period of time, as discussed in more detail below) or a new game, as illustrated in diamond 100*b*.

If the gaming system determines that the game is a new game, the gaming system shuffles and deals the cards and determines which cards will be payout elements (or in this embodiment, "payout cards") and determines a game win value, as illustrated in block 100*d*. It should be appreciated that in this example, determining which cards will be payout elements includes both determining a number of the cards which will function as or be designated as payout cards for that play of the game (e.g., 5 of the 52 cards) and determining which of the cards to make the payout cards for that play of the game (e.g., the ace of spades, two of diamonds, seven of hearts, nine of clubs and ace of diamonds). It should also be appreciated that the other cards or elements of the game which are not selected as payout elements or cards do not have awards associated with them. These elements are used in normal game play. Thus, the player will focus more on the payout elements (if they are aware of them) more than the elements that are not payout elements. In various embodiments, this may cause a player to play suboptimally in terms of overall game strategy to receive an award for a payout element in the short term (e.g., in a Klondike Solitaire game, a player may decide not to bank a card which the player could otherwise bank in order to more advantageous play a displayed payout card). It should thus also be appreciated that for each play of the game, the payout elements can be different and are dynamically chosen by the processor.

In this example, the gaming system uses tables such as those illustrated in FIGS. 6A, 6B, 6C, 6D, 6E, and 6F, discussed in more detail below, to randomly determine the number of the cards which will function as or be designated as payout cards. It should be appreciated that in this example embodiment, the possible number of cards which may be designated as payout cards, the amount of time the player has to play the game (the time on the timer). It should be appreciated that the average expected payback percentage of the game may also vary as a function of the player's wager.

Specifically, in this embodiment, if the player wagers 100 credits, the gaming system provides the player with 30 seconds of game play and randomly selects one to four cards in addition to the randomly determined ace (providing the potential for two to five payout cards) to designate as payout cards, using Table 130*a* of FIG. 6A. The average number of cards designated as payout cards when the player wagers 100 credits is approximately 1.6, as illustrated in FIG. 6A.

If the player wagers 200 credits, the gaming system provides the player with one minute of game play and randomly selects one to five cards in addition to the randomly determined ace (providing the potential for two to six payout cards) to designate as payout cards, using Table 130*b* of FIG. 6B. Note that as the player's wager increases, each of the potential number of payout cards and the game play time increase. The average number of cards designated as payout cards when the player wagers 200 credits is approximately 1.7, as illustrated in FIG. 6B.

If the player wagers 500 credits, the gaming system provides the player with three minutes of game play and randomly selects one to seven cards in addition to the randomly determined ace (providing the potential for two to eight payout cards) to designate as payout cards, using Table 130*c* of FIG. 6C. The average number of cards designated as payout cards when the player wagers 500 credits is approximately 2.3, as illustrated in FIG. 6C.

If the player wagers 1,000 credits, the gaming system provides the player with unlimited game play time and randomly selects one to seven cards in addition to the randomly determined ace (providing the potential for two to eight payout cards) to designate as payout cards, using Table 130*d* of FIG. 6D. The average number of cards designated as payout cards when the player wagers 1,000 credits is approximately 2.5, illustrated in FIG. 6D.

If the player wagers 1,500 credits, the gaming system provides the player with unlimited game play time and randomly selects one to eight cards in addition to the randomly determined ace (providing the potential for two to nine payout cards) to designate as payout cards, using Table 130*e* of FIG. 6E. The average number of cards designated as payout cards when the player wagers 1,500 credits is approximately 3.2, as illustrated in FIG. 6E.

If the player wagers 2,000 credits, the gaming system provides the player with unlimited game play time and randomly selects one to nine cards in addition to the randomly determined ace (providing the potential for two to ten payout cards) to designate as payout cards, using Table 130F of FIG. 6F. The average number of cards designated as payout cards when the player wagers 2,000 credits is approximately 3.3, as illustrated in FIG. 6F.

The gaming system also randomly determines a game win value using the game win paytable 120 illustrated in FIG. 5.

Referring back to FIG. 3, if the gaming system determines that the game is a continued game (e.g., the player has input a number of credits for more game play time), the gaming system determines which cards to designate as payout cards and a game win value, as illustrated in block 100*d*, without shuffling or dealing the cards. It should be appreciated that in various embodiments, if the game is a continued game, when the gaming system determines which cards to designate as payout cards in block 100*d*, the gaming system: (a) designates at least one payout card which was not designated as a payout card in the previous play of the game in addition to keeping any remaining payout cards from the previous play of the game designated as payout cards; (b) designates new payout cards for the continued play of the game in place of any remaining payout cards from the previous play of the game; or (c) determines what payout cards from the previous play of the game have not been banked, and keeps those payout cards as payout cards, not designating any additional payout cards.

The gaming system starts the game timer as applicable and, as illustrated in block 100*e*. As discussed above, in this example, the game timer is set as a function of the player's wager.

After each move, the gaming system determines if a payout card has been banked, as illustrated in diamond 100*f*. If a payout card has been banked, the gaming system randomly determines a payout value for the payout card using the payout element specific paytable 110 illustrated in FIG. 4 and adds the randomly determined payout value to the player's winnings, as illustrated in blocks 100*g* and 100*h*. It should be appreciated that in various embodiments, if the game is a continued game, payout cards which were also designated as payout cards in the previous play of the game may be associated with higher values in the continued play of the game.

Referring again back to FIG. 3, if the gaming system determines that a payout card has not been banked for the determination illustrated by diamond 100*f* or after adding a payout value to a player's winnings as illustrated in block 100*h*, the gaming system determines if the game has ended due to 52 cards being banked, as illustrated at diamond 100*i*. If the gaming system determines that the game has not ended due to 52 cards being banked, the gaming system determines if time has run out (note that in the event the player's wager qualifies the player for unlimited time, the time will not run out), as illustrated in diamond 100*j*. If time has run out, the gaming system determines if it is to continue the current game (e.g., if the player inputs an additional wager), as illustrated in diamond 100*n*. If the gaming system determines the game is to continue for the determination illustrated at diamond 100*n*, the gaming system keeps all remaining un-banked payout cards playable and adds the determined game win value to a jackpot meter associated with the game, as illustrated in block 100*o*. The gaming system then once again makes the determination illustrated at diamond 100*b*.

If the gaming system determines that the game has not ended due to time running out, the gaming system determines whether the game has ended because the player does not have anymore moves, as illustrated in diamond 100*m*. If the gaming system determines that the game has ended from the player not having anymore moves for the determination illustrated at diamond 100*m* or the gaming system determines that the player has not elected to continue the current game for the determination illustrated at diamond 100*n*, the gaming system adds the determined game win value to the jackpot meter, as illustrated in block 100*p* and ends the play of the game. The gaming system then once again makes the determination illustrated at diamond 100*b*.

If the gaming system determines that the game has not ended because the player has no more moves for the determination illustrated at diamond 100*m*, the gaming system once again makes the determination illustrated at diamond 100*f*.

If the gaming system determines that the game has ended because the player banked all 52 cards for the determination illustrated at diamond 100*i*, the player has won the Klondike Solitaire game and the gaming system adds the game win value to the jackpot meter, as illustrated in block 100*k*.

Then, the gaming system enables the player to play a bonus game in which the player may win some or all of the credits of the jackpot meter as illustrated in block 100*l* and ends the play of the game.

Figure 7A:
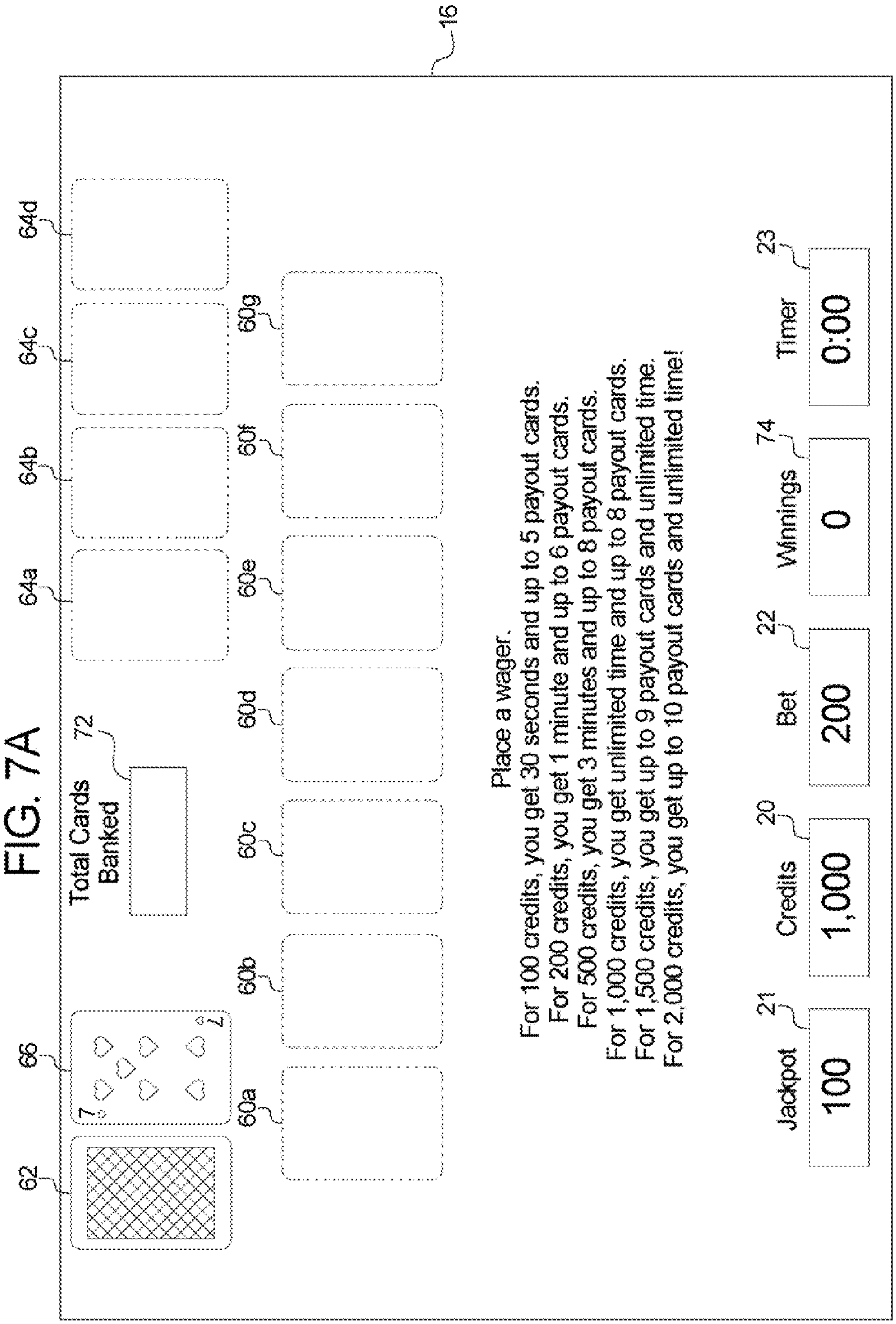
FIGS. 7A, 7B, 7C, 7D, 7E, 7F, 7G, 7H, 7I, and 7J are front views of a gaming device display enabling the play of a Klondike Solitaire game in accordance with one example embodiment of the present disclosure.

FIGS. 7A to 7J illustrate an example of a play of a Klondike Solitaire game using the dynamic award scheme disclose herein. A player places a wager of 200 credits on the Klondike Solitaire game, as illustrated in the Bet Display 22 of FIG. 7A. In this embodiment, a bet of two hundred credits provides the player with one minute of game play time and up to six payout cards, as also illustrated in FIG. 7A.

The gaming system randomly designates one of the aces to be a payout card, in this case the ace of spades. The gaming system uses the distribution illustrated in FIG. 6B, associated with a bet of 200 credits, to randomly determine a number of from 1 to 5 additional cards to designated as payout cards in addition to the ace of spades. In this example play of the game, the gaming system determines that three additional cards will be payout cards. After determining the number of additional cards to make payout cards, the gaming system randomly determines which of the remaining cards to designate as payout cards. In this example, the gaming system designates the two of spades, the five of diamonds and the two of hearts as payout cards, in addition to the ace of spades.

It should be appreciated that in various other embodiments, face cards (Jacks, Queens, Kings) may not be designated as payout cards. In embodiments such as that disclosed herein, where no face cards are designated as payout cards, the player is more likely to receive actual award values for the payout cards because non-face cards are banked before face cards in Klondike Solitaire. It should also be appreciated that in various other embodiments, face cards may be designated as payout cards.

Referring back to FIG. 7B, the gaming system sets the Timer 23 at one minute and causes a game of Klondike Solitaire to be dealt and displayed on the display 16. In this embodiment, cards turned face up from the stock pile 62 are displayed one at a time in the discard pile 66. It should be appreciated that in other embodiments the stock cards may be displayed more than one at a time.

Figure 7B:
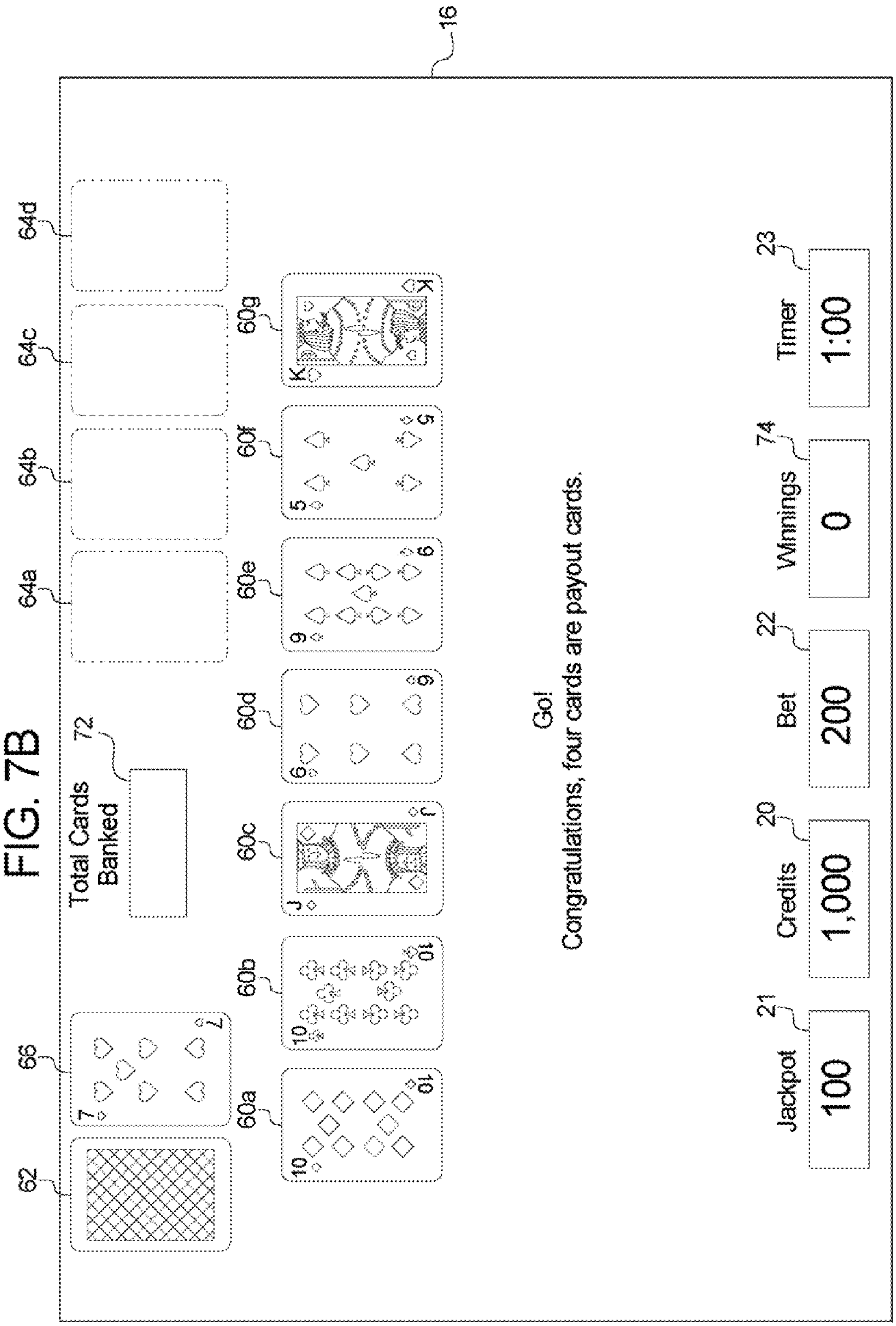

Each of the piles 60*a*, 60*b*, 60*c*, 60*d*, 60*e*, 60*f* and 60*g* include one card dealt face-up, as illustrated in FIG. 7B. Four banks 64*a*, 64*b*, 64*c* and 64*d* are displayed above the piles. The Total Cards Banked display 72 displays the number of cards placed in the banks at any given point during a play of the game.

Figure 7C:
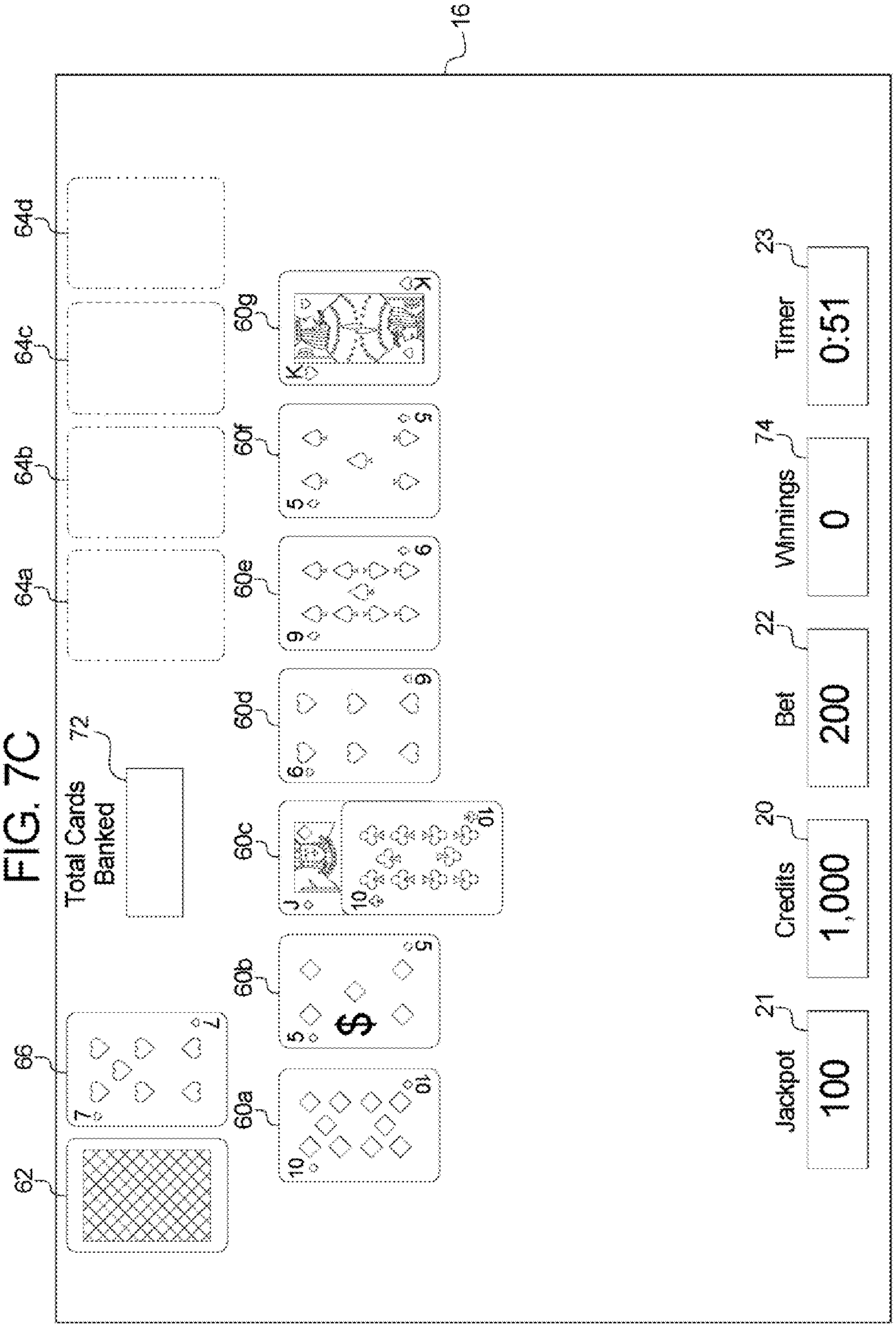

The player first builds the ten of clubs from pile 60*b* onto the jack of diamonds on pile 60*c*, as illustrated in FIG. 7C. After the ten of clubs is moved from pile 60*b*, the next card in the pile 60*b*, the five of diamonds, is placed face-up on pile 60*b*, as illustrated in FIG. 7C. After this move the player has 51 seconds remaining as illustrated in Timer 23.

Also, as illustrated in FIG. 7C, the gaming system indicates that the five of diamonds is a payout card by displaying a dollar sign on the card. It should be appreciated that in various embodiments, the gaming system may indicate payout cards in any suitable manner such as: (a) displaying any other suitable symbol on or over the card (e.g., a moneybag); (b) a dark border; and (c) highlighting. After the cards are dealt, as in the illustrated example, not all payout cards may be indicated to a player, as certain of the cards may be under other cards in a pile or in the stock pile 62. It should be appreciated that in various other embodiments, the gaming system does not indicate to the player what cards are payout cards until after the respective payout cards are banked, until time expires, until the game otherwise ends, or at any suitable designated point in time.

Figure 7D:
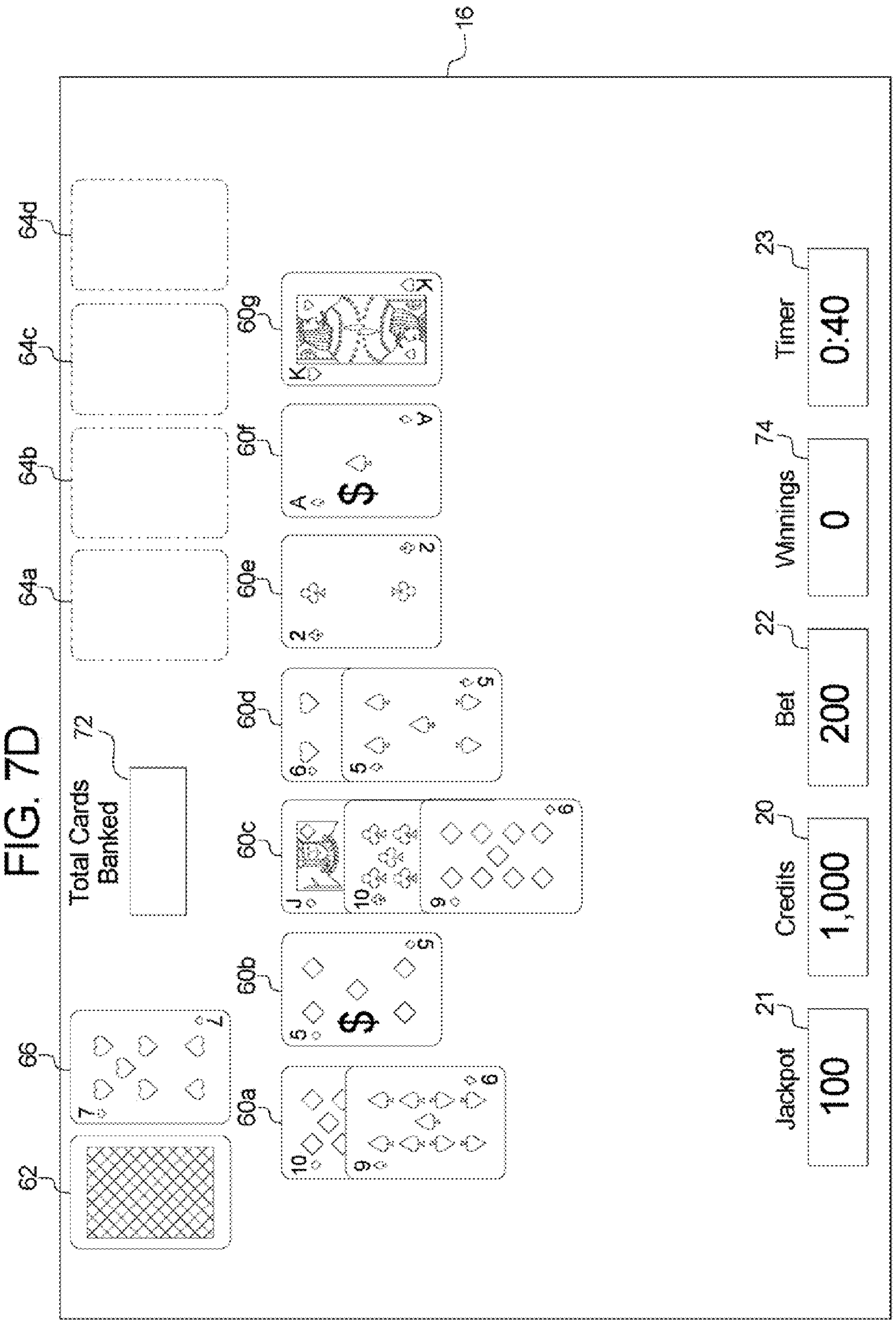

The player next builds the nine of spades from pile 60*e* onto the ten of diamonds on pile 60*a*, as illustrated in FIG. 7D. A nine of diamonds is then turned face-up on pile 60*e*. The player builds the nine of diamonds from pile 60*e* onto the ten of clubs on pile 60*c*. The player builds the five of spades from pile 60*f* onto the six of hearts on pile 60*d*. After doing so, an ace of spades is turned face up on pile 60*f*, as illustrated in FIG. 7D. At the end of these moves, the player has 40 seconds remaining, as displayed at Timer 23. As illustrated in FIG. 7D, the ace of spades is a payout card.

Figure 7E:
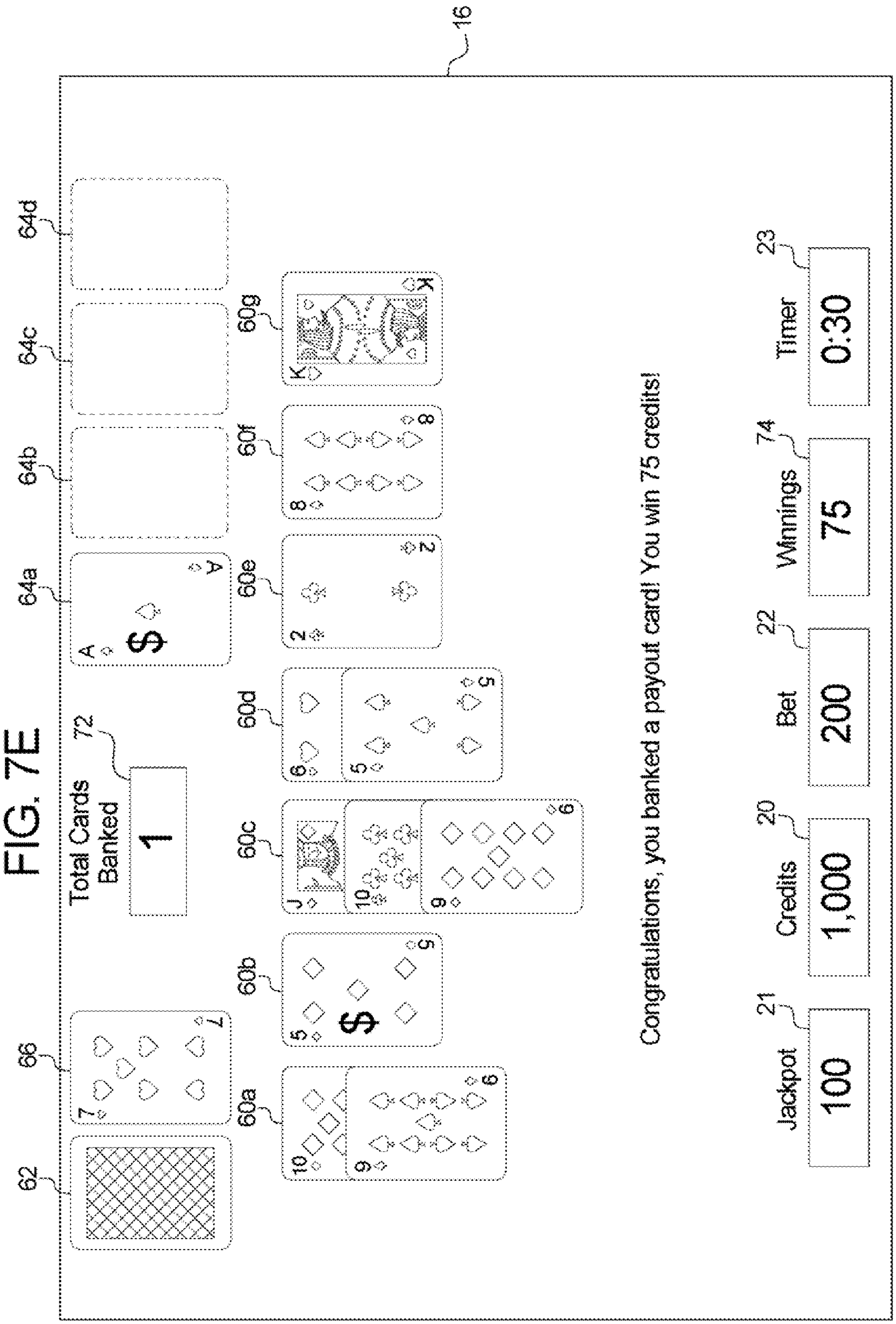

The player moves the ace of spades from pile 60*f* to bank 64*a*, as illustrated in FIG. 7D. It should be appreciated that in various embodiments, the gaming system automatically causes aces, deuces, and/or additional cards to be placed in their respective banks, absent any player intervention. The Total Cards Banked display 72 indicates that one card (the ace of spades) is banked, as illustrated in FIG. 7D. After the player banks the ace of spades, the gaming system randomly determines a payout value for the ace of spades using payout element specific paytable 110 of FIG. 4. The gaming system determines a payout value of 75 credits for the ace of spades and adds 75 credits to the Winnings Display 74, as illustrated in FIG. 7E. After banking the ace of spades, the player has 30 seconds remaining, as displayed at Timer 23 in FIG. 7E.

Figure 7F:
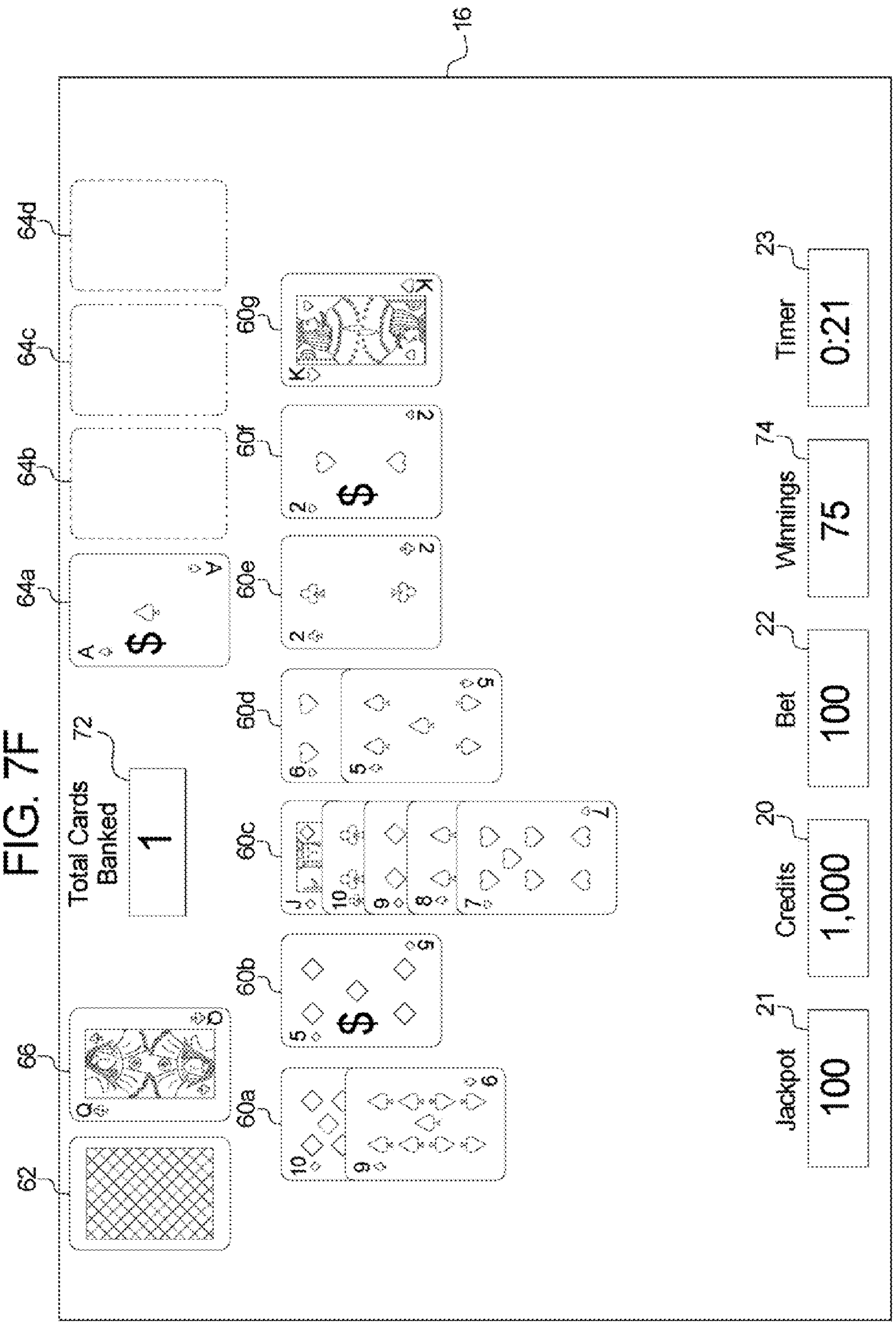

The player next builds the eight of spades from pile 60*f* onto the nine of diamonds on pile 60*c*, as illustrated in FIG. 7F. The two of hearts is then turned face-up on pile 60*f*. Then, the player builds the seven of hearts from the discard pile 66 onto the eight of spades, which is now associated with pile 60*c*, as further illustrated by FIG. 7F. The queen of clubs is then turned face-up from the stock pile 62 and placed face-up on top of the discard pile 66. After these moves, the player has 21 seconds remaining, as displayed at Timer 23 in FIG. 7F.

Figure 7G:
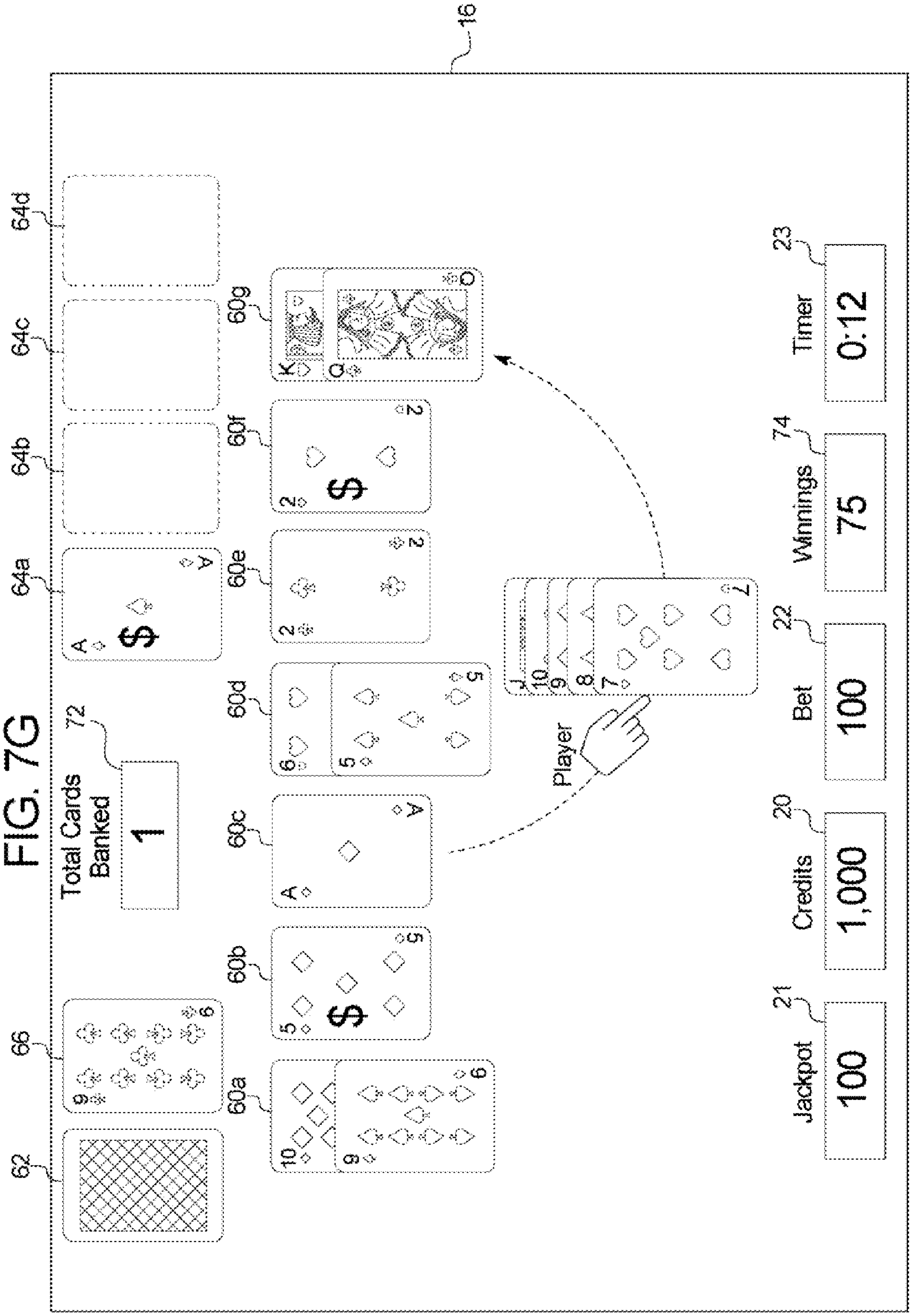

Referring now to FIG. 7G, the player builds the queen of clubs from the discard pile 66 onto the king of hearts on pile 60*g*. Then, the player builds all face-up cards associated with pile 60*c* onto the queen of clubs on pile 60*g*. After the moves described relative to FIG. 7G, the Timer 23 has 12 seconds remaining.

In this embodiment, the display 16 is a touch screen and the player is able to move the cards from pile 60*c* by "dragging and dropping" the cards on display 16. The player touches the cards associated with pile 60*c* and moves the cards associated therewith along the screen, while holding their finger against the display 16, as illustrated in FIG. 7G. The player moves the cards to pile 60*g*, at which time the player releases their finger from the display 16, thereby "dropping" the cards. It should be appreciated that in other embodiments, the game may be played on a personal computer or PDA, and the player would "click and drag" the cards in a similar manner using a conventional mouse or equivalent control. It should be appreciated that in other embodiments in which the display 16 includes a touch screen, a player moves a card or cards to a desired destination by touching the area of the touch screen at which the card is displayed and then touching the desired destination, not having to "drag" the card or cards across the display 16.

Figure 7H:
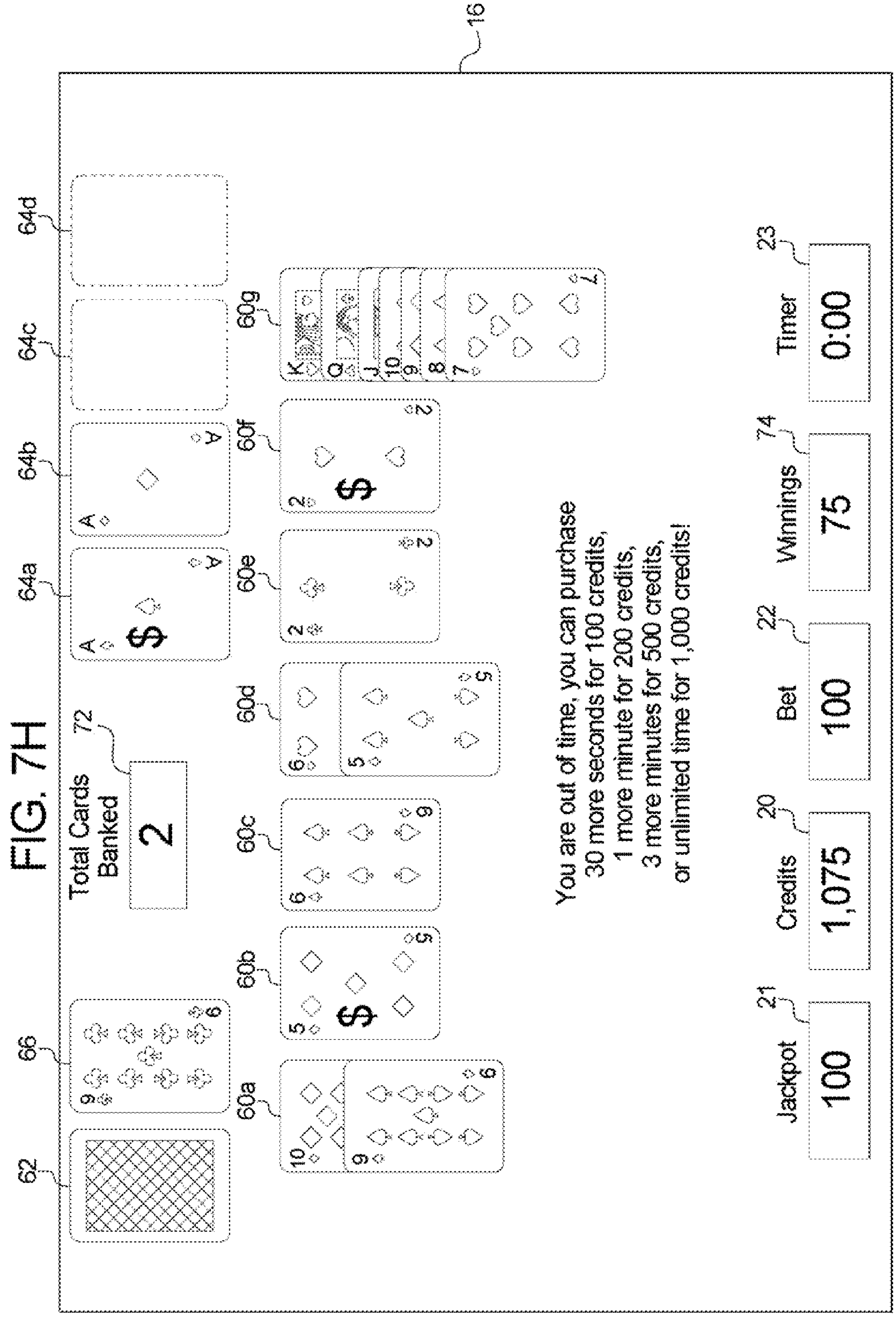

The player causes the ace of diamonds to be placed in its respective bank 64*b*, raising the number of cards placed in the bank to two, as illustrated by the Total Cards Banked display 72 in FIG. 7H. Note that the ace of diamonds is not a payout card and thus, the player does not receive an award for banking the ace of diamonds. After the player places the ace of diamonds, the time is up as illustrated in Timer 23. The gaming system transfers the player's winnings in Winnings Display 74 to Credits Display 20 and instructs the player that they can purchase 30 more seconds for 100 credits, one more minute for 200 credits, three more minutes for 500 credits and unlimited time for 1,000 credits, as illustrated in FIG. 7H.

The gaming device then randomly determines a game win value from game win paytable 120 in FIG. 5 to add to the jackpot meter 21. The gaming system randomly determines a game win value of 200 credits and adds it to jackpot meter 21 as illustrated in FIG. 7I.

It should be appreciated that in this embodiment, the gaming system does not designate any additional cards as payout cards when the player elects to continue play. In this embodiment, the two remaining payout cards remain payout cards for the continued play of the game. However, it should be appreciated that in various other embodiments, the gaming system designates one or more additional cards as payout cards for the continued play of the game or otherwise changes the payout cards to different cards.

Figure 7I:
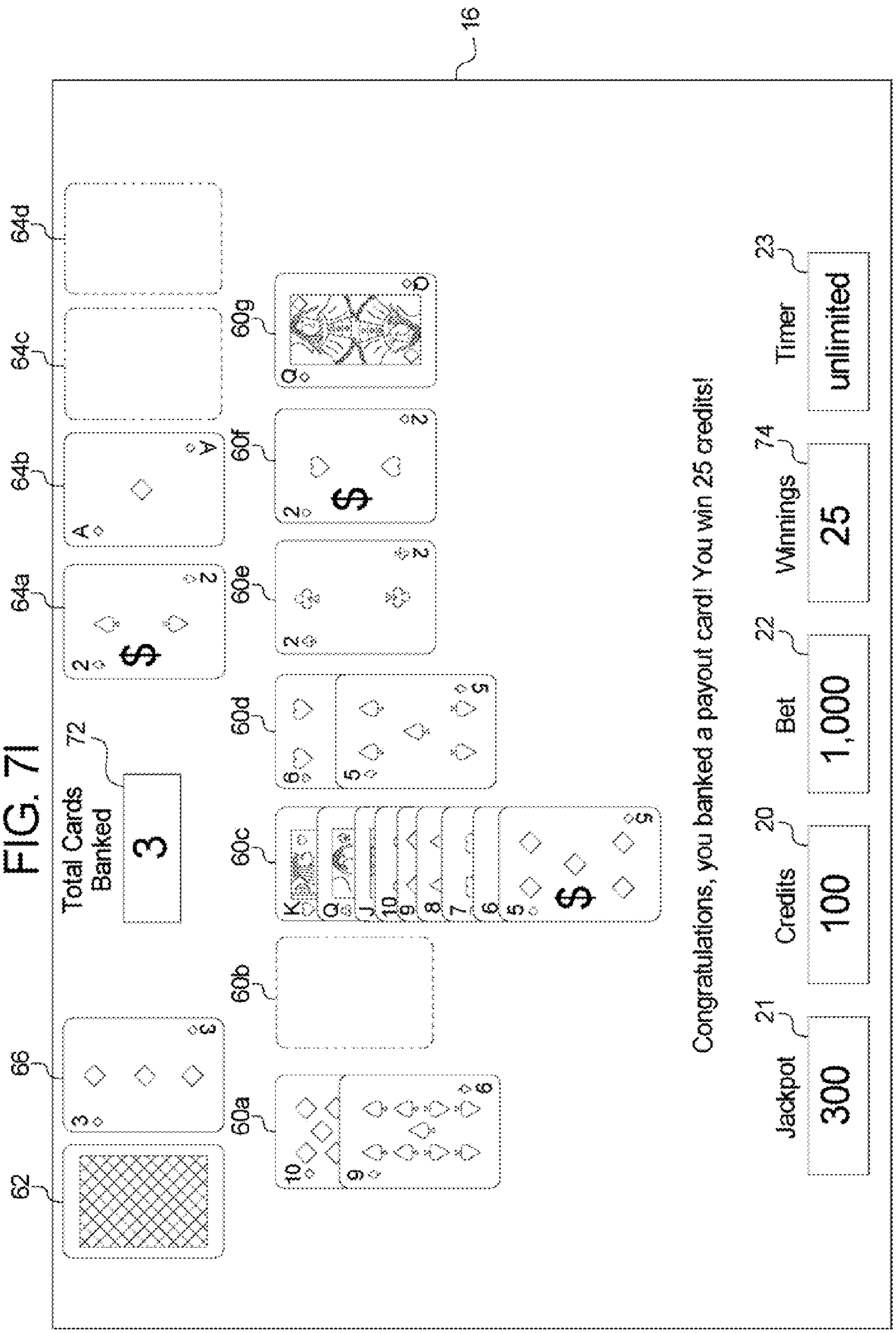

The player makes five moves, the results of which are illustrated in FIG. 7I. Among those moves, the player banked the two of spades in bank 64*a*, one of the payout cards. The gaming system randomly determines a payout value for the two of spades using the element specific paytable 110 illustrated in FIG. 4. The game system determines a payout value of 25 credits for the two of spades and provides it to the player as illustrated in FIG. 7I.

Figure 7J:
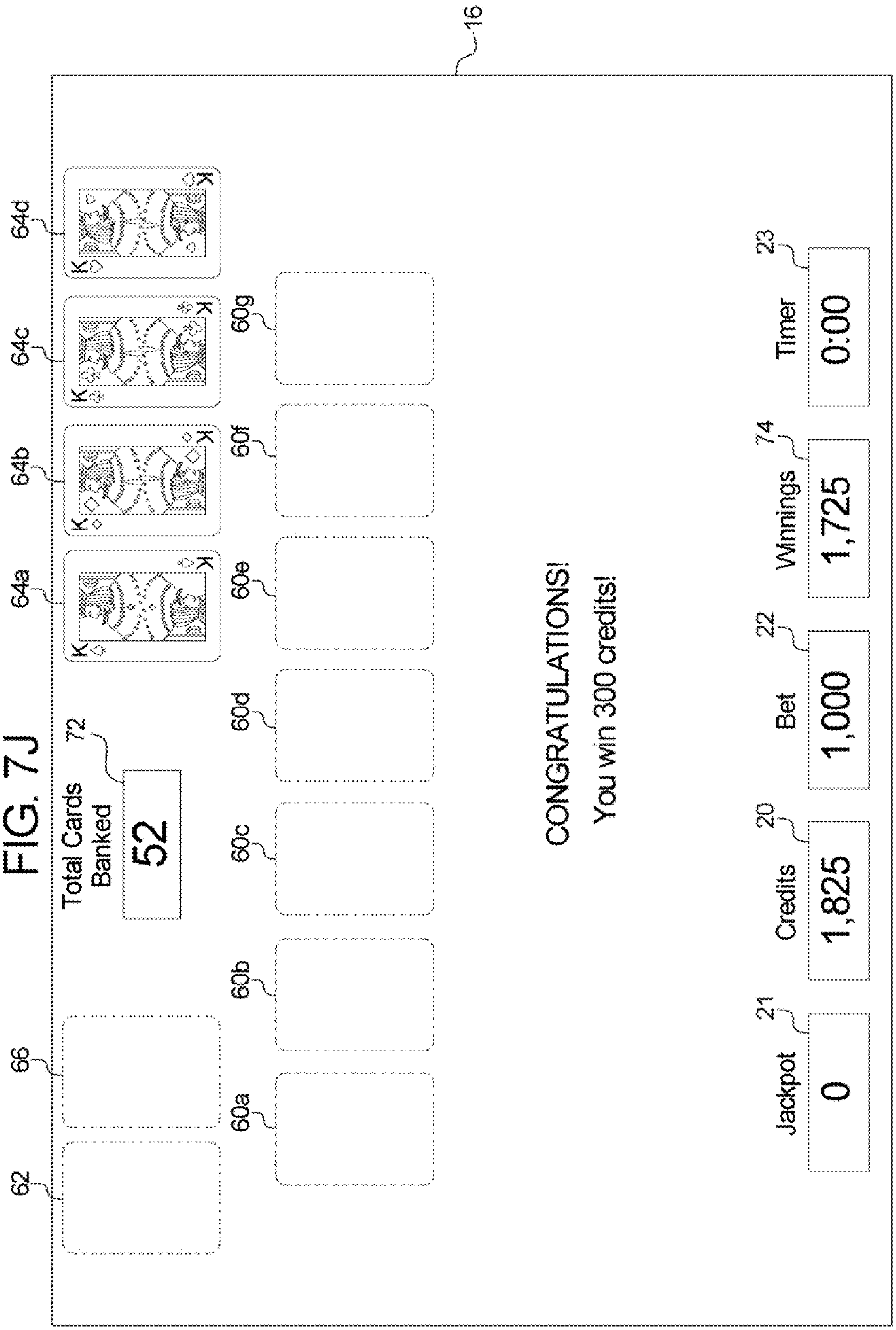

Referring now to FIG. 7J, the player solves the game. Accordingly, 52 cards are placed in the banks. While completing the play of the game, the player banked the two of hearts and the five of diamonds, the remaining two payout cards. The gaming system used element specific paytable 110 illustrated in FIG. 4 to determine a payout value for each of the two of hearts and the five of diamonds upon the player banking each of these respective payout cards. For the two of hearts, the gaming system determined a payout value of 1,000 credits and for the five of diamonds, the gaming system determined a payout value of 400 credits. Accordingly, the gaming system provided the player with 1,400 additional credits. Further, in this embodiment, if the player completes the game, the player receives all of the credits in the jackpot meter and the jackpot meter resets. In this embodiment, the jackpot meter 21 included 300 credits and thus, the gaming system provides the player with three hundred credits in addition to the 1,400 credits for the two remaining payout cards.

It should be appreciated that although in this example embodiment the gaming system determines which cards are payout cards after the cards are dealt, in various other embodiments, the gaming system may determine which cards are payout cards before the cards are dealt. It should also be appreciated that although in this example embodiment, the gaming system can determine a game win value after the cards are dealt, in various other embodiments, the gaming system determines a game win value at other suitable times such as: (a) before the cards are dealt; (b) at any suitable point during game play; (c) after the game play time has lapsed; (c) after the gaming system determines that the player has no more moves; and (d) after the player banks all 52 cards.

In various embodiments, the gaming system determines one or more cards to designate as payout cards if the game is a continued game. It should be appreciated that in various other embodiments, if the game is a continued game, the gaming system keeps the cards which were designated as payout cards when the player ran out of time, but does not designate additional payout cards. Examples of scenarios in which the gaming system would designate additional payout cards are: (i) if the player inputs a higher wager amount than for the previous play, for which the gaming system provides more potential payout cards, and (ii) if the player inputs the same wager amount as that input for the previous play, but the player received payout values for payout cards placed during the previous play.

In the foregoing example, the amount of time the player has to play the game is based on the player's wager. It should be appreciated that in various other embodiments, the time of game play may be: (a) predetermined and the same from play to play; (b) randomly determined; (c) set according to criteria other than the player's wager (e.g., total amount of time the player has been at the gaming device, player status according to a player tracking system; and (d) the player's total winnings at the gaming device. It should also be appreciated that in other example embodiments, the gaming system does not employ any time limitations.

It should also be appreciated that although in the foregoing example, the gaming system determines the payout value for each payout card after it is banked, in various other embodiments, the gaming system determines the payout value for each payout card: (a) before the cards are dealt; (b) at any point during game play, but before the payout card is banked; and (c) at the end of play of the game (e.g., when time is up, no more moves remain or all 52 cards have been banked). It should also be appreciated that in various embodiments, regardless of when the payout value of each payout card is determined, the gaming system may wait until after the completion of game play to display the payout value of each respective payout card and/or indicate the number of payout cards or elements employed by the player.

It should be appreciated that in various embodiments, instead of adding a determined game win value to the jackpot meter, the gaming system adds the sum of the average value distributions of paytable 120, 40 credits (or the respective sum in other variations of paytable 120), to the jackpot meter.

It should be appreciated that in various other embodiments, the gaming system awards the player the game win value without adding the game win value to the jackpot meter and then enables the player to play the bonus game to win some or all of the current number of credits in the jackpot meter. In such embodiments, the jackpot meter is still funded, at least in part, by games the player does not win, it just is reset by games the player wins.

In various embodiments, the gaming device assists the player during play of the Klondike Solitaire game under a variety of circumstances. For example, the gaming device may assist the player if: (a) a designated period (such as an amount of time) has passed between moves; (b) only one move is available; (c) a designated game event occurs; (d) any combination of these; or (e) under any suitable circumstances.

In certain embodiments, the gaming device assists the player in a variety of ways. For example, in various embodiments, the gaming device assists the player by: (a) suggesting moves; (b) performing moves for the player (i.e., automatically placing aces and deuces in their respective banks when they are free); (c) pointing out missed potential moves; (d) allowing the player to undo one or more moves; (d) flipping the first card in the stock pile for the player; (e) turning the next card in the stock pile if no potential moves are available; (f) automatically ending the game for the player when the entire stock pile has been turned and there are no potential moves; (g) if a player selects a card, automatically placing the card at its respective destination if only one location is available for the card; (h) if multiple locations are available for a card, after the card is selected, highlighting the different potential locations in different colors; and (i) if the player touches a location and a card is available which can be placed at that location, automatically placing the card at that location.

In one embodiment, the gaming device enhances audio associated with the game or the brightness of the display to emphasize certain suggestions or in association with assistance to the player in any suitable capacity. Assisting the player in various embodiments as described above can help increase game play speed, enhancing the player's ability to win awards and increasing the rate at which the jackpot meter increases in credit value in the event the player continues to play the game.

It should be appreciated that although the foregoing example illustrated a play of Klondike Solitaire, the disclosed dynamic award scheme may be utilized with any variety of Solitaire game in which cards are "banked" (e.g., at which time a payout value would be determined for the cards.)

In another example embodiment, the game is a Sudoku game. Sudoku is a well known logic-based combinatorial number-placement puzzle type game. The objective of a Sudoku game is to fill a 9×9 position grid so that each column, each row, and each of nine 3×3 blocks of positions within the 9×9 grid contains the digits from 1 to 9 only one time each. The puzzle setter provides a partially completed grid and the player's challenge is using the provided numbers in the grid to complete the puzzle.

In this example, the elements of the game are positions of the grid. Prior to a play of the game, the gaming system randomly designates one or more of the positions as payout positions. For each payout position, after the player properly places a number at that respective position, the gaming system uses a payout element specific paytable to determine a payout value to associate with the position and provides the payout value to the player.

It should be appreciated that in various Sudoku embodiments, the gaming system may determine how many positions to designate as payout positions based in part on the player's wager.

Figure 8A:
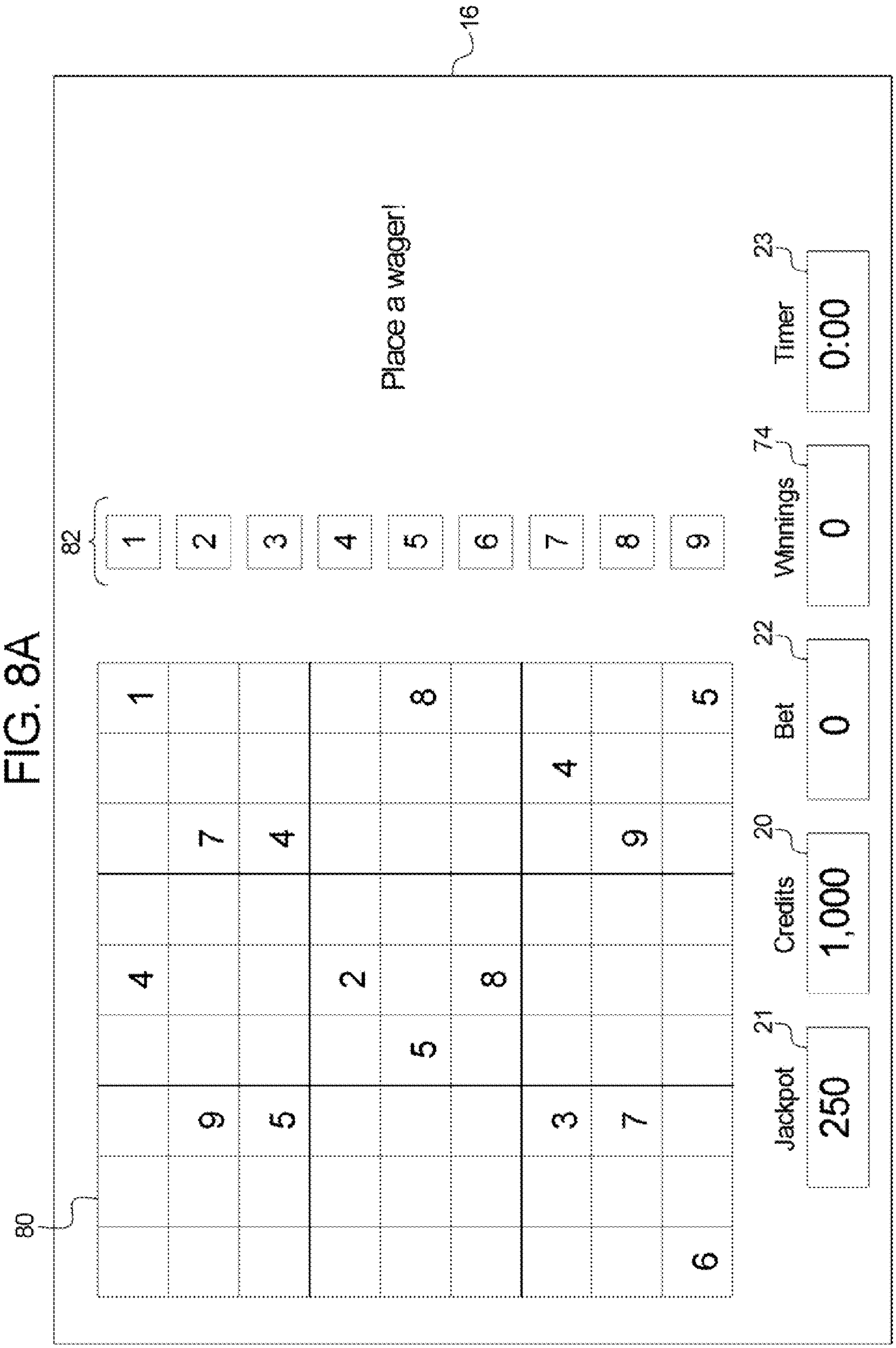
FIGS. 8A, 8B, 8C, 8D, 8E, 8F, 8G, 8H, 8I, 8J, and 8K are front views of a gaming device display enabling the play of Sudoku game in accordance with one example embodiment of the present disclosure.
Figure 8B:
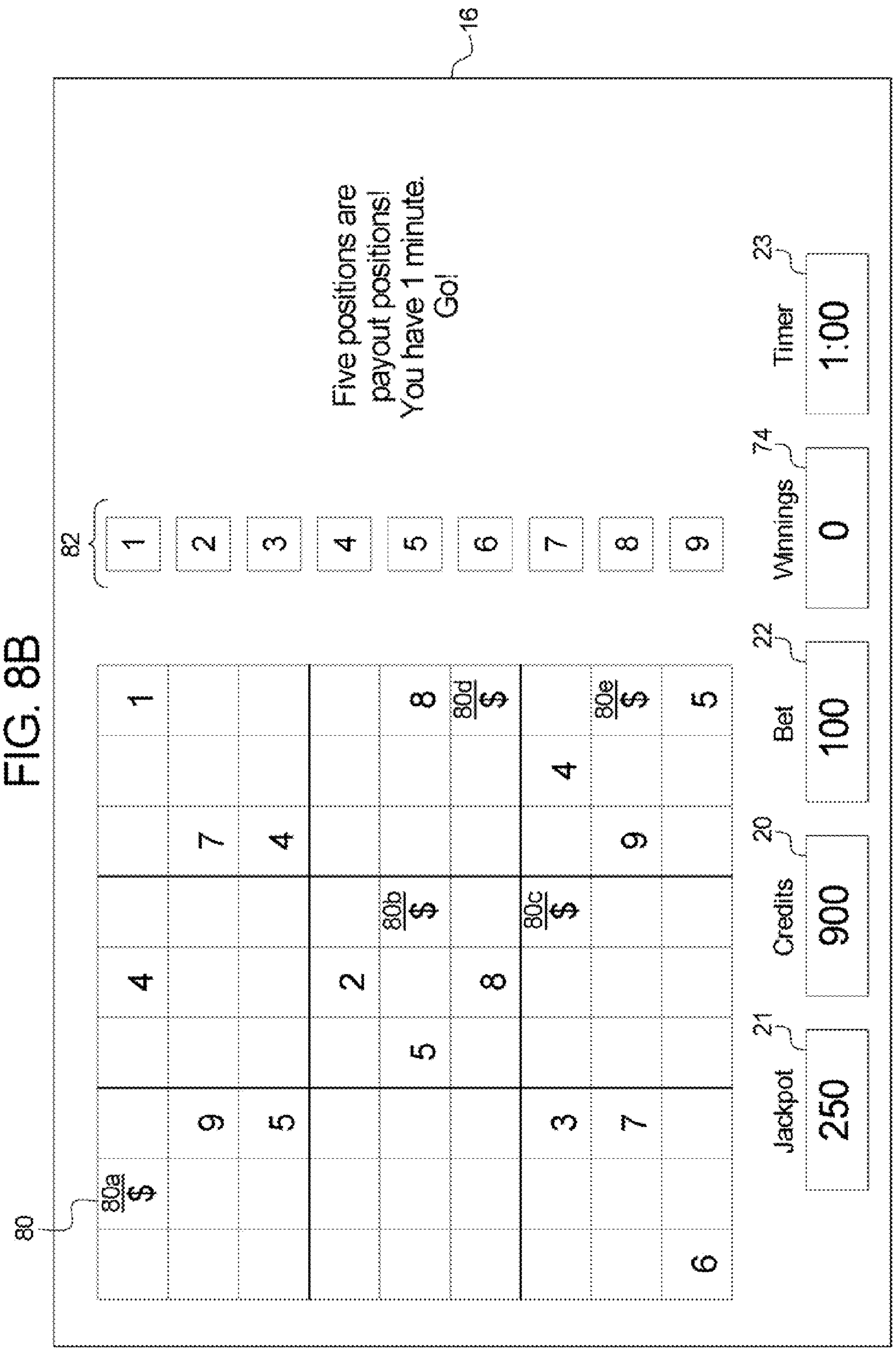

Referring now to FIG. 8A, in this specific example, the gaming system displays a 9×9 grid 80 with sixteen positions already filled in, leaving 65 positions open. The gaming system instructs the player to place a wager. The player places a wager of 100 credits, as illustrated in FIG. 8B. In this example, for a wager of 100 credits, the gaming system randomly selects from two to ten positions to designate as payout positions. Additionally, in this example, the player gets one minute of game play time for a wager of 100 credits. It should be appreciated that as in the case of the above Klondike Solitaire embodiment, both the number of payout positions and the game play time provided to the player may vary as a function of the player's wager.

After the player places their wager, the gaming system randomly designates five payout positions 80*a*, 80*b*, 80*c*, 80*d*, and 80*e*, as illustrated in FIG. 8B. It should be appreciated that in various other embodiments, the payout positions may be designated before the player places a wager. As illustrated in FIG. 8B, the gaming system identifies each of the payout positions by displaying a dollar symbol at the positions. It should be appreciated that in various embodiments, one or more of the payout positions are not identified to the player until after the player selects the position. It should also be appreciated that the payout positions may be identified in any suitable manner (such as highlighting, a bold border, or any suitable symbol).

In this example, the jackpot meter 21 already includes 250 credits. In various embodiments, the gaming system places a designated minimum number of credits in the jackpot meter to make the game more exciting for players. In various other embodiments, these 250 credits would be the accumulation or remainder of credits in the jackpot meter 21 from that players previous plays of the game.

Referring again to FIG. 8B, the gaming system instructs the player to begin play and sets the Timer 23 at one minute. In this embodiment, the display 16 is a touch screen and the player is able to place numbers at positions on the grid 80 by selecting one of the numbers from number selections 82 and subsequently touching a respective grid position at which the player desires to place the number.

Figure 8C:
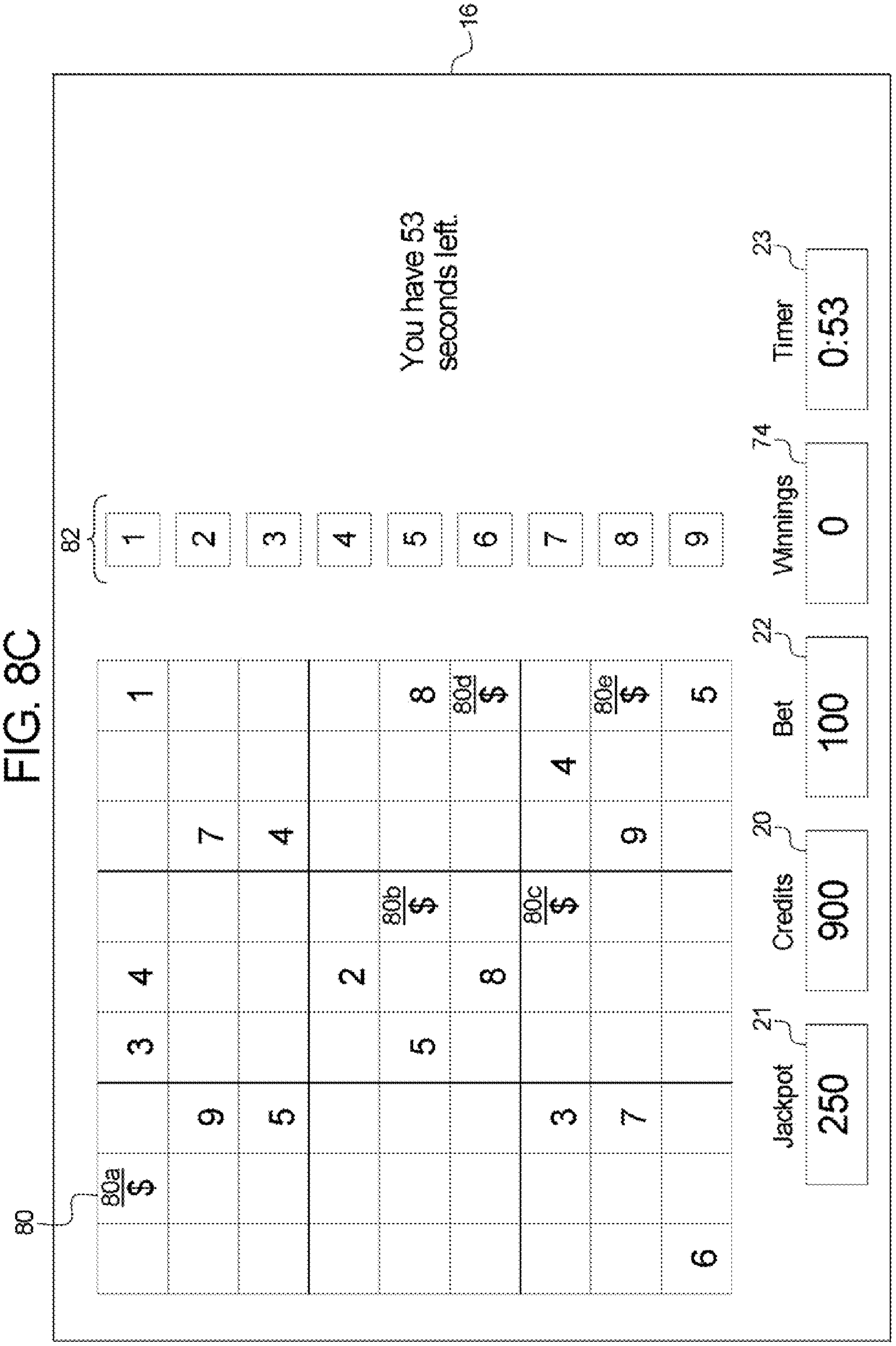
Figure 8D:
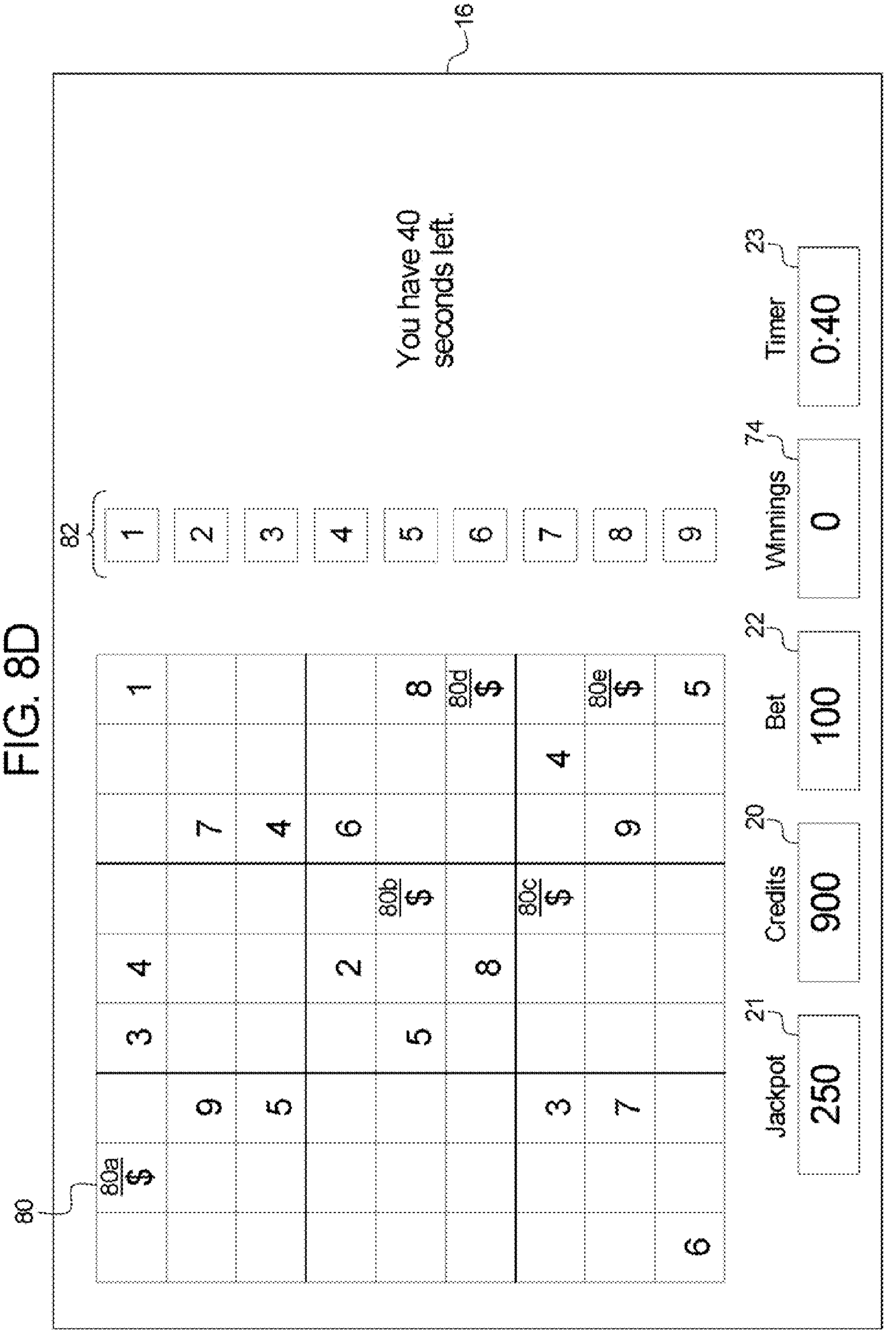
Figure 8E:
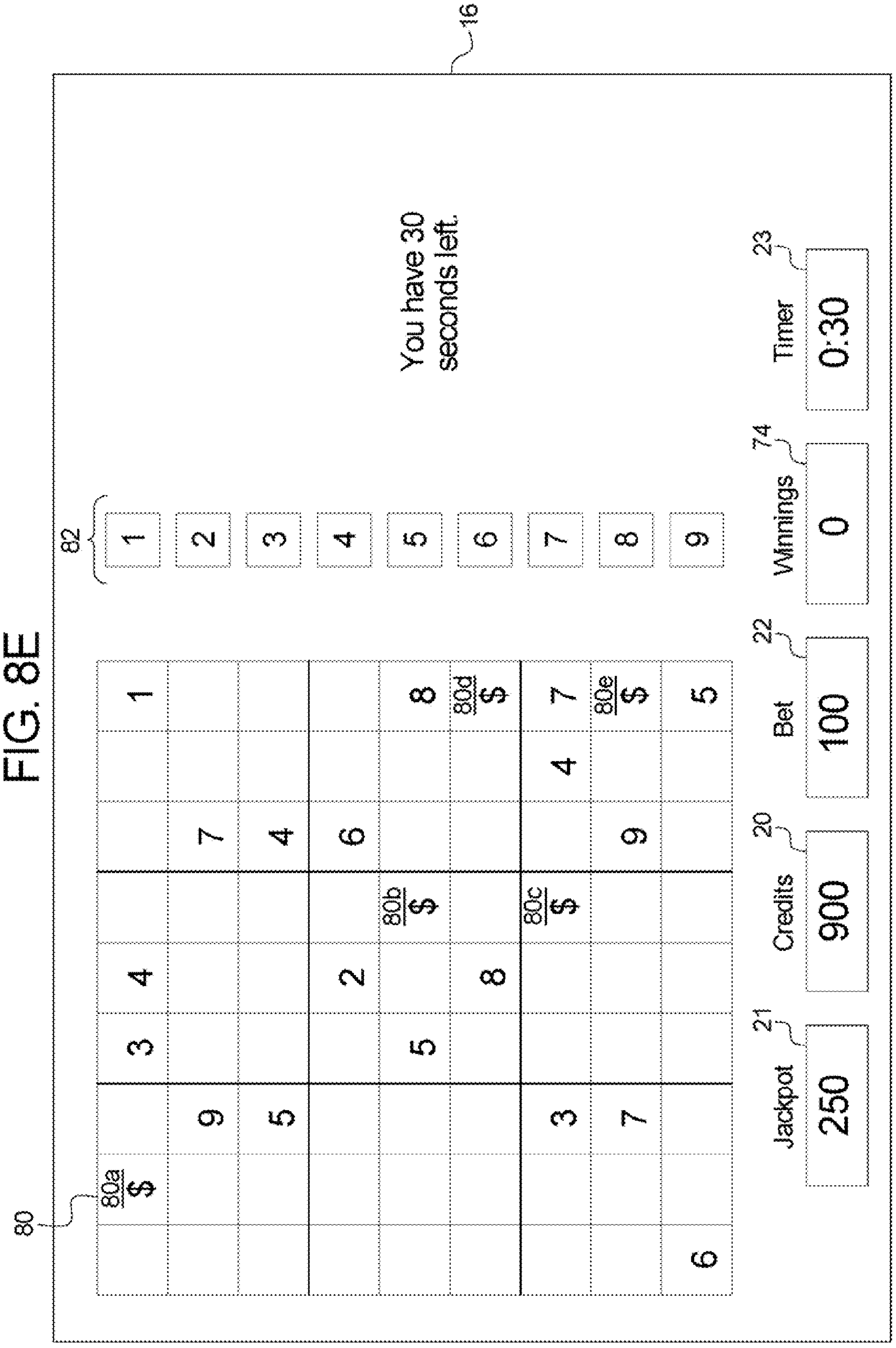

The player begins placing numbers. After seven seconds have elapsed, the player is yet to place a number at a payout position, is illustrated in FIG. 8C. The player is still yet to place a number at a payout position with 40 seconds remaining, as illustrated in FIG. 8D.

With 30 seconds remaining, the player has correctly placed another number, yet still has not placed a number at any payout positions. This example is illustrative of the complexity of certain Sudoku games. A player placing a lower wager and receiving a relatively low amount of time to play the game may recognize that placing a higher wager which causes the gaming system to provide the player with more time is a more attractive option than placing a relatively lower wager.

Figure 8F:
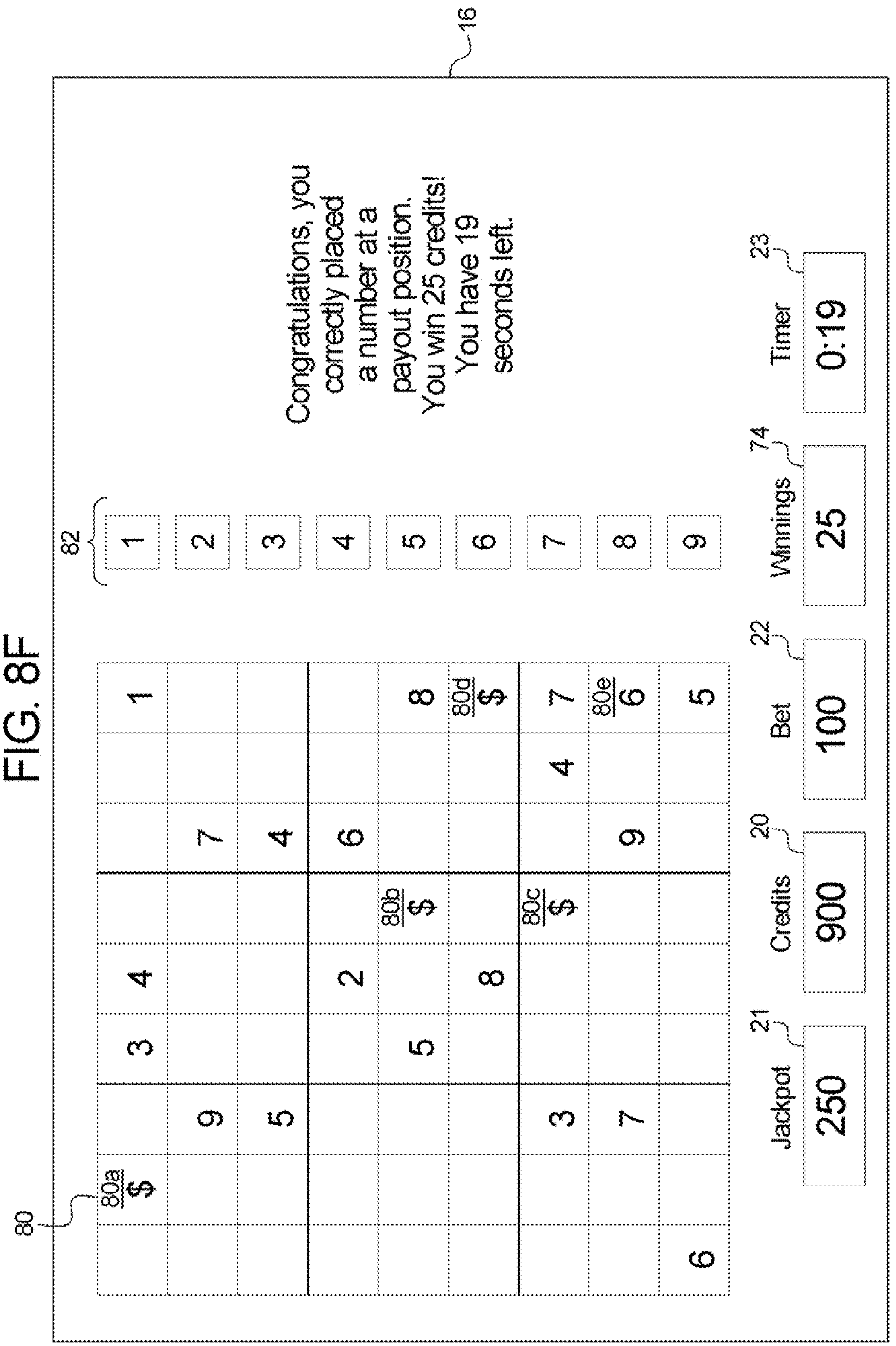

With nineteen seconds remaining, the player properly places the number six at payout position 80*e*, as illustrated in FIG. 8F. After the player properly places the number six at payout position 80*e*, the gaming system randomly determines a payout value for the payout position 80*e* using the payout element specific paytable 110 illustrated in FIG. 4. The gaming system randomly determines 25 credits as the payout value for payout position 80*e* and adds 25 credits to the Winnings Display 74, as illustrated in FIG. 8F.

Figure 8G:
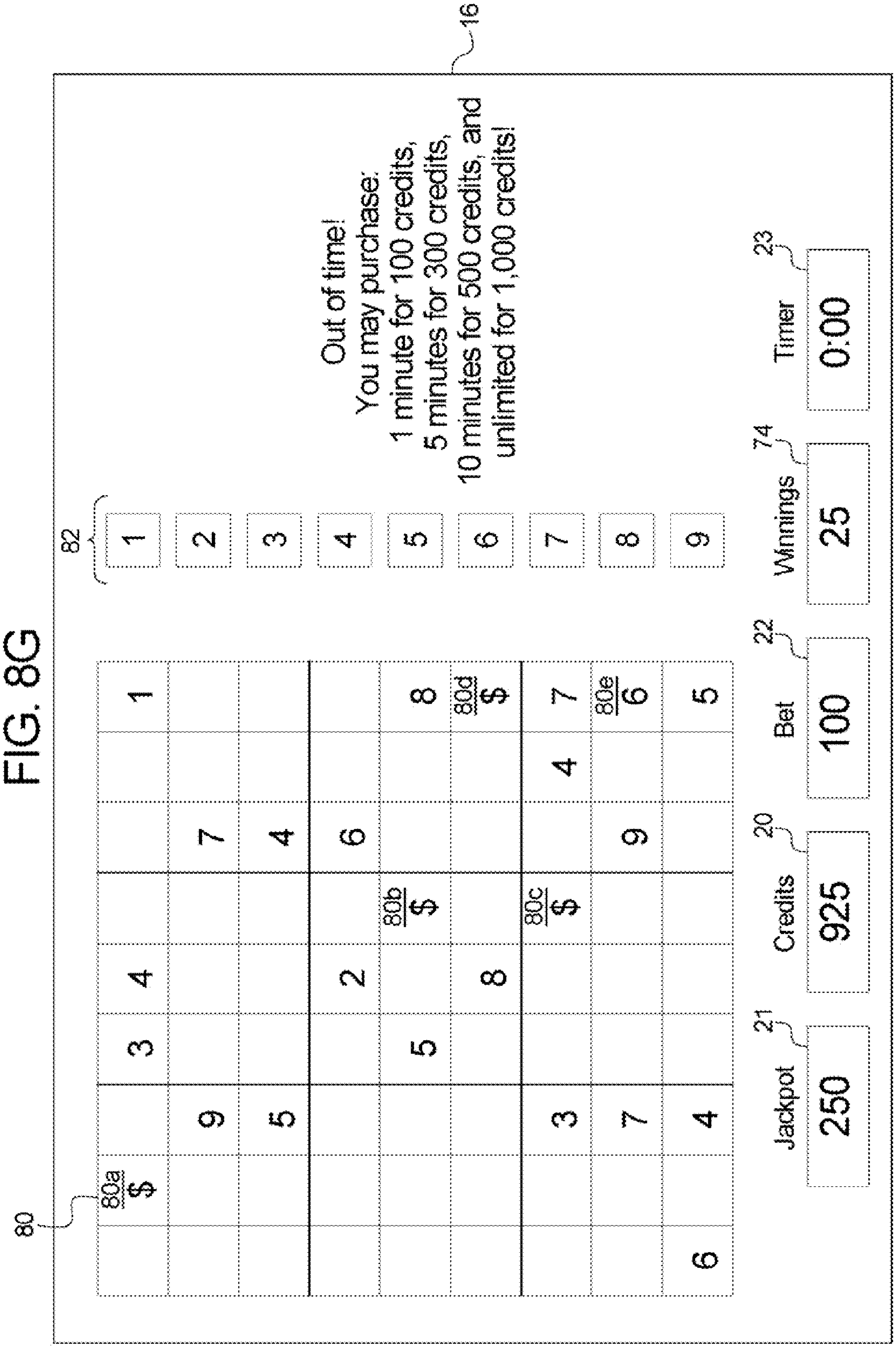

The player runs out of time having won 25 credits, as illustrated in FIG. 8G. The gaming system instructs the player that they may purchase an additional one minute for 100 credits, an additional five minutes for 300 credits, an additional 10 minutes for 500 credits and unlimited time for 1,000 credits. In this example, the player elects to purchase 10 minutes of play, figuring this will provide ample time for solving the puzzle, as speed of play will pick up as more numbers are properly placed in the Sudoku grid.

In this embodiment, because the player elected to continue play after time expired, the gaming system randomly determines a game win value of 100 credits from game win paytable 120 illustrated in FIG. 5 and adds the 100 credits to the jackpot meter 21. As discussed above, adding credits to the jackpot meter 21 in this manner makes the game more exciting for the player because even if the player does not solve the puzzle, the player knows that although they are placing an additional wager, they have the possibility of winning some or all of the jackpot at a later time.

Figure 8H:
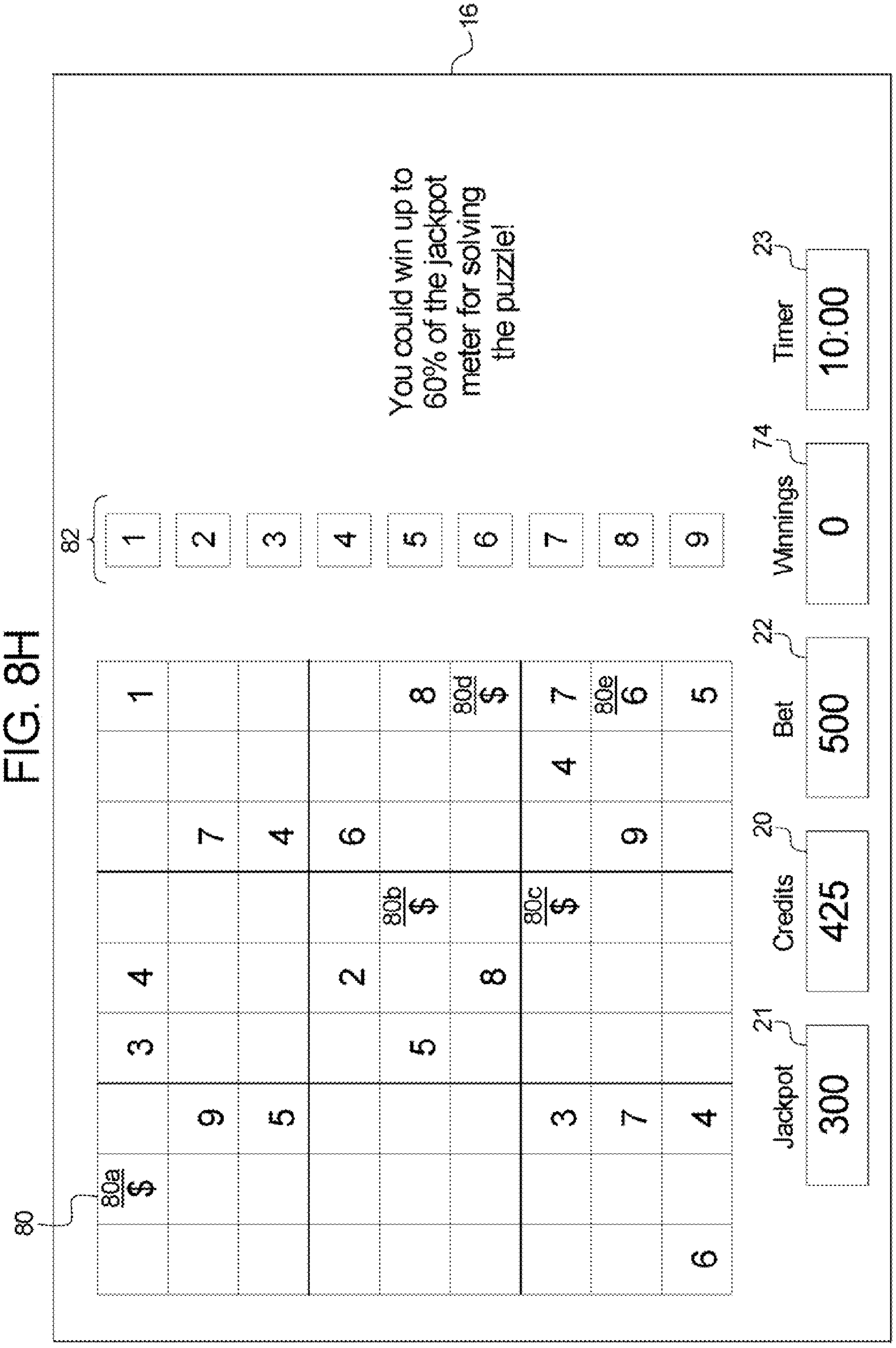

In this embodiment, if the player solves the puzzle, the gaming device randomly determines a game win value from the game win paytable 120 illustrated in FIG. 5 and adds the game win value to the jackpot meter 21. Then, the gaming system begins a bonus game including a plurality of selections each associated with a percentage of the credits in the jackpot meter 21. The number of credits associated with each selection are randomly associated with the respective selections and masked from the player. In this embodiment, the selections are respectively associated with 10%, 30% and 60% of the credits in the jackpot meter 21. Accordingly, in FIG. 8H, the gaming system instructs the player that they could win up to 60% of the jackpot meter and sets the Timer 23 at ten minutes.

Figure 8I:
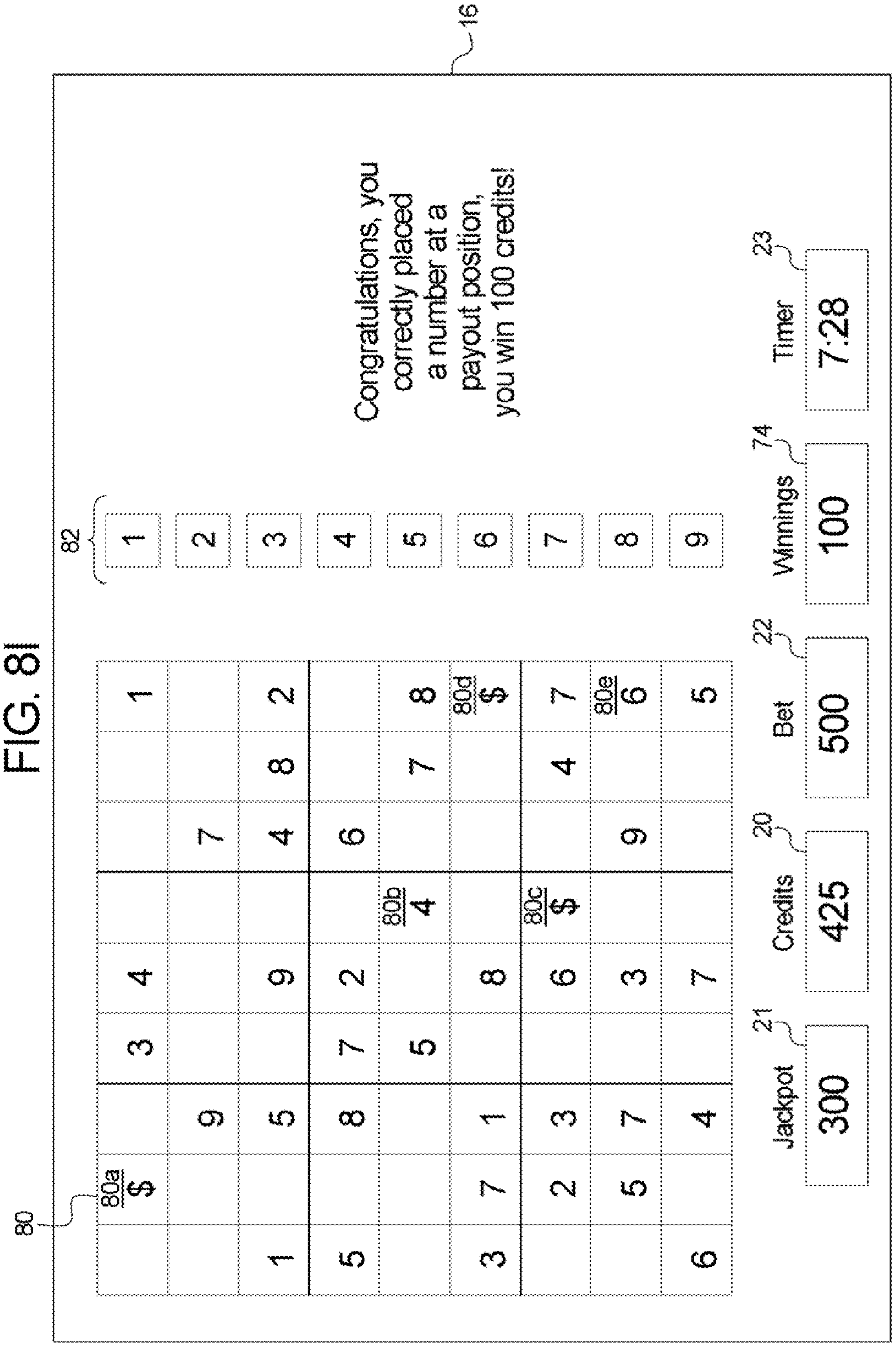

The player properly places the number four at payout position 80*b* with seven minutes and 28 seconds remaining, as illustrated in FIG. 8I. The gaming system randomly determines a payout value of 100 credits for payout position 80*b* using payout element specific paytable 110 illustrated in FIG. 4 and the gaming system adds 100 credits to the Winnings Display 74, as illustrated in FIG. 8I. It should be appreciated that in various embodiments, the gaming system does not determine an actual win value for the payout positions until later in the game or after the game is complete. In various other embodiments, the gaming system does not display the actual win value determined for each of the respective payout positions until after the puzzle is completed or time expires.

Figure 8J:
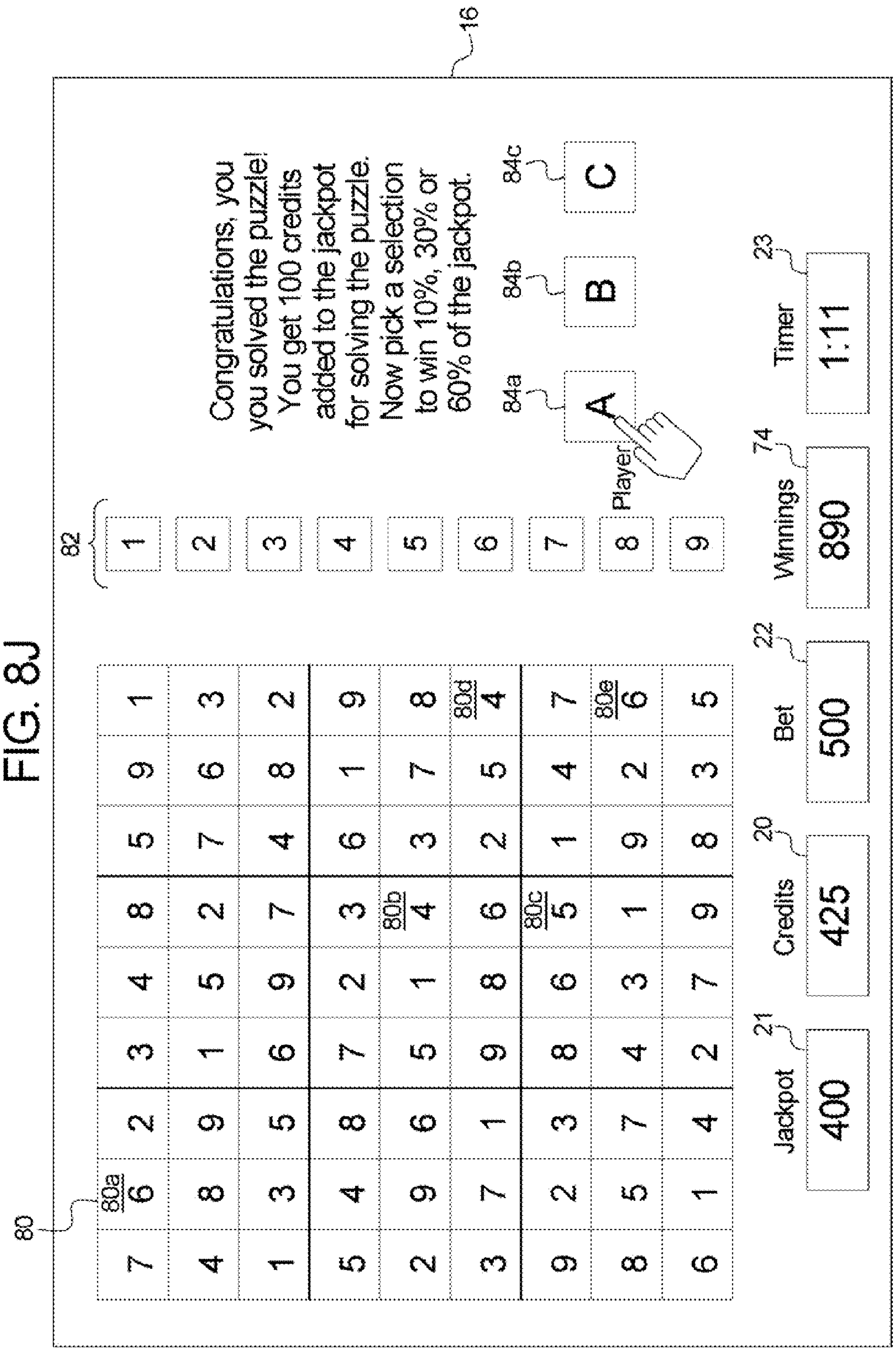

The player solves the puzzle with one minute and eleven seconds remaining, as illustrated in FIG. 8J. During the time elapsed between the display of the game in FIG. 8I and FIG. 8J, the player properly placed a six at payout position 80*a*, properly placed a five at payout position 80*c* and properly placed a four at payout position 80*d*. After each of those respective placements, the gaming system determined a payout value for each of the payout positions using payout element specific paytable 110. Specifically, the gaming system determined a payout value of 500 credits for payout position 80*a*, a payout value of 40 credits for payout position 80*c* and a payout value of 240 credits for payout position 80*d*. Accordingly, 790 credits were added to the Winnings Display 74, as illustrated in FIG. 8J.

Also, after the completion of the puzzle, the gaming system randomly determines a game win value of 100 credits from game win paytable 120 illustrated in FIG. 5 and adds the 100 credits to the jackpot meter. The gaming system then begins the bonus game. The gaming system randomly associates each of selection A 84*a*, selection B 84*b* and selection C 84*c* with a percentage of the 400 credits in the jackpot meter 21. Specifically, the gaming system associates selection A 84*a* with 240 credits (60% of the credits in the jackpot meter 21), selection B with 40 credits (10% of the credits in the jackpot meter 21) and selection C with 120 credits (30% of the credits in the jackpot meter 21). It should be appreciated that this percentage distribution is for illustrative purposes, and that any distribution of percentages of credits in jackpot meter 21 may be used in various embodiments. It should also be appreciated that although three selections are used in the bonus game in this example, in various embodiments, any suitable number of selections may be used in the bonus game.

Figure 8K:
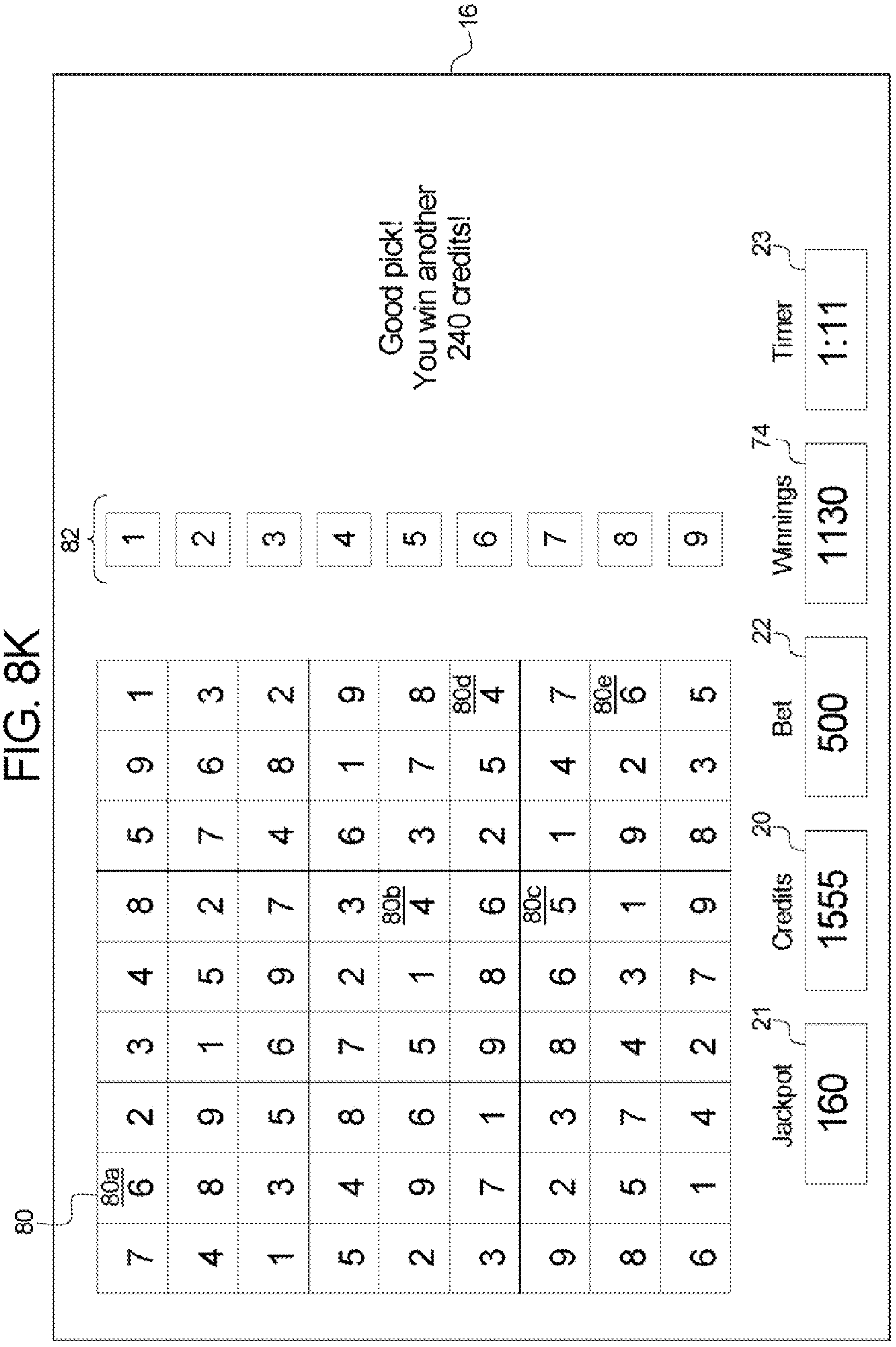

The player picks selection A 84*a*, as illustrated in FIG. 8J. Thus, the gaming system awards the player an additional 240 credits as illustrated in FIG. 8K. The 160 credits remaining in the jackpot meter 21 remain in the jackpot meter for the player's subsequent plays of the game.

It should be appreciated that in various other embodiments in which the game is a Sudoku game, the gaming system displays the player's accuracy and game play speed (e.g., proper number placements per minute). This provides the player with additional entertainment and enables the player to make an educated decision in selecting a wager amount (tied to game play time) for a possible continued play of the game. It should be appreciated that the gaming system may provide a similar display for any game provided using the disclosed dynamic award scheme.

In various other embodiments in which the game is a Sudoku game, the player is enabled to place numbers at positions of the grid 80, however, the gaming system does not inform the player as to whether the number placements are proper until after time runs out.

In various other embodiments, the disclosed wagering game having a dynamic award scheme may be offered in both a regular mode, described above, and a bonus mode. In such embodiments, the bonus mode may be triggered in one or more of the following manners: (a) upon the use or activation of one or more elements designated as a bonus element in a play of the wagering game; (b) randomly; (c) after the player wins a designated number of the wagering game; (d) after the player has been playing the gaming device a designated amount of time; (e) after the player has played a designated number of games; (f) upon a placement of a designated wager on a play of the wagering game; (g) upon any suitable triggering event in the wagering game; and (h) in any suitable manner.

In various such embodiments, playing the wagering game in the bonus mode may provide one or more of the following advantages: (a) higher awards than in the regular mode (e.g., the regular mode could use a first payout element specific paytable and the bonus mode could use a second payout element specific paytable, wherein the awards in the second paytable are higher than their counterparts in the first paytable); (b) a designation of more payout elements in the bonus mode than in the regular mode; and (c) a more advantageous game ending condition in the bonus mode than in the regular mode (e.g., more time to play the game).

In certain embodiments in which the bonus mode is triggered during a play of the wagering game in the regular mode, the bonus mode of the game is a continued play of the game which was ongoing in the regular mode, but with one or more of the previously discussed bonus mode advantages. For example, a player playing the wagering game in the regular mode could select an element which has been designated as a bonus element, triggering the bonus mode. In the bonus mode, the same elements which were payout elements in the regular mode are payout elements in the bonus mode, however the payout value associated with each of the payout elements will be higher than it would have been in the regular mode. In these embodiments, the bonus mode may end after: (a) a game ending condition occurs in the triggered play of the game in the bonus mode or (b) after a designated number of plays of the game in the bonus mode.

In other such embodiments, the triggered play of the game in the bonus mode constitutes a separate game from the game which was being played in the regular mode, including newly designated payout elements. In various such embodiments, upon a game ending condition occurring in the play of the game in the bonus mode: (i) the player returns to the play of the game which was being played in the regular mode upon the triggering of the bonus mode, or (ii) the game ends and the player is not enabled to complete the play of the game which was being played in the regular mode upon the triggering of the bonus mode.

It should be appreciated that in various embodiments, the gaming system may provide different bonus modes which may be associated with different respective triggering events and different respective advantages (e.g., different paytables).

In various embodiments, any of the games disclosed herein may be provided as multi-player progressive games. In other words, multiple players would contribute to the jackpot meter or an additional progressive award for each of the respective games. Multiple players contributing to the jackpot meter will make the game more exciting, and create competition amongst the players to solve the game quickly.

In various other embodiments, instead of receiving increments of game play time for designated numbers of credits, players are enabled to receive a number of game moves for a designated number of credits. It should be appreciated that in various such embodiments, different types of pieces or game elements (e.g., pieces in a chess game) may be associated with different relatively higher or lower awards based on what type of piece they are (e.g., a king in the chess game which is a payout element may have a higher actual payout value than a pawn in the chess game).

In another embodiment, a player is enabled to pause play of the game and pick up where they left off at another time (including keeping the sum of credits in their respective jackpot meter). In such embodiments, the state of the game upon the player pausing the game is stored at a memory device of the gaming device or gaming system. In various other embodiments, the game information could be stored on a player tracking card or smartcard personal to the player. It should be appreciated that in various other such embodiments, the gaming device enables the player to pause the game and continue play of the game at a later time in exchange for a designated number of credits which the player must provide in addition to their base wager for the play of the game. In other variations, this game pause and continuance feature may be free.

In certain such embodiments, if the player elects to continue the same game later, any payout elements which have not been employed are assigned a payout value and such values are added to jackpot meter. In such embodiments, after these values are added to the jackpot meter, these payout elements lose their respective payout status. Additionally, the gaming system determines a game win value and adds the game win value to the jackpot meter. In such embodiments, when the player resumes play of the game, the gaming system designates new payout elements, which will ultimately be assigned new payout values during later play.

It should be appreciated that in various other such embodiments, the game is literally paused as is, with all payout elements remaining payout elements in the later resumed play of the game and no game win value having been added to the jackpot meter prior to resumption of the game.

In various other embodiments, one or more elements of the game could be designated as extra promotional payout elements, the payout for such extra promotional payout elements being independent of the credits awarded for traditional payout elements. For example, in a solitaire embodiment, a card could be marked with a fork. If that card is banked, the gaming system indicates that the player receives a free dinner. In such embodiments, the awards for these additional payout cards could be provided by entities or promoters other than the establishment in which the gaming device is located. For example, a car dealership, a travel agency and online store or any promotional or external entity which would be interested in sponsoring additional game awards. Providing such additional payout elements provides the player with a heightened sense of enjoyment and provides the sponsoring entities with advertising.

In various other embodiments, external promotions or entities may purchase non-optimal elements (e.g., cards, positions) or overall game plays with the substitution of promotional advertising.

In various embodiments, player loyalty could be a persistent aspect of the game. In such embodiments, over the course of play of the game, the gaming system could: (a) increase the average payout value of elements; (b) increase the average number of designated payout elements per play of the game or time period; (c) add incrementally higher numbers of credits to the jackpot meter; (d) provide the player with extra game play time; (e) cue game assist features which increase game play speed; and (f) provide the player with other suitable advantageous features.

In various embodiments, the gaming system enables the player to trade awards in other games for payout elements in a game using the disclosed dynamic award scheme. For example, a player playing a slot game could receive five payout element credits as an award for the slot type game. This information would be stored at a central server or on a player tracking or smart card. Then, at a later time the player would redeem those payout element credits at the same or a different gaming device when playing a game using the disclosed dynamic award scheme. Such payout element credits could cause the gaming system to designate additional elements beyond those determined as a function of the player's wager as payout elements or the game could be entirely driven by payout element credits the player has accumulated.

In other such embodiments, a player could store payout elements for later play of a game using the disclosed dynamic award scheme. For example, for a play of a Klondike Solitaire game, if the gaming system determines that ten cards will be payout cards, the player may elect to have five of such payout cards "deactivated" and store the ability to make five additional cards payout cards during a later play of the game.

In various other embodiments, the gaming system enables players to play games using the disclosed dynamic award scheme in a tournament or community gaming setting.

In various other embodiments, the gaming system enables players to exchange one or more payout elements for an increase in their respective jackpot meter.

In various other embodiments, the gaming system enables players to exchange one or more payout elements or credits for an automated assistant feature that assists in game play, providing not only an exciting game play scenario, but also an average return without skill requirements.

In various embodiments, designated combinations of movable symbols and positions are payout combinations which may be in substitute of or in addition to the designated payout elements in the game. In various such embodiments, a payout value associated with each payout combination could be determined using a paytable specific to the payout combinations.

In various embodiments, if all of the designated number of elements have not been employed in accordance with the predetermined rules of the game upon the occurrence of a game ending event and the player elects to continue play of the current game, the gaming system designates at least one additional element as a payout element for the continued play of the game.

In various embodiments having the jackpot meter, the gaming system adds credits to the jackpot meter independent of the play of the game to keep the jackpot meter at a threshold number of credits.

In various such embodiments, if the player elects to start a new play of the game or continue the current play of the game, any credits in the jackpot meter when the player elects to start a new game or continue play of the game remain in the jackpot meter.

In certain embodiments, if all of the designated number of elements have not been employed in accordance with the predetermined rules of the game upon the occurrence of the game ending condition and if the player elects to start a new game or continue the current play of the game, the gaming system randomly determines a payout value for each of the payout elements which have not been employed in the game in accordance with the predetermined rules of the game using the payout element specific paytable and adds the respective payout values to the jackpot meter.

It should be appreciated that in various other embodiments, rather than being offered as a wagering game, a game having the disclosed dynamic award scheme may be offered as a persistence type game which the player plays concurrent with a different game. In embodiments in which the game is a persistence type game, the player may receive selections or moves for the play of the persistence game as an award in the concurrently played game.

It should be appreciated that in various embodiment, the gaming system displays to the player one or more elements which are payout elements before the player selects or employs any of the payout elements.

It should be appreciated that in various other embodiments, a game could be impossible to solve from the start of the game (e.g., a Klondike Solitaire game).

It should be further appreciated that in various embodiments, each of a plurality of elements may be used in different ways, according to a plurality of different rules (e.g., different rules governing the movement of chess pieces in a chess game).

It should also be appreciated that in various embodiments, the interrelationship of elements affects whether an element can be used in a designated manner in accordance with the predetermined rules of the game (e.g., the order of the cards in a pile in a Klondike Solitaire game).

It should also be appreciated that in various other embodiments, the rules of the game are independent of the awards associated with the payout elements.

It should be further appreciated that in various embodiments, the provider is able to offer a game without varying its rules by simply overlaying or assigning payout element status and respective awards to elements of the game.

It should also be appreciated that in various other embodiments, it is possible for the player not to receive an award for any of the payout elements (e.g., if no payout cards are banked in a Klondike Solitaire game).

It should also be appreciated that in various embodiments, a player may receive an award in addition to the awards associated with any payout elements employed in a predetermined manner in accordance with the predetermined rules of the game if a player completes or solves the game.

It should be further appreciated that in various embodiments, the order of elements effects which payout element a player is able to employ in a designated manner in accordance with the predetermined rules of the game, but not the award associated with the payout element.

It should also be appreciated that in various embodiments, a game could be solvable, but based on player decisions, not end up being solvable.

It should be further appreciated that in various embodiments, the gaming system receives an input from the player for each employed element which causes the element to be placed or displayed in one of a plurality of different element positions.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. A gaming system comprising:

a housing;

a plurality of input devices supported by the housing, the plurality of input devices including an acceptor;

at least one display device supported by the housing;

at least one processor; and at least one memory device storing a plurality of instructions, which when executed by the at least one processor, cause the at least one processor to operate with the plurality of input devices and the at least one display device to:

establish a credit balance based at least in part on a monetary value associated with a physical item after the acceptor receives the physical item, the physical item being one of a ticket associated with the monetary value and currency;

for each play of a wagering game:

(a) following an actuation of a wager button, place a wager for the play of the wagering game, the credit balance decreasable by the wager;

(b) randomly determine a quantity of a designated number of elements which will be designated as payout elements for the play of the wagering game, said quantity being less than all of the designated number of elements;

(c) randomly determine which of the number of elements to designate as payout elements for the play of the wagering game;

(d) for each payout element, randomly determine a payout value associated with that payout element for the play of the wagering game;

(e) determine a game ending condition for the play of the wagering game;

(f) enable a player to use at least one of the plurality of input devices to play the wagering game in accordance with predetermined rules of the wagering game, which includes enabling the player to employ the elements until the game ending condition occurs, wherein employing each element includes causing said element to move to one of a plurality of different element positions including at least one non-designated element position and at least one designated element position; and (g) for each payout element, if the payout element is employed in the play of the wagering game in a designated manner in accordance with the predetermined rules of the wagering game;

(1) if the payout element is moved to and displayed at one of the at least one designated element position, provide the player the payout value associated with that payout element based on said move to said designated element position, the credit balance increasable based on the payout value; and (2) if the payout element is moved to and displayed at one of the at least one non-designated element position, not provide the player the payout value associated with that payout element based on said move to said non-designated element position; and initiate a payout associated with the credit balance following an actuation of a cashout button.

2. The gaming system of claim 1, wherein the plurality of instructions, when executed by the at least one processor, cause the at least one processor to determine one or more of the following based in part on the player's wager: (a) the quantity of the designated number of elements which will be designated as payout elements for that play of the wagering game; (b) which of the designated number of elements to make the payout elements for that play of the wagering game; (c) the payout value associated with one or more of the payout elements for that play of the wagering game; and (d) the game ending condition for the play of the wagering game.

3. The gaming system of claim 1, wherein the plurality of instructions, when executed by the at least one processor, cause the at least one processor to determine the quantity of the designated number of elements which will be designated as payout elements for that play of the wagering game based at least in part on the player's wager.

4. The gaming system of claim 1, wherein the plurality of instructions, when executed by the at least one processor, cause the at least one processor to determine which of the elements to make the payout elements for that play of the wagering game based at least in part on the player's wager.

5. The gaming system of claim 1, wherein the plurality of instructions, when executed by the at least one processor, cause the at least one processor to determine the payout value associated with each payout element for that play of the wagering game based at least in part on the player's wager.

6. The gaming system of claim 1, wherein the plurality of instructions, when executed by the at least one processor, cause the at least one processor to determine the payout value associated with each payout element for that play of the wagering game using a payout value specific paytable.

7. The gaming system of claim 1, wherein the game ending condition for the play of the wagering game is one or more of: (a) an expiration of an amount of time; (b) a selection of a terminating element; (b) a determination that no more elements may be employed in accordance with the predetermined rules of the game; (c) a determination that all of the designated number of elements have been employed in accordance with the rules of the game; and (d) the player quitting the game.

8. The gaming system of claim 1, wherein the plurality of instructions, when executed by the at least one processor, cause the at least one processor to operate with the at least one display device to enable the game ending condition to occur before the player employs all of the designated number of elements.

9. The gaming system of claim 8, wherein the plurality of instructions, when executed by the at least one processor, cause the at least one processor to operate with the plurality of input devices and the at least one display device to upon the occurrence of the game ending condition, enable the player to one of: (i) place an additional wager to start a new game and (ii) place an additional wager to continue play of the current game.

10. The gaming system of claim 1, wherein the plurality of instructions, when executed by the at least one processor, cause the at least one processor to operate with the at least one display device to provide a game win paytable for that play of the wagering game.

11. The gaming system of claim 10, wherein the plurality of instructions, when executed by the at least one processor, cause the at least one processor to operate with the at least one display device to randomly determine a game win value using the game win paytable and provide the game win value to the player in addition to the payout values provided to the player if a game winning condition occurs.

12. The gaming system of claim 10, wherein the game includes a jackpot meter.

13. The gaming system of claim 12, wherein the plurality of instructions, when executed by the at least one processor, cause the at least one processor to operate with the at least one display device to: if a game winning condition occurs before the game ending condition occurs, randomly determine a game win value using the game win paytable, add the game win value to the jackpot meter and provide the player with some or all of a plurality of credits in the jackpot meter in addition to the payout values provided to the player.

14. The gaming system of claim 13, wherein the plurality of instructions, when executed by the at least one processor, cause the at least one processor to operate with the plurality of input devices and the at least one display device to enable the player to play a bonus selection game to determine how many of the credits in the jackpot meter to provide the player.

15. The gaming system of claim 14, wherein the bonus selection game includes a plurality of selections each associated with a portion of the credits in the jackpot meter.

16. The gaming system of claim 15, wherein any credits which are not associated with the picked selection remain in the jackpot meter.

17. The gaming system of claim 1, wherein the game includes a regular mode and a bonus mode.

18. The gaming system of claim 17, wherein the bonus mode is triggered in one or more manners selected from a group consisting of: (a) upon a use of a designated bonus element in the play of the wagering game; (b) randomly; (c) after the player wins a designated number of the wagering game; (d) after the player has been playing the wagering game a designated amount of time; (e) after the player has played a designated number of games; and (f) upon a placement of a designated wager on the play of the wagering game.

19. The gaming system of claim 17, wherein the bonus mode includes advantages over the regular mode selected from a group consisting of: (a) higher awards than in the regular mode; (b) a designation of more payout elements than in the regular mode; and (c) a more advantageous game ending condition than in the regular mode.

20. The gaming system of claim 17, wherein if the bonus mode is triggered during a play of the wagering game in the regular mode, the bonus mode of the game is a continued play of the game which was ongoing in the regular mode.

21. The gaming system of claim 20, wherein the plurality of instructions, when executed by the at least one processor, cause the at least one processor to operate with the at least one display device to maintain the same elements which were payout elements in the regular mode as payout elements in the bonus mode.

22. The gaming system of claim 20, wherein the plurality of instructions, when executed by the at least one processor, cause the at least one processor to operate with the at least one display device to end the play of the game in the bonus mode either: (a) after a game ending condition occurs in the triggered play of the game in the bonus mode or (b) after a designated number of plays of the game in the bonus mode.

23. The gaming system of claim 17, wherein the plurality of instructions, when executed by the at least one processor, cause the at least one processor to operate with the plurality of input devices and the at least one display device to provide a play of the game in the bonus mode as a separate game from the game which was being played in the regular mode, including newly designated payout elements.

24. The gaming system of claim 23, wherein the plurality of instructions, when executed by the at least one processor, cause the at least one processor to operate with the plurality of input devices and the at least one display device to upon the game ending condition occurring in the play of the game in the bonus mode, enable the player to return to the play of the game which was being played in the regular mode upon the triggering of the bonus mode.

25. A gaming system comprising:

a housing;

a plurality of input devices supported by the housing, the plurality of input devices including an acceptor;

at least one display device supported by the housing;

at least one processor; and at least one memory device storing a plurality of instructions, which when executed by the at least one processor, cause the at least one processor to operate with the plurality of input devices and the at least one display device to:

(i) establish a credit balance based at least in part on a monetary value associated with a physical item after the acceptor receives the physical item, the physical item being one of a ticket associated with the monetary value and currency;

(ii) following an actuation of a wager button, place a wager for a play of a solitaire game, the credit balance decreasable by the wager;

(iii) determine a number of cards of a deck of cards which will be designated as payout cards for the play of the solitaire game, said number being less than all of the deck of cards;

(iv) determine which of the cards of the deck of cards to designate as payout cards for the play of the solitaire game;

(v) for each payout card, determine a payout value associated with that payout card for the play of the solitaire game;

(vi) display a plurality of field piles of cards;

(vii) display a stock pile of cards;

(viii) display, in response to communications received from one of the plurality of input devices, each of a plurality of cards from the stock pile of cards being placed in:

(a) one of the field piles of cards, (b) one of a plurality of suit-specific banks, or (c) a discard pile;

(ix) display, in response to communications received from the one of the plurality of input devices in accordance with a set of predefined rules for the solitaire game, at least one card from the field piles of cards being placed in:

(a) a different one of the field piles of cards, or (b) one of the plurality of suit-specific banks;

(x) for each payout card:

(a) if the payout card is moved to and is displayed at one of the plurality of suit-specific banks, provide a player with the payout value associated with the payout card based on said move to said suit-specific bank, the credit balance increasable based on the payout value; and (b) if the payout card is moved to and is displayed at one of the field piles of cards, not provide a player with the payout value associated with the payout card based on said move to said field pile of cards;

(xi) end the play of the solitaire game after:

(a) any cards remaining in the stock pile can only be placed in the discard pile, or (b) an expiration of a designated amount of time; and (xii) if a cashout button is actuated, initiate a payout associated with the credit balance.

26. The gaming system of claim 25, wherein the plurality of instructions, when executed by the at least one processor, cause the at least one processor to randomly determine the number of cards of the deck of cards which will be designated as payout cards for the play of the solitaire game.

27. The gaming system of claim 25, wherein the plurality of instructions, when executed by the at least one processor, cause the at least one processor to randomly determine which of the cards of the deck of cards to designate as payout cards for the play of the solitaire game.

28. The gaming system of claim 25, wherein the plurality of instructions, when executed by the at least one processor, cause the at least one processor to randomly determine the payout value associated with each payout card for the play of the solitaire game.

* * * * *